(12) United States Patent
Sun et al.

(10) Patent No.: US 11,315,285 B2
(45) Date of Patent: Apr. 26, 2022

(54) METHOD, ELECTRONIC DEVICE AND STORAGE MEDIUM FOR DETECTING A POSITION CHANGE OF LANE LINE

(71) Applicant: BEIJING BAIDU NETCOM SCIENCE AND TECHNOLOGY CO., LTD., Beijing (CN)

(72) Inventors: Peng Sun, Beijing (CN); Changjie Ma, Beijing (CN); Chao Zheng, Beijing (CN); Yuefeng Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/078,747

(22) Filed: Oct. 23, 2020

(65) Prior Publication Data

US 2021/0166421 A1 Jun. 3, 2021

(30) Foreign Application Priority Data

Dec. 3, 2019 (CN) .......................... 201911221874.9

(51) Int. Cl.
*G06T 7/73* (2017.01)
*G06V 20/40* (2022.01)
*G06V 20/56* (2022.01)
(52) U.S. Cl.
CPC .............. *G06T 7/74* (2017.01); *G06V 20/40* (2022.01); *G06V 20/588* (2022.01); *G06T 2207/30256* (2013.01)
(58) Field of Classification Search
CPC ... G06T 7/74; G06T 2207/30256; G06T 7/70; G06K 9/00798; G06K 9/00651; G06K 9/3233; G06K 9/00711; G06F 16/29
See application file for complete search history.

(56) References Cited

U.S. PATENT DOCUMENTS

2009/0167864 A1* 7/2009 Unoura .................... G06T 7/12
348/148
2009/0296987 A1* 12/2009 Kageyama ......... G06K 9/00798
382/103

(Continued)

FOREIGN PATENT DOCUMENTS

CN 110954128 A * 4/2020 ......... G06K 9/00744

OTHER PUBLICATIONS

Lane Endpoint Detection and Position Accuracy Evaluation for Sensor Fusion-Based Vehicle Localization on Highways (Year: 2018).*

(Continued)

*Primary Examiner* — Nizar N Sivji
(74) *Attorney, Agent, or Firm* — Fay Sharpe LLP

(57) ABSTRACT

The present disclosure provides a method, an electronic device and a storage medium for detecting a position change of a lane line. The method includes: converting a first change in a target region of first measurement data of a distance between a lane line and a reference line to a first equivalent position change, the first measurement data being obtained from first road data collected by a high-precision device on the road; correcting second measurement data of the distance with the first measurement data, the second measurement data being obtained from second road data collected by a low-precision device on the road; converting a second change of the corrected second measurement data to a second equivalent position change; and detecting a position change of the lane line in the target region based on a comparison of the first equivalent position change and the second equivalent position change.

20 Claims, 17 Drawing Sheets

(56) References Cited

U.S. PATENT DOCUMENTS

| | | | |
|---|---|---|---|
| 2015/0210278 A1* | 7/2015 | Ben Shalom | B60T 7/12 |
| | | | 382/104 |
| 2019/0025853 A1* | 1/2019 | Julian | G05D 1/0274 |
| 2019/0128678 A1* | 5/2019 | Merfels | G06F 16/29 |
| 2020/0132476 A1* | 4/2020 | Roeth | G01C 21/32 |
| 2021/0061305 A1* | 3/2021 | Huberman | G01C 21/30 |

OTHER PUBLICATIONS

Lane Detection of Curving Road for Structural Highway With Straight-Curve Model on Vision (Year: 2019).*

Extracting Geometric Road Centerline and Lane Edges From Single-scan LiDAR Intensity Using Optimally Filtered Extrema Features (Year: 2018).*

Robust Lane Markings Detection and Road Geometry Computation (Year: 2008).*

\* cited by examiner

METHOD, ELECTRONIC DEVICE AND STORAGE MEDIUM FOR DETECTING A POSITION CHANGE OF LANE LINE

CROSS-REFERENCE TO RELATED APPLICATION

This application claims priority to and benefits of Chinese Patent Application Serial No. 201911221874.9, filed the State Intellectual Property Office of P. R. China on Dec. 3, 2019, the entire content of which is incorporated herein by reference.

FIELD

Embodiments of the present disclosure relate to the field of computer technologies and the field of data/image processing technologies, and more particularly, to fields of autonomous driving technologies and electronic maps technologies.

BACKGROUND

A high-definition map is a machine-oriented digital map that can be applied to, for example, autonomous driving, robot navigation, and positioning. High-definition maps play an important role in autonomous driving systems. In the entire autonomous driving system, operations of environment sensing and route planning and positioning system rely on high-definition maps in varying degrees.

The high-definition map is a map format in high definition, which not only has high definition, but also includes information that can be used for precise navigation and positioning, such as various information about roads. Such information may include, but is not limited to, related data information of road marking lines such as lane lines and road edge lines. When a position of a lane line on a road changes, for example, when the lane line is redrawn, data of the lane line on the high-definition map also needs to be updated to accurately represent the latest lane line on the actual road.

SUMMARY

In an embodiments of the present disclosure, a method for detecting a position change of a lane line is provided. The method includes converting a first change in a target region of first measurement data of a distance between a lane line and a reference line on a road to a first equivalent position change of the lane line. The first measurement data is obtained from first road data collected by a high-precision device on the road at a first time point. The target region is between the lane line and the reference line. The reference line represents a boundary of a portion of the road available for a vehicle. The method further includes correcting second measurement data of the distance with the first measurement data. The second measurement data is obtained from second road data collected by a low-precision device on the road at a second time point, the second time point being after the first time point. The method further includes converting a second change of the corrected second measurement data in the target region to a second equivalent position change of the lane line. The method further includes detecting a position change of the lane line in the target region between the first time point and the second time point based on a comparison of the first equivalent position change and the second equivalent position change.

In an embodiment of the present disclosure, an electronic device is provided. The electronic device includes one or more processors and a storage device. The storage device is configured to store one or more programs. When the one or more programs are executed by the one or more processors, the one or more processors are configured to implement the method as described in the first aspect.

In an embodiment of the present disclosure, a computer-readable storage medium having a computer program stored thereon is provided. When the program is executed by a processor, the method as described in the first aspect is implemented.

It should be understood that the content of the Summary of the present disclosure is not intended to define key or important features of embodiments of the present disclosure, nor is it intended to limit the scope of the present disclosure. Other features of the present disclosure will become easily understood in the following description.

BRIEF DESCRIPTION OF THE DRAWINGS

The above and other objects, features, and advantages of embodiments of the present disclosure will become easily understood in the following detailed description with reference to the accompanying drawings. In the drawings, several embodiments of the present disclosure are illustrated in an exemplary and non-limiting manner.

The same or similar reference numerals are used to represent the same or similar components throughout the drawings.

DETAILED DESCRIPTION

Figure 1:
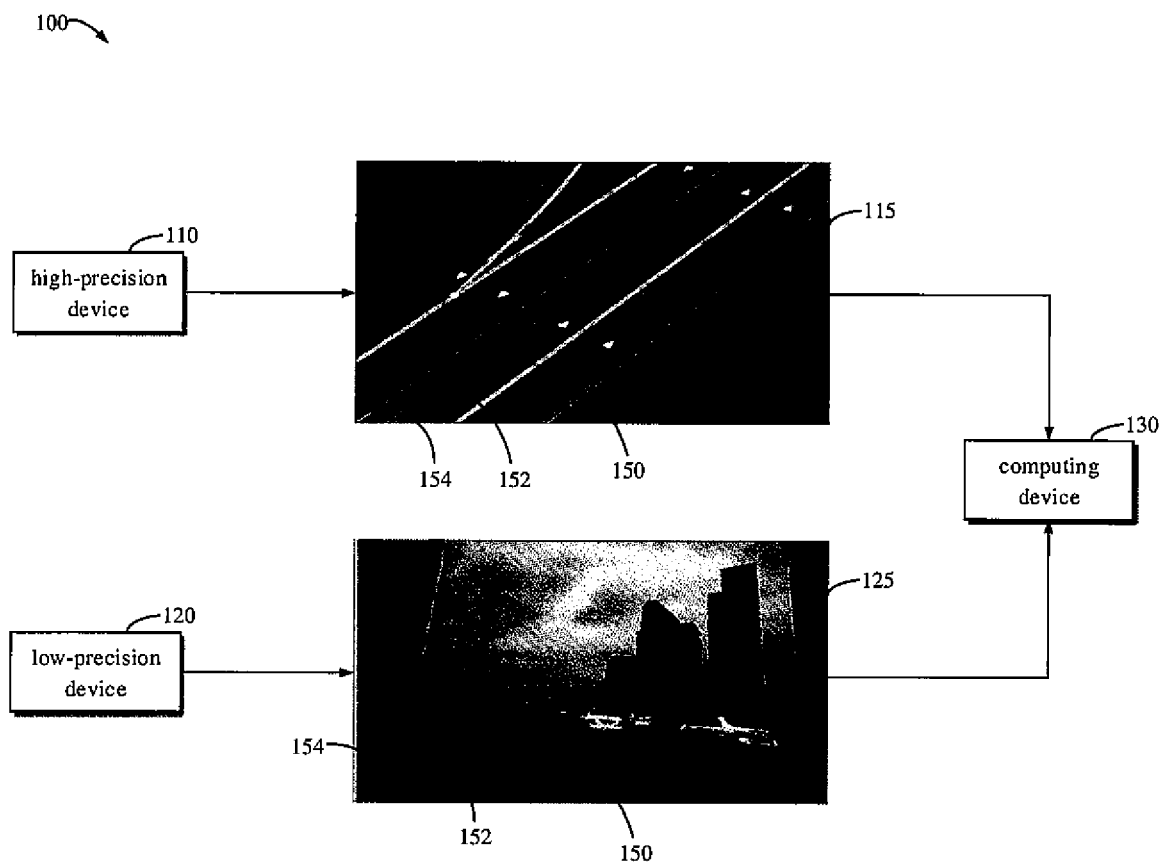
FIG. 1 is a schematic diagram of an example environment in which some embodiments of the present disclosure may be implemented.

The principle and spirit of the present disclosure will be described below with reference to several exemplary embodiments illustrated in combination with the accompanying drawings. It should be understood that these specific embodiments are described only to enable those skilled in the art to better understand and implement the present disclosure, and do not limit the scope of the present disclosure in any manner.

Analysis and Research on Conventional Solutions

The rapid update of high-definition maps is an important business for map providers. Detecting changes in positions of lane lines (for example, redrawing of a lane line) is part of the update of a high-definition map. In practice, the position change of a lane line may be detected first, and then the lane line may be collected and updated by a high-precision device (such as a high-precision collection vehicle) or other technical means at the changed position of the lane line.

At present, it has been proposed to detect a change of the position of a lane line through a low-precision device (for example, a crowd-sourced device such as a consumer-level driving recorder, etc.) with low cost. For example, one detection method is to detect a position change of a lane line based on a change of the lane width. In detail, the method may correct lane width identified by a low-precision device to lane width at a more accurate value measured by a high-precision device under the idea of "lane width normalization".

However, the change of the lane width may also be identified in a region where the change of the lane width is unstable (for example, at an opening of a median strip on a road), for the reason that an actual road may not have a reference line (for example, a road edge line) at the opening of a median strip, that is, the reference line is interrupted at the opening of a median strip. Therefore, a distance between the lane line and the reference line measured by the high-precision device or the low-precision device in such a region may be a reference line generated based on later fitting, or may be a distance between the lane line and another element (for example, a guardrail line, a vehicle, vegetation on the road, etc.) on the road. Therefore, in the region where the change of the lane width is unstable, a measured value of the distance between the lane line and the reference line is unstable.

In this case, the identified change of the lane width may lead to the misidentification of the position change of the lane line. That is to say, in regions where the change of the lane width is unstable, the change of the lane width does not mean that the position of the lane line changes, for example, the lane line may be redrawn. Therefore, in the method of detecting the change of the lane line based on the change of the lane width, it may be necessary to filter misidentifications caused by regions where the change of lane width is unstable (for example, the opening of a median strip).

In addition, in regions where the change of the lane width is unstable, the respective statistical indicators relating to roads identified by the low-precision device are often very different from available indicators in road data (for example, the high-definition map) collected by the high-precision device. The difference may be caused by large identification errors of an algorithm of a sensing module configured to identify the road data collected by the low-precision device and influence of adverse factors in external environmental on the road (for example, vehicle blocking, vegetation blocking, etc.). These errors and adverse factors may also cause significant differences in measurement results of multiple identifications of the low-precision device for one region where the change of the lane width is unstable.

For example, the practice indicates that for one road segment (for example, a region between the lane line and the reference line) on the road corresponding to the opening of a median strip, there are significant differences in both a longitudinal length of the road segment and a maximum lateral (perpendicular to the road direction) deviation identified by the low-precision device. In an actual measurement, a maximum lateral deviation identified by a low-precision device may differ from data identified by a high-precision device by as much as 0.9 meters. Therefore, in the method of detecting the change of the lane line based on the change of the lane width, there is a challenge of: how to filter the region (for example, the opening of a median strip) where the change of the lane width is unstable and the position change of the lane line does not really occur, so as to only retain the true position change of the lane line.

In the prior art, the misidentification of the position change of the lane line caused by the opening of a median strip is usually filtered by the following two conventional processing methods. The first conventional processing method is to use a sensing module to identify a region corresponding to the opening of a median strip, such that subsequently, a processing module may remove a detection result of the position change of the lane line in the region. For the second conventional processing method, the sensing module not only identifies the opening of a median strip, but also identifies whether new and old lane lines coexist in the left-most lane line in the region corresponding to the opening of a median strip. In other words, the second conventional processing method additionally identifies whether the region corresponding to the opening of a median strip has new and old lane lines coexisting based on the above-mentioned first conventional method.

The inventor found, through research and analysis, that the above two conventional processing methods have some shortcomings and deficiencies. The disadvantage of the first conventional processing method is that the position change of the lane line at the position cannot be completely ruled out, for the reason that it cannot determine that there is no position change of the lane line at the opening of a median strip simply by identifying opening of a median strip, and further processing is required. In terms of the second conventional processing method, the design of the algorithm to identify the coexistence of new and old lane lines is extremely challenging and complex, so this method is effective for handling a situation where new and old lane lines do not exist at the same time, rather than handling a situation where the redrawing of the lane line actually happens.

Overall Thoughts and Basic Principles

Detecting the position change of a lane line is part of the update of the high-definition map. That is, the position of the lane line is found to change first, and then the lane line may be updated at the position where the change occurs by a high-precision collection vehicle or other technical means. The inventor discovered through research that there are technical difficulties in detecting the position change of the lane line through a crowd-sourced consumer-level driving recorder at present as characteristics of the consumer-level driving recorder make it difficult to obtain highly accurate and reliable positions of the lane line.

In view of the above research and analysis, embodiments of the present disclosure propose a technical solution for detecting the position change of the lane line to at least partially solve the above-mentioned technical problems and other potential technical problems existing in the conventional solutions. In the technical solution of the present disclosure, on the one hand, first measurement data of a distance between a lane line and a reference line is obtained from first road data collected at a first time point by a high-precision device (for example, a device used to collect data of a high-definition map). Then, a first change of the first measurement data in a target region is converted to a first equivalent position change of the lane line. The target region here refers to a region between the lane line and the reference line.

On the other hand, second measurement data of the above-mentioned distance is obtained from second road data collected at a second time point by a low-precision device (for example, a driving recorder), the second time point being after the first time point. Then, the first measurement data with higher accuracy is used to correct the second measurement data with lower accuracy, so that the corrected second measurement data and the first measurement data are comparable, and the same processing may be performed. A second change of the corrected second measurement data in the target region is converted to a second equivalent position change of the lane line. By comparing the first equivalent position change with the second equivalent position change, it may be determined whether a position change of the lane line occurs in the target region between the first time point and the second time point.

The technical solution of the present disclosure effectively solves the problem of detecting the position change of the lane line for updating the high-definition map, and may accurately detect the position change of the lane line with a low cost. In detail, in the process of detecting the position change of the lane line based on the lane width by the low-precision device (e.g., the crowd-sourced device), the technical solution of the present disclosure may effectively exclude misidentifications caused by the region (e.g., the region corresponding to the opening of a median strip) where the change of the lane width is unstable, while retaining the region where the lane line actually changes. In addition, embodiments of the present disclosure have the following technical advantages.

First of all, the technical solution of the present disclosure does not require a sensing module to output an identification result of the region (for example, the region corresponding to the opening of a median strip) where the change of the lane width is unstable, and there is no need to identify a situation whether new and old lane lines coexist. In particular, the sensing algorithm required for identifying the situation whether new and old lane lines coexist is complex and difficult to be realized in practice. In this manner, the technical solution of the present disclosure is concise and effective, and computing resource requirements of the sensing module are reduced as additional processing by the sensing module is unnecessary.

Secondly, the technical solution of the present disclosure is efficient. Experimental results show that, for results collected by the low-precision device at a time, the technical solution of the present disclosure may filter out all the false identification results in a test road segment of about 30 kilometers on a certain road. When the results of different collections performed by the low-precision device are mutually confirmed, a better filtering effect will be obtained.

Thirdly, the technical solution of the present disclosure is flexible in processing and the follow-up manual workload is highly adjustable. For example, in some embodiments, a determination threshold for an area equivalent conversion method and a determination threshold for an azimuth angle equivalent conversion are set. For variation values of position changes of the lane line filtered by the above thresholds that exceed the above thresholds, if whether the position of the lane line changes is accurately determined in a manual manner, the variation values may be sorted by value. Manual review priority is given to cases where the variation value is large. Some example embodiments of the present disclosure are described below with reference to the accompanying drawings.

Example Environment

FIG. 1 is a schematic diagram of an example environment 100 in which some embodiments of the present disclosure may be implemented. As illustrated in FIG. 1, the example environment 100 may include a high-precision device 110, a low-precision device 120, and a computing device 130.

On the one hand, the high-precision device 110 collects road information and data of a road 150 at a first time point T1, and obtains first road data 115 of the road 150. The first road data 115 includes data and information related to a lane line 152 and a reference line 154 (e.g., a road edge line), which may indicate positions of the lane line 152 and the reference line 154 at the first time point T1, and so on. In addition, the high-precision device 110 provides the first road data 115 to the computing device 130 for processing.

In some embodiments, the high-precision device 110 may be a high-definition map collection vehicle equipped with a surveying-and-mapping-level high-precision sensor, which may perform collection on the road 150 based on a long collection period (for example, one month). In this case, the first road data 115 may be a high-definition map obtained after processing the road data collected by the high-precision device 110. In addition to the high-definition map collection vehicle, the high-precision device 110 may also include any other device for collecting data of the high-definition map. More generally, the high-precision device 110 may include any device capable of determining the position of a lane line or other road elements with high accuracy (e.g., an error below a threshold, such as 20 cm).

On the other hand, the low-precision device 120 collects road information and data of the road 150 at a second time point T2, the second time point being after the first time point T1, and obtains second road data 125 of the road 150. The second road data 125 also includes data and information related to the lane line 152 and the reference line 154, which may indicate positions of the lane line 152 and the reference line 154 at the second time point T2, and so on. In addition, the low-precision device 120 provides the second road data 125 to the computing device 130 for processing.

In some embodiments, the low-precision device 120 may be a driving recorder (also referred to herein as a crowd-sourced device) installed on a common vehicle, and may collect data of the road 150 more frequently and at a lower cost. In this case, the second road data 125 may be videos or images taken on the road 150 and/or satellite positioning data when the shooting is performed, and so on. More generally, the low-precision device 120 may include any device capable of determining the position of a lane line or other road elements with low accuracy (e.g., an error higher than a threshold, such as 20 cm).

The computing device 130 obtains the first road data 115 from the high-precision device 110, and obtains the second road data 125 from the low-precision device 120. As explained above, the computing device 130 may detect a position change of the lane line 152 by detecting a change of a distance (also broadly referred to herein as "lane width" for convenience of description) between the lane line 152 and the reference line 154. However, in some regions (which may also be referred to as a target region) where the change of the lane width is unstable, changes of the lane width caused by other reasons may be eliminated before the position change of the lane line 152 may be detected.

Therefore, the computing device 130 may determine a first change of the distance between the lane line 152 and the reference line 154 in the target region at the first time point T1 from the first road data 115. After that, the computing device 130 may convert the first change to a first equivalent position change of the lane line 152. Similarly, the computing device 130 may determine a second change of the distance between the lane line 152 and the reference line 154 in the target region at the second time point T2 from the second road data 125. After that, the computing device 130 may convert the second change to a second equivalent position change of the lane line 152.

Before determining the second equivalent position change, the computing device 130 may correct lane width data from the second road data 125 so that the first equivalent position change and the second equivalent position change obtained are comparable. By comparing the first equivalent position change and the second equivalent position change, the computing device 130 may determine whether the position of the lane line 152 changes in the target region between the first time point T1 and the second time point T2 due to the principle that the first change of the distance between the lane line 152 and the reference line 154 at the first time point T1 has been converted and expressed as the first equivalent position change. A difference obtained by subtracting the first equivalent position change from the second equivalent position change is a new variation value of the distance at the second time point T2.

In some embodiments, the computing device 130 may include any device capable of implementing computing functions and/or control functions, which may be any type of fixed computing device, mobile computing device, or portable computing device. The computing device 130 includes, but is not limited to, a special-purpose computer, a general-purpose computer, a desktop computer, a laptop computer, a notebook computer, a netbook computer, a tablet computer, a multimedia computer, a mobile phone, a general-purpose processor, a microprocessor, a microcontroller, or a state machine. The computing device 130 may also be implemented as a combination of individual computing devices or computing devices, for example, a combination of a digital signal processor (DSP) and a microprocessor, a plurality of microprocessors, one or more microprocessors combined with a DSP core, or any other such configuration. In addition, in the context of the present disclosure, the computing device 130 may also be referred to as an electronic device 130, and these two terms may be used interchangeably herein.

As used herein, the "lane line" refers to a solid or dashed line on a road that separates different lanes. The reference line refers to a marking line, an auxiliary line, a road edge line, etc. on a road extending substantially parallel to the lane line. In some embodiments, the reference line may include a road edge line, which represents a boundary of a portion of the road available for a vehicle. Here, "available for a vehicle" includes available for a vehicle under normal conditions and emergencies, such as parking or avoiding other vehicles in an emergency. For example, the road edge line may be a boundary of a curb located in the center of a road, or a boundary of an object (for example, a kerb) that protrudes from the ground in another form.

The definition of "road edge line" on both sides of a road is not given in Design Specification for Highway Alignment, but Section 4.2.5.1, "Lane Edge Lines", in Intelligent Transportation System—Intelligent Driving Map Data Model & Exchange Format Specification—Part 1: Motorway (draft for comments) gives a production principle of a "road edge line". In the production principle, if there is a curb, "when there is no lane line on the outermost side of a road, a line may be drawn along the intersection of the curb and the ground as the outermost lane line of the road". For the geometric shape of curbs, reference may be made to the section G.2, Cross Section Graphics in Concrete Curbs-JCT 899-2016. In practice, data of the road edge line is usually provided in the high-definition map, and the production principle of the road edge line is "drawing along the intersection of the curb and the ground".

As mentioned above, for brevity of description, sometimes the region between the lane line and the road edge line is imaged as a "lane" in the present disclosure, so the distance between the lane line and the road edge line may also be referred to as the "width of the lane". In addition, in the present disclosure, the lane line in question generally refers to a lane line on the road closest to the road edge line, for example, the innermost or outermost lane line of the road. However, it should be understood that embodiments of the present disclosure are not limited to this, and are equally applicable to other lane lines away from the road edge line.

In other embodiments, in addition to the road edge line, the reference line may also include another lane line different from the lane line in question. For example, the another lane line may be a lane line that forms a lane with the lane line in question. In this case, a distance between the lane line in question and the another lane line is the width of the lane. For another example, the another lane line may also be a lane line that belongs to a different lane from the lane line in question. In this case, the distance between the lane line in question and the another lane line may be width of several lanes.

In other words, in terms of the road elements, there are the following types of lane widths involved in the technical solution for detecting the position change of the lane line based on "lane width" proposed by embodiments of the present disclosure. The lane width of the first type is a lane width between the "left side road edge line" and the "leftmost lane line". The lane width of the second type is a lane width of "several middle lanes" from the "leftmost lane line" to the "rightmost lane line". The lane width of the third type is a lane width between the "rightmost lane line" and the "right side lane line". In some embodiments, the first and third types of lane widths in the above three types may be considered as the main types of changes as the redrawing of the position of a lane line is usually a redrawing of an outer lane line. Therefore, the following description of embodiments will take the first type of lane width as an example, but it should be understood that the principles of embodiments of the present disclosure are also applicable to the second and third types of lane widths.

In addition, it should be understood that FIG. 1 only schematically illustrates units, elements, modules, or components in the example environment 100 related to embodiments of the present disclosure. In practice, the example environment 100 may also include other units, elements, modules, or components for other functions. In addition, the specific numbers of the units, elements, modules, or components illustrated in FIG. 1 are only schematic and are not intended to limit the scope of the present disclosure in any way. In other embodiments, the example environment 100 may include any suitable number of high-precision devices, low-precision devices, and computing devices, etc. Therefore, embodiments of the present disclosure are not limited to the specific devices, units, elements, modules, or components described in FIG. 1, but are generally applicable to any technical environment that detects position changes of lane lines. The following describes an example process of an embodiment of the present disclosure with reference to FIGS. 2 to 4.

Example Process for Detecting a Position Change of a Lane Line

Figure 2:
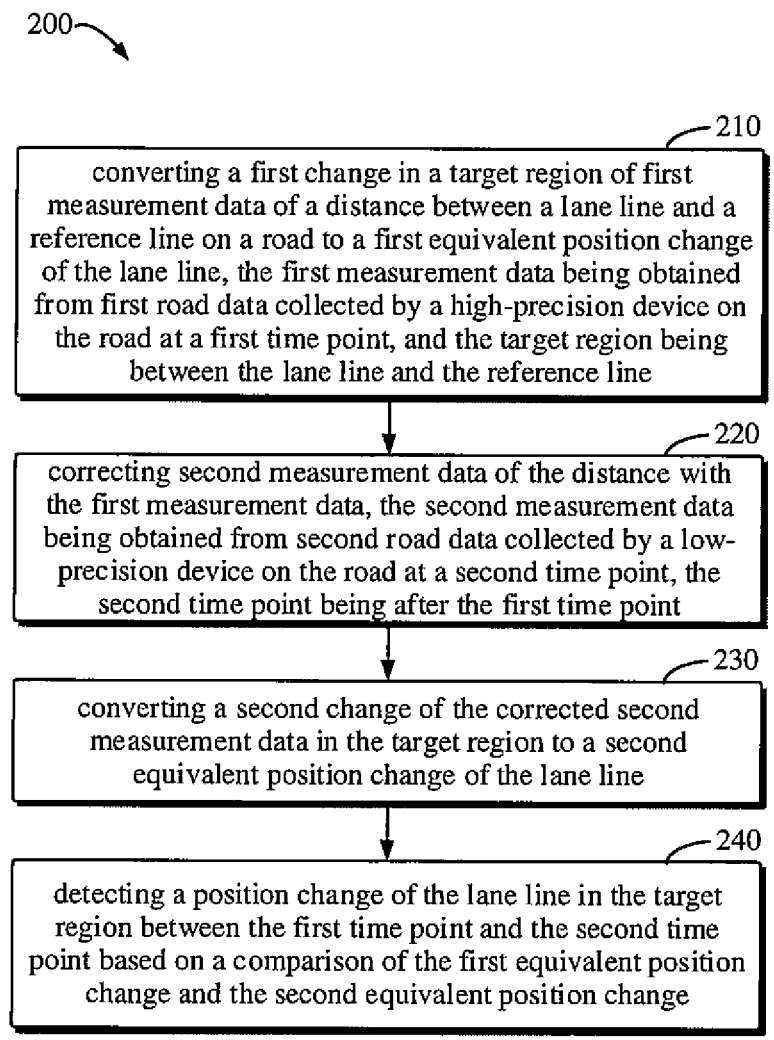
FIG. 2 is a flowchart of an example process of detecting a position change of a lane line according to an embodiment of the present disclosure.

FIG. 2 is a flowchart of an example process 200 of detecting a position change of a lane line according to an embodiment of the present disclosure. In some embodiments, the example process 200 may be implemented by the computing device 130 in the example environment 100, for example, may be implemented by a processor or a processing unit in the computing device 130, or implemented by various functional modules in the computing device 130. In other embodiments, the example process 200 may also be implemented by a computing device independent of the example environment 100, or may be implemented by other units or modules in the example environment 100.

Figure 3A:
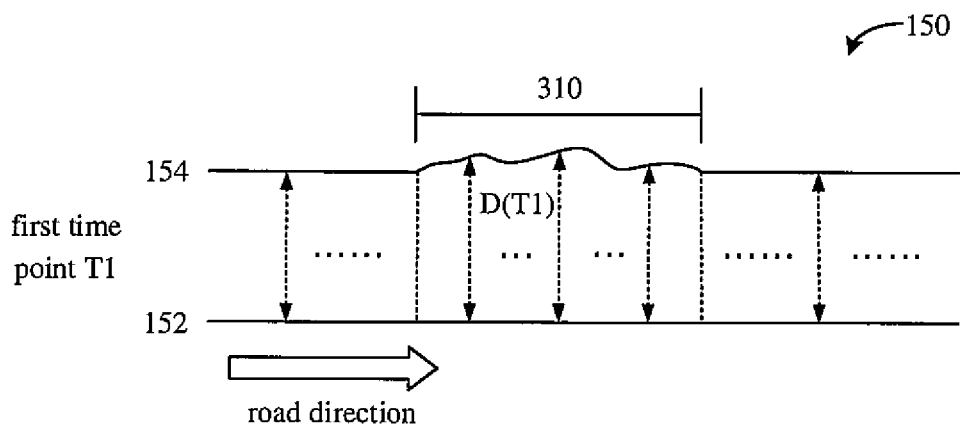
FIG. 3A is a schematic diagram of a first change in a target region of first measurement data of a distance between a lane line and a reference line according to an embodiment of the present disclosure.

FIG. 3A is a schematic diagram of a first change in a target region 310 of first measurement data D(T1) of a distance D between the lane line 152 and the reference line 154 according to an embodiment of the present disclosure. In FIG. 3A, the lane line 152 and the reference line 154 are schematic representations obtained from the first road data 115 collected by the high-precision device 110 on the road 150 at the first time point T. Therefore, the distance D(T1) between the lane line 152 and the reference line 154 illustrated in FIG. 3A is actually measurement data of a true distance D between the lane line 152 and the reference line 154 obtained from the first road data 115.

As illustrated in FIG. 3A, the first measurement data D(T1) changes in the target region 310, that is, the first measurement data D(T1) is of different measurement values at different positions in the target region 310. In the example of FIG. 3A, the change of the first measurement data D(T1) is caused by an irregular change of the reference line 154. For example, the target region 310 may correspond to an opening of a median strip of the road 150. In other words, in the target region 310, a real reference line may not exist, that is, the reference line is interrupted in the target region 310.

In this case, the reference line 154 may be simulated or fitted for the target region 310 in the first road data 115 collected by the high-precision device 110, thereby compensating the interrupted reference line 154 within the target region 310. Consequently, the first measurement data D(T1) still exists in the target region 310. However, as such fitting or simulation on the reference line 154 may generate a large error or instability, the first measurement data D(T1) changes within the target region 310.

Alternatively, the interrupted reference line in the target region 310 may not be simulated or fitted in the first road data 115. In this case, when the first measurement data D(T1) is obtained from the first road data 115, the computing device 130 may use a distance from the lane line 152 to another object (for example, a guardrail line, a vehicle passing through the opening of a median strip on the road 150, vegetation on the road 150, and other objects) as the first measurement data D(T1). Consequently, the first measurement data D(T1) may also change within the target region 310, and there is a large error or instability.

In other embodiments, the target region 310 may also correspond to another region that causes the distance between the lane line 152 and the reference line 154 to change, for example, a region where the lane line 152 or the reference line 154 jumps or changes irregularly. More generally, the target region 310 may be any region where the first measurement data D(T1) changes, regardless of the reason of such a change. In addition, it may be understood that the specific shapes, road directions, and other elements of the lane line 152 and the reference line 154 illustrated in FIG. 3A are merely schematic, and are not intended to limit the scope of the present disclosure in any way. In other embodiments, the lane line 152 and the reference line 154 may have any shape, and the road direction may be different from the direction illustrated in drawings.

Figure 3B:
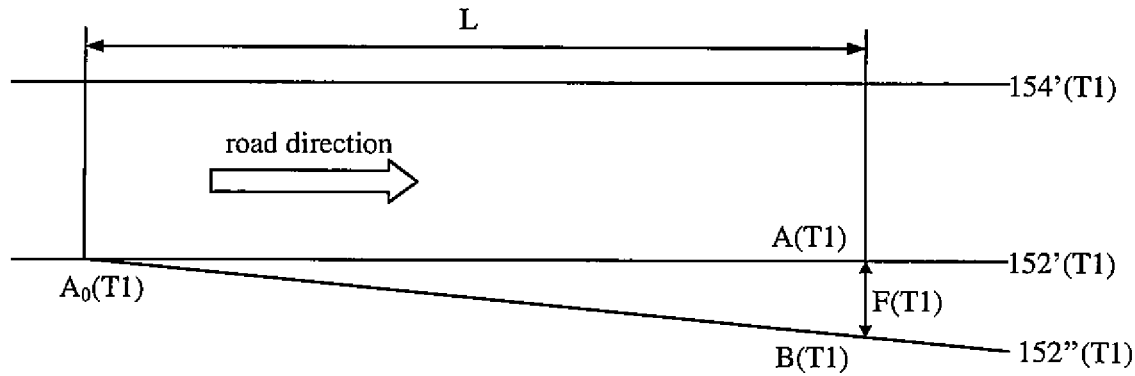
FIG. 3B is a schematic diagram of converting a first change of first measurement data to a first equivalent position change of a lane line according to an embodiment of the present disclosure.

FIG. 3B is a schematic diagram of converting the first change of the first measurement data D(T1) to a first equivalent position change of the lane line 152 according to an embodiment of the present disclosure. FIG. 3B illustrates a schematic diagram of an equivalent conversion for converting the first change of the first measurement data D(T1). The reference line 154'(T1) is an imaginary straight reference line for performing the equivalent conversion on the first change, not a real reference line. Similarly, the lane line 152'(T1) is an imaginary old lane line that is parallel to the reference line 154'(T1) and has a first reference point $A_0$(T1) and a second reference point A(T1). A length L between the two reference points is predetermined (for example, 50 meters).

In addition, a lane line 152"(T1) is an imaginary new lane line, which has an offset relative to the old lane line 152'(T1). The lane line 152"(T1) coincides with the old lane line 152'(T1) at the first reference point $A_0$(T1), and extends to a third reference point B(T1) at a position corresponding to a position of the second reference point A(T1) of the old lane line 152'(T1). An offset distance between A(T1) and B(T1) is represented as F(T1). Therefore, in some embodiments, the first change within the target region 310 of the first measurement data D(T1) in FIG. 3A may be converted to the position change F(T1) of the new lane line 152"(T1) relative to the old lane line 152'(T1) at the predetermined length L in FIG. 3B.

It should be understood that the relative positional relationship between the new lane line 152"(T1) and the old lane line 152'(T1) illustrated in FIG. 3B is only schematic and is not intended to limit the scope of the present disclosure in any way. In other embodiments, the new lane line 152"(T1) and the old lane line 152'(T1) may have any other suitable positional relationship. For example, the new lane line 152"(T1) may be parallel to the old lane line 152'(T1), and there is an offset between the new lane line 152"(T1) and the old lane line 152'(T1), so the offset may also be used to convert the first change of the first measurement data D(T1) in the target region 310. More generally, the imaginary reference line 154'(T1), the imaginary old lane line 152'(T1), and the imaginary new lane line 152"(T1) illustrated in FIG. 3B may have any positional relationship as long as the obtained position change between the new lane line 152"(T1) and the old lane line 152'(T1) may be used to measure the first change of the first measurement data D(T1) in the target region 310.

Figure 4A:
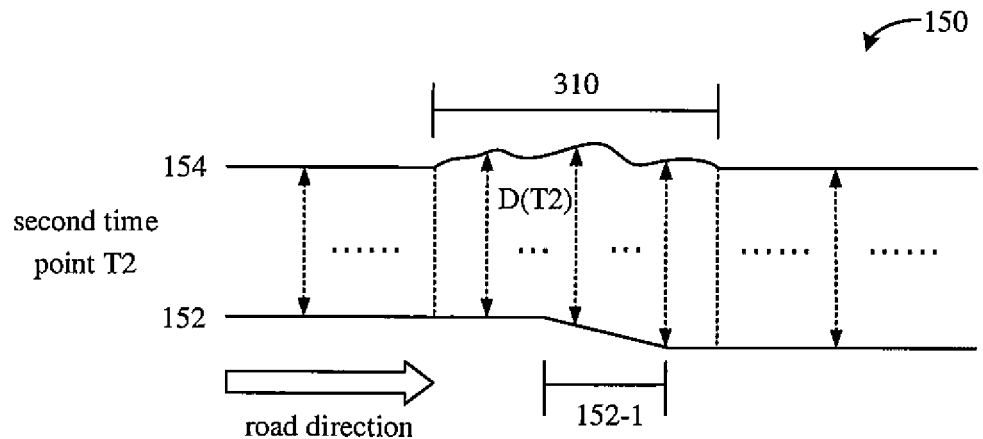
FIG. 4A is a schematic diagram of a second change in a target region of corrected second measurement data of a distance between a lane line and a reference line according to an embodiment of the present disclosure.

Similarly, FIG. 4A is a schematic diagram of a second change in the target region 310 of corrected second measurement data D(T2) of the distance between the lane line 152 and the reference line 154 according to an embodiment of the present disclosure. In FIG. 4A, the lane line 152 and the reference line 154 are schematic representations obtained from the second road data 125 collected by the low-precision device 120 on the road 150 at a second time point T2 after the first time point T1. Therefore, the distance D(T2) between the lane line 152 and the reference line 154 illustrated in FIG. 4A is actually the measurement data obtained from the second road data 125 for the true distance D between the lane line 152 and the reference line 154. In addition, the measurement data is corrected before being used to determine the change of the distance D.

As illustrated in FIG. 4A, the corrected second measurement data D(T2) changes within the target region 310. That is, at different positions within the target region 310, the corrected second measurement data D(T2) is of different measured values. In the example of FIG. 4A, the change of the corrected second measurement data D(T2) is caused by an irregular change of the reference line 154 and a change of a lane line segment 152-1 of the lane line 152. That is, the position of the lane line 152 changes at a time point between the first time point T1 and the second time point T2. In addition, as mentioned above, in some embodiments, the target region 310 may correspond to the opening of a median strip of the road 150.

Therefore, in the target region 310, a real reference line may not exist, that is, the reference line is interrupted in the target region 310. In this case, the reference line 154 may be simulated or fitted for the target region 310 in the second road data 125 collected by the low-precision device 120, so as to compensate the interrupted reference line in the target region 310. However, such fitting or simulation of the reference line 154 may generate a large error or instability, such that the corrected second measurement data D(T2) changes within the target region 310.

Alternatively, the interrupted reference line in the target region 310 may not be simulated or fitted in the second road data 125. In this case, when the second measurement data D(T2) is obtained from the second road data 125, the computing device 130 may use a distance from the lane line 152 to another object (for example, a guardrail line, a vehicle passing through the opening of a median strip on the road 150, vegetation on the road 150, and other objects) as the second measurement data D(T2). Consequently, the corrected second measurement data D(T2) may also change within the target region 310, and there is a large error or instability.

As mentioned above, in other embodiments, the target region 310 may also correspond to another region that causes the distance between the lane line 152 and the reference line 154 to change, for example, a region where the lane line 152 or the reference line 154 jumps or changes irregularly. More generally, the target region 310 may be any region where the corrected second measurement data D(T2) changes, regardless of the reason of such a change.

On the other hand, unlike the lane line 152 at the first time point T1, the position of the lane line 152 at the second time point T2 changes (e.g., is redrawn) at the lane line segment 152-4. Therefore, the lane line segment 152-1 also causes the second change of the corrected second measurement data D(T2) within the target region 310. In addition, it may be understood that the specific shapes, road directions, and other elements of the lane line 152 and the reference line 154 illustrated in FIG. 4A are merely schematic, and are not intended to limit the scope of the present disclosure in any way. In other embodiments, the lane line 152 and the reference line 154 may have any shape, and the road direction may be different from the direction illustrated in FIGs.

Figure 4B:
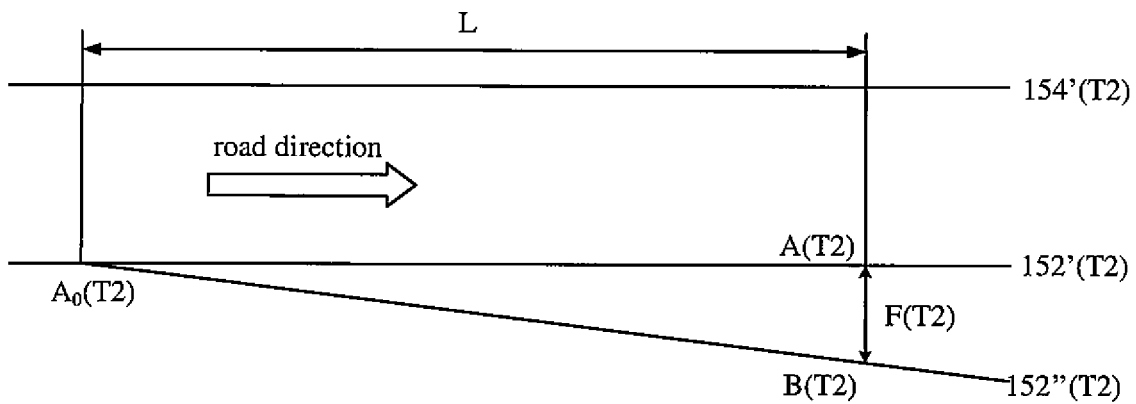
FIG. 4B is a schematic diagram of converting a second change of corrected second measurement data to a second equivalent position change of a lane line according to an embodiment of the present disclosure.

FIG. 4B is a schematic diagram of converting the second change of the corrected second measurement data D(T2) to a second equivalent position change of the lane line 152 according to an embodiment of the present disclosure. FIG. 4B illustrates a schematic diagram of an equivalent conversion for converting the second change of the corrected second measurement data D(T2). The reference line 154' (T2) is an imaginary straight reference line for performing the equivalent conversion on the second change, not a real reference line. Similarly, the lane line 152'(T2) is an imaginary old lane line that is parallel to the reference line 154'(T2) and has a first reference point $A_0(T2)$ and a second reference point A(T2). A length L between the two reference points is predetermined (for example, 50 meters).

In addition, a lane line 152"(T2) is an imaginary new lane line, which has an offset relative to the old lane line 152'(T2). The lane line 152"(T2) coincides with the old lane line 152'(T2) at the first reference point $A_0(T2)$, and extends to a third reference point B(T2) at a position corresponding to a position of the second reference point A(T2) of the old lane line 152'(T2). An offset distance between A(T2) and B(T2) is represented as F(T2). Therefore, in some embodiments, the second change within the target region 310 of the corrected second measurement data D(T2) in FIG. 4A may be converted to the position change F(T2) of the new lane line 152"(T2) relative to the old lane line 152'(T2) in FIG. 4B.

It should be understood that the relative positional relationship between the new lane line 152"(T2) and the old lane line 152'(T2) illustrated in FIG. 4B is only schematic and is not intended to limit the scope of the present disclosure in any way. In other embodiments, the new lane line 152"(T2) and the old lane line 152'(T2) may have any other suitable positional relationship. For example, the new lane line 152"(T2) may be parallel to the old lane line 152'(T2), and there is an offset between the new lane line 152"(T2) and the old lane line 152'(T2), so the offset may also be used to convert the second change of the corrected second measurement data D(T2) in the target region 310.

More generally, the imaginary reference line 154'(T2), the imaginary old lane line 152'(T2), and the imaginary new lane line 152"(T2) illustrated in FIG. 4B may have any positional relationship as long as the obtained position change between the new lane line 152"(T2) and the old lane line 152'(T2) may be used to measure the second change of the corrected second measurement data D(T2) in the target region 310. In addition, although FIG. 4B illustrates a schematic diagram of an equivalent conversion that is the same as or similar to FIG. 3B, in other embodiments, a equivalent conversion manner of the first change of the first measurement data D(T1) may be different from a equivalent conversion manner of the second change of the corrected second measurement data D(T2).

Referring to FIGS. 2, 3A, and 3B, at block 210, the computing device 130 converts the first change in the target region 310 of the first measurement data D(T1) of the distance D between the lane line 152 and the reference line 154 on the road 150 to the first equivalent position change F(T1) of the lane line 152. As illustrated in FIG. 3A, in the target region 310, the first measurement data D(T1) changes. For example, in this example, the change of the first measurement data D(T1) is resulted from the change of the reference line 154. In detail, in the target region 310, the first measurement data D(T1) sometimes becomes large and sometimes becomes small along the road direction. However, it should be understood that such a particular change manner of the first measurement data D(T1) is only exemplary and is not intended to limit the scope of the present disclosure in any way. In other embodiments, the first measurement data D(T1) may change in the target region 310 in any other manner. For example, the first measurement data D(T1) may gradually decrease, gradually increase, jump, and so on in the target region 310. In other embodiments, the change of the first measurement data D(T1) in the target region 310 may also be caused by measurement errors.

In general, the computing device 130 may use any suitable manner to convert the first change of the first measurement data D(T1) illustrated in FIG. 3A to the first equivalent position change F(T1) illustrated in FIG. 3B. For example, the computing device 130 may directly consider an overall change of the first measurement data D(T1) in the target region 310 as the offset distance between two parallel old and new lane lines. In other embodiments, in order to more accurately convert the first change to the first equivalent position change F(T1) of the lane line 152, the computing device 130 may perform the above conversion based on an area equivalent conversion. Such examples will be described further below.

As described above, the first measurement data D(T1) is obtained from the first road data 115 collected by the high-precision device 110. In detail, the computing device 130 may obtain the first measurement data D(T1) from the first road data 115 in any suitable manner, which may depend on a specific form of the first road data 115. In some embodiments, the first road data 115 collected by the high-precision device 110 on the road 150 may directly include the first measurement data D(T1) between the lane line 152 and the reference line 154. For example, when performing collection on the road 150, the high-precision device 110 may directly measure the distance between the lane line 152 and the reference line 154. In this case, the computing device 130 may directly extract the first measurement data D(T1) from the first road data 115.

Alternatively, in other embodiments, the first road data 115 collected by the high-precision device 110 on the road 150 may not directly include the first measurement data D(T1) between the lane line 152 and the reference line 154. For example, the first road data 115 may be a high-definition map formed after processing the data collected by the high-precision device 110. The first road data 115 may include data and information about the lane line 152 and the reference line 154, but may not directly include data of the distance between the lane line 152 and the reference line 154. In this case, the computing device 130 may derive or calculate the first measurement data D(T1) from the first road data 115. Such examples will be described further below.

After obtaining the first measurement data D(T1), the computing device 130 may determine, based on the first measurement data D(T1), the first change of the first measurement data D(T1) in the target region 310 in any suitable manner. For example, in some embodiments, the computing device 130 may express the first measurement data D(T1) as a function of coordinate positions on the lane line 152 or the reference line 154. In such an embodiment, the computing device 130 may mathematically process the function of the first measurement data D(T1), such as solving a first-order derivative function or a second-order derivative function of the function. Furthermore, the computing device 130 may analyze and obtain the first change of the first measurement data D(T1) in the target region 310. Alternatively, in other embodiments, the computing device 130 may determine the first change of the first measurement data D(T1) based on the manner of sampling lane line data of the lane line 152. Such examples will be described further below.

Referring to FIG. 2, at block 220, the computing device 130 corrects the second measurement data D(T2) of the distance D between the lane line 152 and the reference line 154 with the first measurement data D(T1). The second measurement data D(T2) is obtained from the second road data 125 collected by the low-precision device 120 on the road 150 at the second time point T2 after the first time point T1.

As noted above, although the low-precision device 120 (e.g., the crowd-sourced device) may identify the change of the distance (also referred to as the lane width) between the lane line 152 and the reference line 154, a large error exists between the lane width identified and the true lane width due to interference factors such as intrinsic and extrinsic parameters of a camera in the low-precision device 120 (such as the consumer-level driving recorder), shadows and occlusions. In addition, for one lane, lane widths measured by different low-precision devices may also be different, and lane widths measured by the same low-precision device at different time points may also be different. Consequently, the second measurement data D(T2) identified by the low-precision device 120 may not be accurately compared with the first measurement data D(T1) identified by the high-precision device 110, and similar processing cannot be performed on the second measurement data D(T2) and the first measurement data D(T1).

Therefore, in order to improve the accuracy of the second equivalent position change later obtained based on the second measurement data D(T2) so as to improve the accuracy of the detected position change of the lane line, the computing device 130 may use the first measurement data D(T1) with a high accuracy obtained from the high-precision device 110 to correct the second measurement data D(T2) with a low accuracy obtained from the low-precision device 120. In general, the computing device 130 may correct the second measurement data D(T2) based on the first measurement data D(T1) in any suitable manner. For example, the computing device 130 may calculate a ratio of measurement values of the first measurement data D(T1) and the second measurement data D(T2) at a certain coordinate position. The computing device 130 may then use the ratio to correct the second measurement data D(T2).

For another example, the computing device 130 may calculate a ratio between two average values of the first measurement data D(T1) and the second measurement data D(T2) on the road 150. The computing device 130 may use the ratio between the two average values to correct the second measurement data D(T2). In other embodiments, the computing device 130 may also use the first measurement data D(T1) to correct the second measurement data D(T2) based on a road segment (the lane line segment of the predetermined length corresponding to the lane line 152) of the predetermined length of the road 150. Such examples will be described further below.

Referring to FIGS. 2, 4A, and 4B, at block 230, the computing device 130 converts the second change of the corrected second measurement data D(T2) in the target region 310 to the second equivalent position change F(T2) of the lane line 152. As illustrated in FIG. 4A, in the target region 310, the corrected second measurement data D(T2) changes. For example, in this example, the change of the corrected second measurement data D(T2) is resulted from the change of the reference line 154 and the lane line segment 152-1. In detail, in the target region 310, the corrected second measurement data D(T2) sometimes becomes large and sometimes becomes small along the road direction, and gradually increases in the lane line segment 152-1. However, it should be understood that such a particular change manner of the corrected second measurement data D(T2) is only exemplary and is not intended to limit the scope of the present disclosure in any way. In other embodiments, the corrected second measurement data D(T2) may change in the target region 310 in any other manner. For example, the corrected second measurement data D(T2) may gradually decrease, jump, and so on in the target region 310. In other embodiments, the change of the corrected second measurement data D(T2) may also be caused by measurement errors.

Similar to block 210, the computing device 130 may use any suitable manner to convert the second change of the corrected second measurement data D(T2) illustrated in FIG. 4A to the second equivalent position change F(T2) illustrated in FIG. 4B. For example, the computing device 130 may directly consider an overall change of the corrected second measurement data D(T2) in the target region 310 as an offset distance between two parallel old and new lane lines. In other embodiments, in order to more accurately convert the second change to the second equivalent position change F(T2) of the lane line 152, the computing device 130 may perform the above conversion based on the area equivalent conversion. Such examples will be described further below.

As described above, the second measurement data D(T2) is obtained from the second road data 125 collected by the low-precision device 120. In detail, the computing device 130 may obtain the second measurement data D(T2) from the second road data 125 in any suitable manner, which may depend on a specific form of the second road data 125. In some embodiments, the second road data 125 collected by the low-precision device 120 on the road 150 may directly include the second measurement data D(T2) between the lane line 152 and the reference line 154. For example, when performing collection on the road 150, the low-precision device 120 may directly measure the distance between the lane line 152 and the reference line 154. In this case, the computing device 130 may directly extract the second measurement data D(T2) from the second road data 125.

Alternatively, in other embodiments, the second road data 125 collected by the low-precision device 120 on the road 150 may not directly include the second measurement data D(T2) between the lane line 152 and the reference line 154. For example, the second road data 125 may be a video or an image presenting the lane line 152 and the reference line 154 taken by the low-precision device 120. The second road data 125 may include data and information about the lane line 152 and the reference line 154, but may not directly include data of the distance between the lane line 152 and the reference line 154. In this case, the computing device 130 may derive or calculate the second measurement data D(T2) from the second road data 125. Such examples will be described further below.

After obtaining the corrected second measurement data D(T2), the computing device 130 may determine, based on the corrected second measurement data D(T2), the second change in the target region 310 of the corrected second measurement data D(T2) in any suitable manner. For example, in some embodiments, the computing device 130 may express the corrected second measurement data D(T2) as a function of coordinate positions on the lane line 152 or the reference line 154. In such an embodiment, the computing device 130 may mathematically process the function of the corrected second measurement data D(T2), such as solving a first-order derivative function or a second-order derivative function of the function. Furthermore, the computing device 130 may analyze and obtain the second change of the corrected second measurement data D(T2) in the target region 310. Alternatively, in other embodiments, the computing device 130 may determine the second change of the corrected second measurement data D(T2) based on the manner of sampling lane line data of the lane line 152. Such examples will be described further below.

Referring to FIGS. 2, 3B, and 4B, at block 240, the computing device 130 detects the position change of the lane line 152 in the target region 310 between the first time point T1 and the second time point T2 based on a comparison of the first equivalent position change F(T1) and the second equivalent position change F(T2). As described above, in the example of FIG. 3A, the first change (including the change caused by the reference line 154) of a first measurement distance D(T1) within the target region 310 is equivalently expressed by the first equivalent position change F(T1), which may represent the change in the target region 310 of the distance D between the lane line 152 and the reference line 154 at the first time point T1.

On the other hand, in the example of FIG. 4A, the second change (including changes caused by the reference line 154 and the lane line segment 152-1) of a corrected second measurement distance D(T2) within the target region 310 is equivalently expressed by the second equivalent position change F(T2), which may represent the change in the target region 310 of the distance D between the lane line 152 and the reference line 154 at the second time point T2.

Therefore, by comparing the first equivalent position change F(T1) with the second equivalent position change F(T2), the computing device 130 may determine the change of the lane line 152 (the lane line segment 152-1 in this example) between the first time point T1 and the second time point T2. More specifically, in some embodiments, the computing device 130 may determine a difference between the first equivalent position change F(T1) and the second equivalent position change F(T2). If the above difference reaches the threshold, the computing device 130 may determine that the lane line 152 has a position change within the target region 310. On the other hand, if the above-mentioned difference does not reach the threshold, the computing device 130 may determine that the lane line 152 does not have a position change within the target region 310, and the difference is considered to be caused by factors such as measurement errors. In practice, the threshold may be set by those skilled in the art based on specific accuracy requirements and technical environment.

Example Process for Determining an Equivalent Position Change Based on an Area Equivalent Conversion As mentioned above when describing block 210 of the example process 200, the computing device 130 may convert the first change of the first measurement data D(T1) to the first equivalent position change of the lane line 152 based on the area equivalent conversion. Such examples will be described below with reference to FIGS. 5 to 7.

Figure 5:
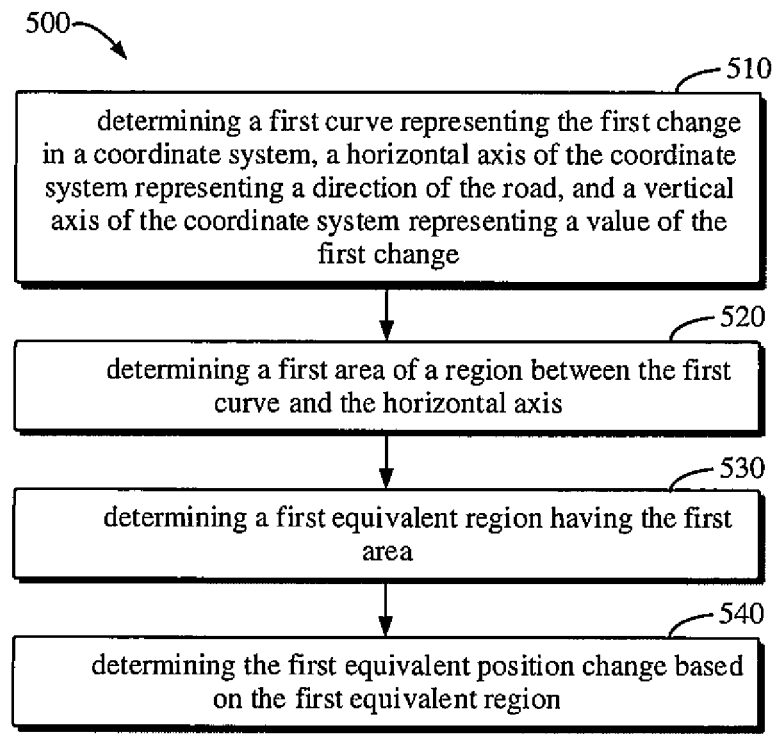
FIG. 5 is a flowchart of an example process of determining a first equivalent position change based on an area equivalent conversion according to an embodiment of the present disclosure.

FIG. 5 is a flowchart of an example process 500 of determining the first equivalent position change F(T1) based on the area equivalent conversion according to an embodiment of the present disclosure. In some embodiments, the example process 500 may be implemented by the computing device 130 in the example environment 100. For example, the example process 500 may be implemented by a processor or a processing unit in the computing device 130, or implemented by various functional modules in the computing device 130. In other embodiments, the example process 500 may also be implemented by a computing device independent of the example environment 100, or may be implemented by other units or modules in the example environment 100.

Figure 6:
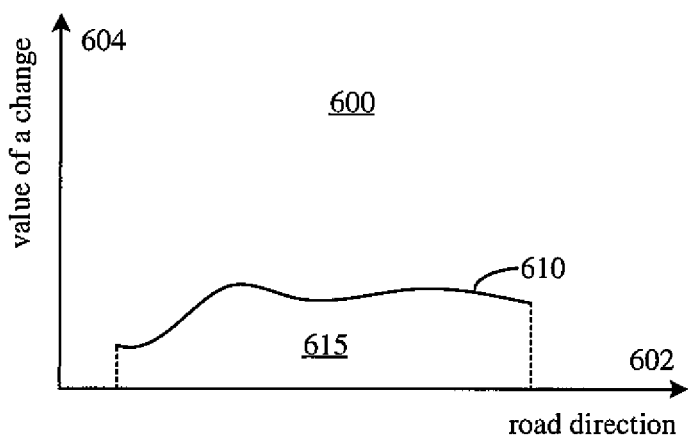
FIG. 6 is a schematic diagram of a first curve of a first change of first measurement data in a target region according to an embodiment of the present disclosure.

FIG. 6 is a schematic diagram of a first curve 610 of the first change of the first measurement data D(T1) in the target region 310 according to an embodiment of the present disclosure. In FIG. 6, a horizontal axis 602 of a coordinate system 600 may represent a distance extending along the road direction, and the unit of the distance may be meters or other suitable length units. A vertical axis 604 of the coordinate system 600 may represent a value of the first change of the first measurement data D(T1) in the target region 310, and the unit of the value of the first change may be the same as that of the horizontal axis 602. A start point and an end point of the first curve 610 on the horizontal axis 602 may correspond to the start point and the end point of the target region 310, respectively. It may be understood that the specific shape of the first curve 610 illustrated in FIG. 6 is only schematic and is not intended to limit the scope of the present disclosure in any way. In other embodiments, the first curve 610 may have any suitable shape.

Figure 7:
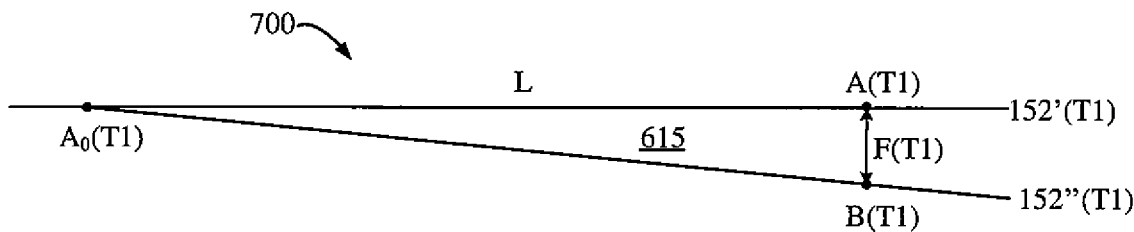
FIG. 7 is a schematic diagram of a first equivalent region according to an embodiment of the present disclosure.

FIG. 7 is a schematic diagram of a first equivalent region 700 according to an embodiment of the present disclosure. In this example, FIG. 7 is actually a part of FIG. 3B. It should be understood that the specific shape of the first equivalent region 700 illustrated in FIG. 7 is only schematic and is not intended to limit the scope of the present disclosure in any way. In other embodiments, the first equivalent region for converting the first change of the first measurement data D(T1) to the first equivalent position change of the lane line 152 may be of any suitable shape as long as such a conversion function may be implemented.

Referring to FIGS. 5 and 6, at block 510, the computing device 130 may determine the first curve 610 in the coordinate system 600 that represents the first change of the first measurement data D(T1) within the target region 310. In general, the computing device 130 may determine the first curve 610 in any suitable manner. For example, in a case where the first measurement data D(T1) is expressed in a form of a function, the computing device 130 may obtain the first curve 610 by mathematical manners such as deriving the function and the like. In other embodiments, the computing device 130 may also fit the first curve 610 by sampling on the lane line 152 or the reference line 154. For example, for a specific sampling point, the computing device 130 may determine a difference between first measurement data D(T1) corresponding to a sampling point before the specific sampling point and first measurement data D(T1) corresponding to a sampling point after the specific sampling point as a variation value of the specific sampling point.

In addition, in another embodiment, in order to eliminate unfavorable factors such as jump errors that may exist at certain sampling points, for a specific sampling point on the lane line 152, the computing device 130 may determine a difference between an average value of distances from a plurality of sampling points before the specific sampling point to the reference line 154 and an average value of distances from a plurality of sampling points after the specific sampling point to the reference line 154 so as to determine a variation value of the specific sampling point. Such examples will be described further below.

Furthermore, in some embodiments, the first curve 610 may be a corrected first change obtained by subtracting a fixed length from the first change in the target region 310 of the first measurement data D(T1) that is actually obtained by the computing device 130. For example, the fixed length may correspond to the width of the lane line 152, such as 0.2 meters. In this manner, the computing device 130 may exclude changes of the first measurement data D(T1) that are less than the width of the lane line 152. This is because that, in practice, if the position change of the lane line 152 is less than the width of the lane line 152, the position change of the lane line 152 is deemed as not occurred. In other embodiments, those skilled in the art may also determine the value of the fixed length based on actual accuracy requirements and technical environment.

Referring to FIGS. 5 and 6, at block 520, the computing device 130 may determine a first area 615 of a region between the first curve 610 and the horizontal axis 602. It should be understood that any suitable manner may be used to determine the first area 615. For example, if the first curve 610 is represented in the form of a function, the computing device 130 may solve the first area 615 through a mathematical method (e.g., integral operation). For another example, in a case where the computing device 130 fits the first curve 610 by sampling, the computing device 130 may obtain the first area 615 by determining an area corresponding to each sampling point. Such examples will be described further below.

Referring to FIGS. 5 and 7, at block 530, the computing device 130 may determine a first equivalent region 700 having the first area 615. For example, in the example of FIG. 7, the first equivalent region 700 is a right-angled triangle region, and a length L of one right-angle side A0(T1)A(T1) may be predetermined as, for example, 50 meters. A length of the other right-angle side A(T1)B(T1) of the first equivalent region 700 may represent the first equivalent position change F(T1) of the lane line 152. Therefore, by using the equivalent region of the right-angled triangle 700, the processing process of the computing device 130 for determining the first equivalent position change F(T1) may be simplified.

However, it should be noted that the shape of the first equivalent region 700 is not limited to the right-angled triangle, but may be any shape, for example, rectangular, square, trapezoidal, etc., that may be configured to convert the first change of the first measurement data D(T1) to the first equivalent position change of the lane line 152. In addition, it should be understood that any specific numerical values listed herein are merely exemplary and are not intended to limit the scope of the present disclosure in any way. In other embodiments, any of the above-mentioned numerical values may be other suitable values.

Referring to FIGS. 5 and 7, at block 540, the computing device 130 may determine the first equivalent position change F(T1) based on the first equivalent region 700. For example, in the example of FIG. 7, the computing device 130 may solve, based on the area formula of a triangle, the first equivalent position change F(T1) according to the first area 615 and the known length L of the right-angle side A0(T1)A(T1), that is, twice the first area 615 divided by the length L. Of course, it should be understood that the specific process of determining the first equivalent position change F(T1) may vary as the specific shape of the first equivalent region adopted changes.

The method of the example process 500 described above is also referred to herein as the "area equivalent conversion method". Through the example process 500, the computing device 130 may convert the first change of the first measurement data D(T1) in the target region 310 to the first equivalent position change F(T1) of the lane line 152 by means of accurate area calculation and equivalent area conversion, such that the accuracy of detecting the position change of the lane line 152 in the target region 310 may be improved.

As mentioned above when describing block 230 of the example process 200, the computing device 130 may convert the second change of the corrected second measurement data D(T2) to the second equivalent position change of the lane line 152 based on the area equivalent conversion. Such examples will be described below with reference to FIGS. 8 to 10.

Figure 8:
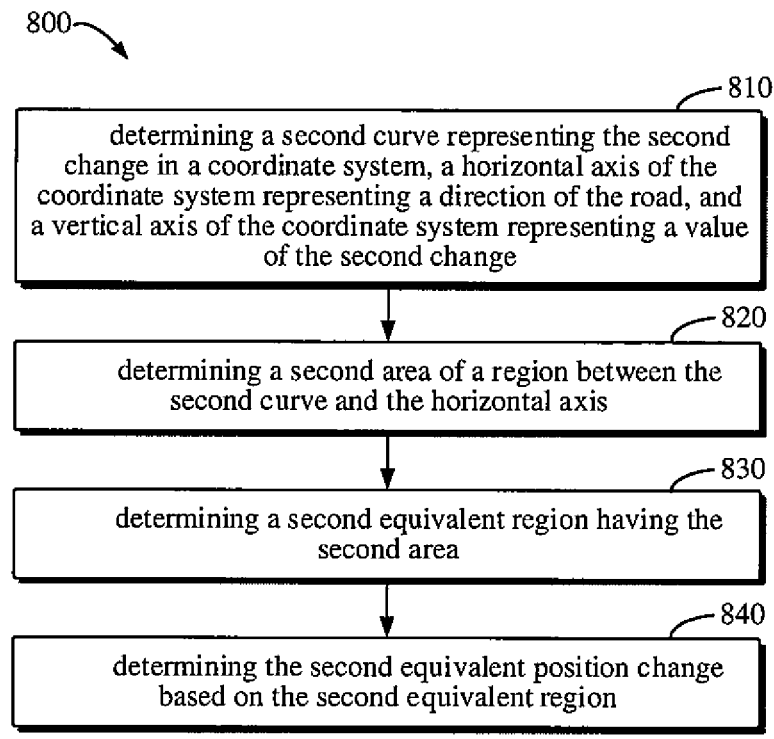
FIG. 8 is a flowchart of an example process of determining a second equivalent position change based on an area equivalent conversion according to an embodiment of the present disclosure.

FIG. 8 is a flowchart of an example process 800 of determining the second equivalent position change F(T2) based on the area equivalent conversion according to an embodiment of the present disclosure. In some embodiments, the example process 800 may be implemented by the computing device 130 in the example environment 100. For example, the example process 800 may be implemented by a processor or a processing unit in the computing device 130, or implemented by various functional modules in the computing device 130. In other embodiments, the example process 800 may also be implemented by a computing device independent of the example environment 100, or may be implemented by other units or modules in the example environment 100.

Figure 9:
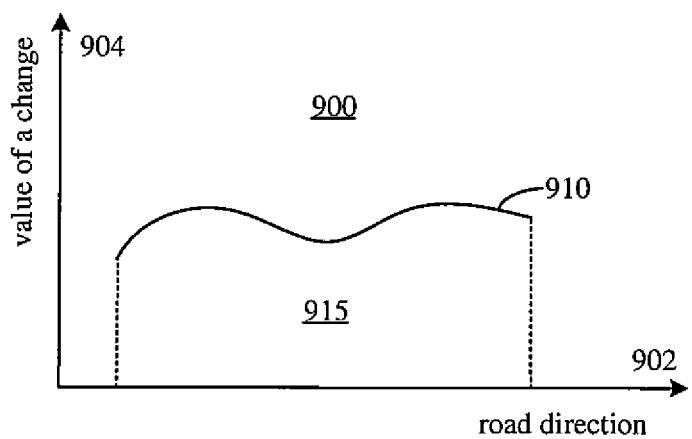
FIG. 9 is a schematic diagram of a second curve of a second change of corrected second measurement data in a target region according to an embodiment of the present disclosure.

FIG. 9 is a schematic diagram of a second curve 910 of the second change of the corrected second measurement data D(T2) in the target region 310 according to an embodiment of the present disclosure. In FIG. 9, a horizontal axis 902 of a coordinate system 900 may represent a distance extending along the road direction, and the unit of the distance may be meters or other suitable length units. A vertical axis 904 of the coordinate system 900 may represent a value of the second change of the corrected second measurement data D(T2) in the target region 310, and the unit of the value of the second change may be the same as that of the horizontal axis 902. The start point and the end point of the second curve 910 on the horizontal axis 902 may correspond to the start point and the end point of the target region 310, respectively. It may be understood that the specific shape of the second curve 910 illustrated in FIG. 9 is only schematic and is not intended to limit the scope of the present disclosure in any way. In other embodiments, the second curve 910 may have any suitable shape.

Figure 10:
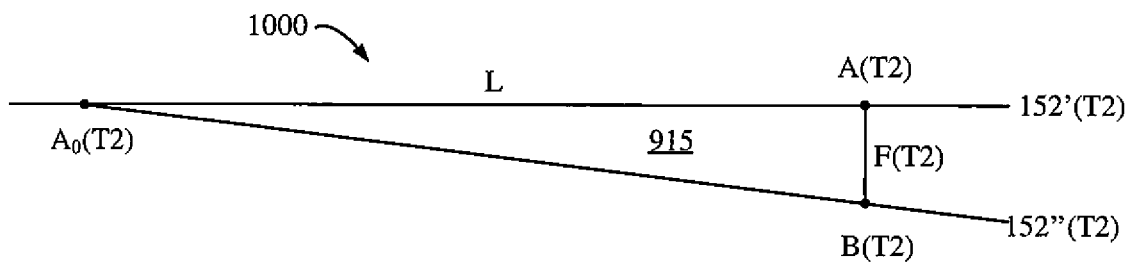
FIG. 10 is a schematic diagram of a second equivalent region according to an embodiment of the present disclosure.

FIG. 10 is a schematic diagram of a second equivalent region 1000 according to an embodiment of the present disclosure. In this example, FIG. 10 is actually a part of FIG. 4B. It should be understood that the specific shape of the second equivalent region 1000 illustrated in FIG. 10 is only schematic and is not intended to limit the scope of the present disclosure in any way. In other embodiments, the second equivalent region for converting the second change of the corrected second measurement data D(T2) to the second equivalent position change of the lane line 152 may be of any suitable shape as long as such a conversion function may be implemented.

Referring to FIGS. 8 and 9, at block 810, the computing device 130 may determine the second curve 910 in the coordinate system 900 that represents the second change of the corrected second measurement data D(T2) within the target region 310. In general, the computing device 130 may determine the second curve 910 in any suitable manner. For example, in a case where the corrected second measurement data D(T2) is expressed in the form of a function, the computing device 130 may obtain the second curve 910 by mathematical manners such as deriving the function and the like. In other embodiments, the computing device 130 may also fit the second curve 910 by sampling on the lane line 152 or the reference line 154. For example, for a specific sampling point, the computing device 130 may determine a difference between corrected second measurement data D(T2) corresponding to a sampling point before the specific sampling point and corrected second measurement data D(T2) corresponding to a sampling point after the specific sampling point as a variation value of the specific sampling point.

In addition, in another embodiment, in order to eliminate unfavorable factors such as jump errors that may exist at certain sampling points, for a specific sampling point on the lane line 152, the computing device 130 may determine a difference between an average value of distances from a plurality of sampling points before the specific sampling point to the reference line 154 and an average value of distances from a plurality of sampling points after the specific sampling point to the reference line 154 so as to determine a variation value of the specific sampling point. Such examples will be described further below.

Furthermore, in some embodiments, the second curve 910 may be a corrected second change obtained by subtracting a fixed length from the second change of the corrected second measurement data D(T2) in the target region 310 that is actually obtained by the computing device 130. For example, the fixed length may correspond to the width of the lane line 152, such as 0.2 meters. In this manner, the computing device 130 may exclude changes of the corrected second measurement data D(T2) that are less than the width of the lane line 152 f. This is because that, in practice, if the position change of the lane line 152 is less than the width of the lane line 152, the position change of the lane line 152 is deemed as not occurred. In other embodiments, those skilled in the art may also determine the value of the fixed length based on actual accuracy requirements and technical environment.

Referring to FIGS. 8 and 9, at block 820, the computing device 130 may determine a second area 915 of a region between the second curve 910 and the horizontal axis 902. It should be understood that any suitable manner may be used to determine the second area 915. For example, if the second curve 910 is represented in the form of a function, the computing device 130 may solve the second area 915 through a mathematical method (e.g., integral operation). For another example, in a case where the computing device 130 fits the second curve 910 by sampling, the computing device 130 may obtain the second area 915 by determining an area corresponding to each sampling point. Such examples will be described further below.

Referring to FIGS. 8 and 10, at block 830, the computing device 130 may determine a second equivalent region 1000 having the second area 915. For example, in the example of FIG. 10, the second equivalent region 1000 is a right-angled triangle region, and a length L of one right-angled side A0(T2)A(T2) may be predetermined as, for example, 50 meters. The length of the other right-angled side A(T2)B(T2) of the second equivalent region 1000 may represent the second equivalent position change F(T2) of the lane line 152. Therefore, by using the equivalent region of the right-angled triangle 1000, the processing process of the computing device 130 for determining the second equivalent position change F(T2) may be simplified.

However, it should be noted that the shape of the second equivalent region 1000 is not limited to the right-angled triangle, but may be any shape, for example, rectangular, square, trapezoidal, etc., that may be configured to convert the second change of the corrected second measurement data D(T2) to the second equivalent position change of the lane line 152. The shape of the second equivalent region 1000 may be different from that of the first equivalent region 700. In addition, it should be understood that any specific numerical values listed herein are merely exemplary and are not intended to limit the scope of the present disclosure in any way. In other embodiments, any of the above-mentioned numerical values may be other suitable values.

Referring to FIGS. 8 and 10, at block 840, the computing device 130 may determine the second equivalent position change F(T2) based on the second equivalent region 1000. For example, in the example of FIG. 10, the computing device 130 may solve, based on the area formula of a triangle, the second equivalent position change F(T2) through the second area 915 and the known length L of the right-angle side A0(T2)A(T2), that is, twice the second area 915 divided by the length L. Of course, it should be understood that the specific process of determining the second equivalent position change F(T2) may vary as the specific shape of the second equivalent region adopted changes.

The method of the example process 800 described above is also referred to herein as the "area equivalent conversion method". Through the example process 800, the computing device 130 may convert the second change of the corrected second measurement data D(T2) in the target region 310 to the second equivalent position change F(T2) of the lane line 152 by means of accurate area calculation and equivalent area conversion, such that the accuracy of detecting the position change of the lane line 152 in the target region 310 may be improved.

As mentioned above when describing block 240 of the example process 200, after determining the first equivalent position change F(T1) and the second equivalent position change F(T2), the computing device 130 may detect the position change of the lane line 152 in the target region 310 by comparing the first equivalent position change F(T1) and the second equivalent position change F(T2). For example, if an absolute value of a difference F(T2)–F(T1) between the first equivalent position change F(T1) and the second equivalent position change F(T2) reaches a preset threshold (for example, 0.53 meters), the computing device 130 may determine that the position of the lane line 152 changes within the target region 310. In addition, the higher the value of the above difference, the higher the reliability of the detected position change of the lane line 152. It should be understood that the specific value of the threshold here is only illustrative and is not intended to limit the scope of the present disclosure in any way. In other embodiments, the threshold may be set by those skilled in the art based on specific accuracy requirements and technical environment.

A group of example results of five target regions, numbered from 1 to 5, on a certain road that are actually measured by a high-precision device and two low-precision devices (also known as crowd-sourced device 1 and crowd-sourced device 2) are listed in Table 1 below by applying the "area equivalent conversion method" described above with reference to example processes 500 and 800.

Example Process for Determining Changes of Measurement Data

As mentioned above when describing block 210 of the example process 200, the computing device 130 may determine the first change of the first measurement data D(T1) based on a manner of sampling the lane line data of the lane line 152. Such examples will be described below with reference to FIGS. 11 to 13.

Figure 11:
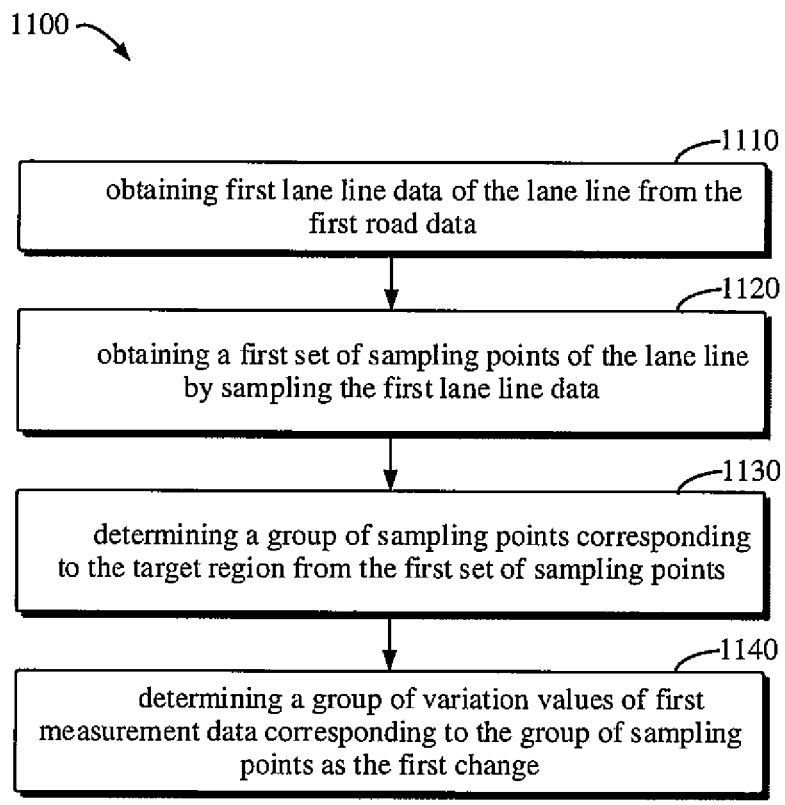
FIG. 11 is a flowchart of an example process of determining a first change of first measurement data based on first road data according to an embodiment of the present disclosure.

FIG. 11 is a flowchart of an example process 1100 of determining the first change of the first measurement data D(T1) based on the first road data 115 according to an embodiment of the present disclosure. In some embodiments, the example process 1100 may be implemented by the computing device 130 in the example environment 100. For example, the example process 1100 may be implemented by a processor or a processing unit in the computing device 130, or implemented by various functional modules in the computing device 130. In other embodiments, the example process 1100 may also be implemented by a computing device independent of the example environment 100, or may be implemented by other units or modules in the example environment 100.

At block 1110, the computing device 130 may obtain first lane line data of the lane line 152 from the first road data 115. As described herein, the first lane line data refers to any data used to describe the lane line 152 in the first road data 115. For example, in a case where the first road data 115 is a high-definition map, the computing device 130 may extract a set of coordinate points representing the lane line 152 from data of the high-definition map of the road 150, as the first lane line data. In some embodiments, these coordinate points

TABLE 1

Determining the Position Change of the Lane Line by Using the Area Equivalent Conversion Method

| Target region | Source | Equivalent Position Change | Difference between equivalent position changes | Whether the difference is greater than the threshold? |
|---|---|---|---|---|
| Target region 1 | High-precision device | 0.73037 | | |
| | Crowd-sourced device 1 | 0.660767 | −0.0696 | F |
| | Crowd-sourced device 2 | 0.38493 | −0.34544 | F |
| Target region 2 | High-precision device | 0.969752856 | | |
| | Crowd-sourced device 1 | 0.834361 | −0.13539 | F |
| | Crowd-sourced device 2 | 0.640503 | −0.32925 | F |
| Target region 3 | High-precision device | 0.314501312 | | |
| | Crowd-sourced device 1 | 0.921025 | 0.606524 | T |
| | Crowd-sourced device 2 | 0.580976 | 0.266475 | F |
| Target region 4 | High-precision device | 0.712637557 | | |
| | Crowd-sourced device 1 | 1.195355 | 0.482717 | F |
| | Crowd-sourced device 2 | 1.478726 | 0.766089 | T |
| Target region 5 | High-precision device | 0.306191215 | | |
| | Crowd-sourced device 1 | 0.679986 | 0.373795 | F |
| | Crowd-sourced device 2 | 0.802012 | 0.495821 | F |

In the last column of Table 1, the letter T indicates a measurement result with an absolute value of the difference F(T2)–F(T1) between the first equivalent position change and the second equivalent position change reaching the preset threshold, and the letter F indicates a measurement result with an absolute value of the difference F(T2)–F(T1) not reaching the threshold. It may be seen from Table 1 that the "area equivalent conversion method" proposed in the present disclosure may effectively filter out a large number of misjudgments of position changes of the lane line caused by regions having unstable changes in distances between the lane line and the reference line.

may be represented using latitude and longitude coordinates. It should be understood that depending on a specific form of the first road data 115, the computing device 130 may obtain the first lane line data of the lane line 152 in other suitable ways.

At block 1120, the computing device 130 may obtain a first set of sampling points of the lane line 152 by sampling the first lane line data. In some embodiments, the sampling may be performed at a predetermined sampling interval, and the sampling interval may be determined by those skilled in the art based on factors such as specific accuracy requirements. For example, in practice, the sampling interval may be set to 1 meter, which is beneficial to achieve a balance between the calculation amount and the calculation accuracy of the sampling performed by the computing device 130. However, it should be understood that this specific value of the sampling interval is only illustrative and is not intended to limit the scope of the present disclosure in any way. In other embodiments, the sampling interval may be any suitable value. More generally, the computing device 130 may also sample the first lane line data with uneven sampling intervals.

At block 1130, the computing device 130 may determine a group of sampling points corresponding to the target region 310 from the first set of sampling points of the lane line 152. For example, the computing device 130 may first determine a lane line segment of the lane line 152 within the target region 310, and then determine a group of sampling points corresponding to the lane line segment. Alternatively, the computing device 130 may directly determine whether a sampling point falls within the target region 310 based on a coordinate position of the sampling point and a range of coordinate positions of the target region 310.

At block 1140, the computing device 130 may determine a group of variation values of the first measurement data D(T1) corresponding to the group of sampling points as the first change of the first measurement data D(T1) in the target region 310. In other words, for each sampling point in the group of sampling points in the target region 310, the computing device 130 may determine a variation value corresponding to the sampling point, so that the group of variation values corresponding to the above group of sampling points may be obtained.

In some embodiments, for a specific sampling point, the computing device 130 may determine a distance from a sampling point before the specific sampling point to the reference line 154 from the first measurement data D(T1), and determine a distance from a sampling point after the specific sampling point to the reference line 154. The computing device 130 may use a difference between the two distances as a variation value corresponding to the specific sampling point.

However, in practice, there may be errors in the drawing of the lane line 152 and the making of the reference line 154, and a distance measurement value at a sampling point may jump. In such a case, if only changes of one sampling point before and one sampling point after a certain sampling point is taken into consideration, a large error or jump in the variation value may occur. Consequently, in some embodiments, for a specific sampling point, the computing device 130 may determine a difference between an average distance value of distances from multiple sampling points before the specific sampling point to the reference line 154 and an average distance value of distances from multiple sampling points after the specific sampling point to the reference line 154 as the above variation value. Such examples will be described below with reference to FIGS. 12 and 13.

Figure 12:
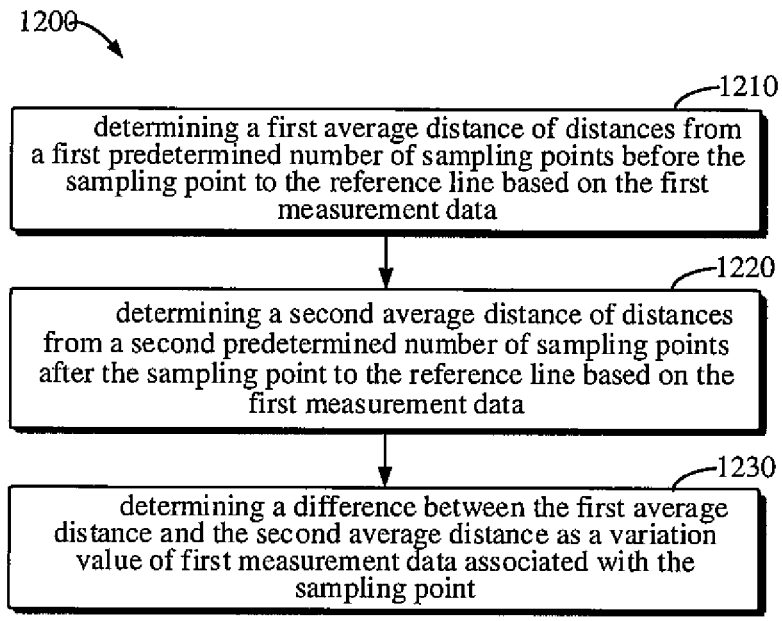
FIG. 12 is a flowchart of an example process of determining a variation value of first measurement data based on the first measurement data according to an embodiment of the present disclosure.

FIG. 12 is a flowchart of an example process 1200 of determining a variation value of the first measurement data D(T1) based on the first measurement data D(T1) according to an embodiment of the present disclosure. In some embodiments, the example process 1200 may be implemented by the computing device 130 in the example environment 100. For example, the example process 1100 may be implemented by a processor or a processing unit in the computing device 130, or implemented by various functional modules in the computing device 130. In other embodiments, the example process 1200 may also be implemented by a computing device independent of the example environment 100, or may be implemented by other units or modules in the example environment 100.

Figure 13:
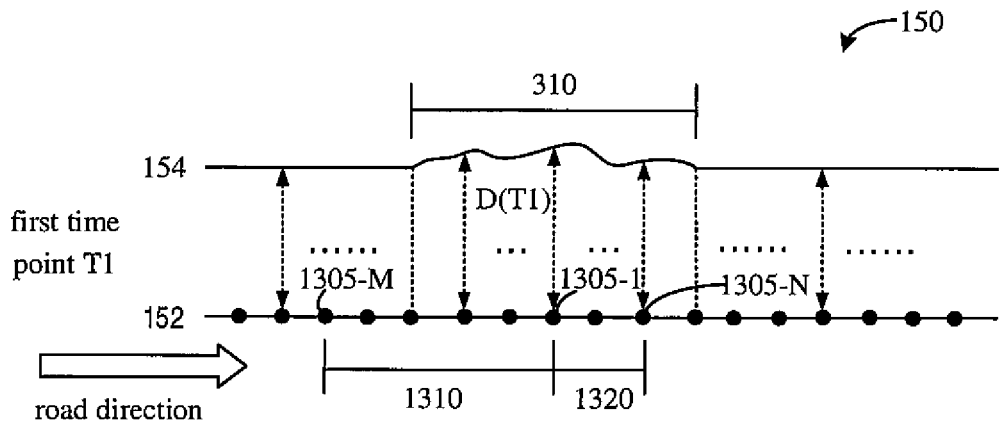
FIG. 13 is a schematic diagram of determining a variation value of first measurement data based on the first measurement data according to an embodiment of the present disclosure.

FIG. 13 is a schematic diagram of determining a variation value of the first measurement data D(T1) based on the first measurement data D(T1) according to an embodiment of the present disclosure. It should be understood that specific shapes of the lane line 152 and the reference line 154, the number of sampling points as well as other elements illustrated in FIG. 13 are only schematic, and are not intended to limit the scope of the present disclosure in any way. In other embodiments, the lane line 152 and the reference line 154 may be of any shape, and may have any suitable number of sampling points. In addition, it should be noted that, for brevity of description, the sampling points in FIG. 13 are not sequentially numbered from left to right, but numbered outwards with the sampling point in question as the center.

Referring to FIGS. 12 and 13, for each sampling point (for example, a sampling point 1305-1) in the group of sampling points within the target region 310, at block 1210, the computing device 130 may determine a first average distance of distances from a first predetermined number (e.g., M) of sampling points 1305-M to 1305-1 before the sampling point 1305-1 to the reference line 154 based on the first measurement data D(T1) of the distance D between the lane line 152 and the reference line 154. That is, an average distance between a lane line segment 1310 and the reference line 154 is determined. In some embodiments, the sampling points before the sampling point 1305-1 here refer to sampling points behind the sampling point 1305-1 according to the road direction. In addition, the first predetermined number M may be set by those skilled in the art based on specific accuracy requirements and technical environment. For example, M may be set to 60.

At block 1220, the computing device 130 may determine a second average distance of distances from a second predetermined number (e.g., N) of sampling points 1305-1 to 1305-N after the sampling point 1305-1 to the reference line 154 based on the first measurement data D(T1). That is, an average distance between a lane line segment 1320 and the reference line 154 is determined. In some embodiments, the sampling points after the sampling point 1305-1 here refer to sampling points in front of the sampling point 1305-1 according to the road direction. In addition, the second predetermined number N may be set by those skilled in the art based on specific accuracy requirements and technical environment. For example, N may be set to 20.

At block 1230, the computing device 130 may determine a difference between the first average distance and the second average distance as a variation value of first measurement data D(T1) associated with the sampling point 1305-1. In a similar manner, the computing device 130 may obtain a group of variation values corresponding to a group of sampling points in the target region 310 as the first change of the first measurement data D(T1) in the target region 310.

Similar to the processing of the first road data 115, as mentioned above when describing block 230 of the example process 200, the computing device 130 may determine the second change of the corrected second measurement data D(T2) based on the manner of sampling the lane line data of the lane line 152. Such examples will be described below with reference to FIGS. 14 to 16.

Figure 14:
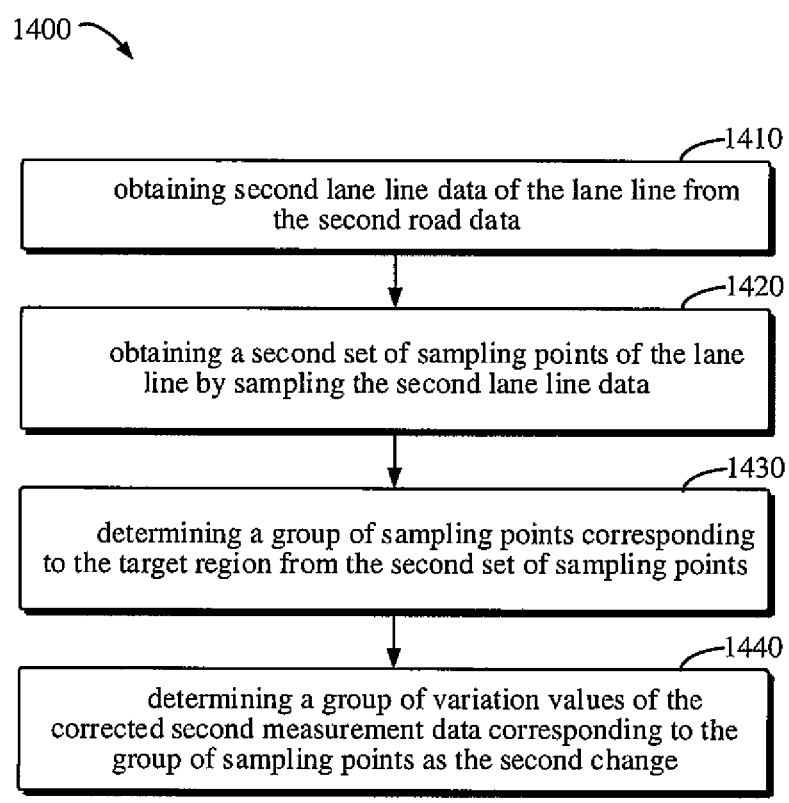
FIG. 14 is a flowchart of an example process of determining a second change of corrected second measurement data based on second road data according to an embodiment of the present disclosure.

FIG. 14 is a flowchart of an example process 1400 of determining the second change of the corrected second measurement data D(T2) based on the second road data 125 according to an embodiment of the present disclosure. In some embodiments, the example process 1400 may be implemented by the computing device 130 in the example environment 100. For example, the example process 1400 may be implemented by a processor or a processing unit in the computing device 130, or implemented by various functional modules in the computing device 130. In other embodiments, the example process 1400 may also be implemented by a computing device independent of the example environment 100, or may be implemented by other units or modules in the example environment 100.

At block 1410, the computing device 130 may obtain second lane line data of the lane line 152 from the second road data 125. As described herein, the second lane line data refers to any data used to describe the lane line 152 in the second road data 125. For example, in a case where the second road data 125 is a video taken by a low-precision device 120, the computing device 130 may extract a set of coordinate points representing the lane line 152 from the video of the road 150. That is, the second lane line data is obtained. In some embodiments, these coordinate points may be represented using latitude and longitude coordinates. It should be understood that, depending on the specific form of the second road data 125, the computing device 130 may obtain the second lane line data of the lane line 152 in other suitable ways.

At block 1420, the computing device 130 may obtain a second set of sampling points of the lane line 152 by sampling the second lane line data. As described above, in some embodiments, the sampling may be performed at a predetermined sampling interval, and the sampling interval may be determined by those skilled in the art based on specific accuracy requirements and other factors. For example, in practice, the sampling interval may be set to 1 meter, which is beneficial to achieve a balance between the calculation amount and the calculation accuracy of the sampling performed by the computing device 130. However, it should be understood that this specific value of the sampling interval is only illustrative and is not intended to limit the scope of the present disclosure in any way. In other embodiments, the sampling interval may be any suitable value. More generally, the computing device 130 may also sample the second lane line data at uneven sampling intervals.

At block 1430, the computing device 130 may determine a group of sampling points corresponding to the target region 310 from the second set of sampling points of the lane line 152. For example, the computing device 130 may first determine a lane line segment of the lane line 152 within the target region 310, and then determine a group of sampling points corresponding to the lane line segment. Alternatively, the computing device 130 may directly determine whether a sampling point falls within the target region 310 based on a coordinate position of the sampling point and a range of coordinate positions of the target region 310.

At block 1440, the computing device 130 may determine a group of variation values of the corrected second measurement data D(T2) corresponding to the group of sampling points as the second change of the corrected second measurement data D(T2) in the target region 310. In other words, for each sampling point in the group of sampling points in the target region 310, the computing device 130 may determine a variation value corresponding to the sampling point, so that the group of variation values corresponding to the above group of sampling points may be obtained.

In some embodiments, for a specific sampling point, the computing device 130 may determine a distance from a sampling point before the specific sampling point to the reference line 154 from the corrected second measurement data D(T2), and determine a distance from a sampling point after the specific sampling point to the reference line 154. The computing device 130 may use a difference between the two distances as a variation value corresponding to the specific sampling point.

However, in practice, there may be errors in the drawing of the lane line 152 and the making of the reference line 154, and a distance measurement value at a sampling point may jump. In such a case, if only changes of one sampling point before and one sampling point after a certain sampling point is taken into consideration, a large error or jump in the variation value may occur. Consequently, in some embodiments, for a specific sampling point, the computing device 130 may determine a difference between an average distance value of distances from a plurality of sampling points before the specific sampling point to the reference line 154 and an average distance value of distances from a plurality of sampling points after the specific sampling point to the reference line 154 as the above variation value. Such examples will be described below with reference to FIGS. 15 and 16.

Figure 15:
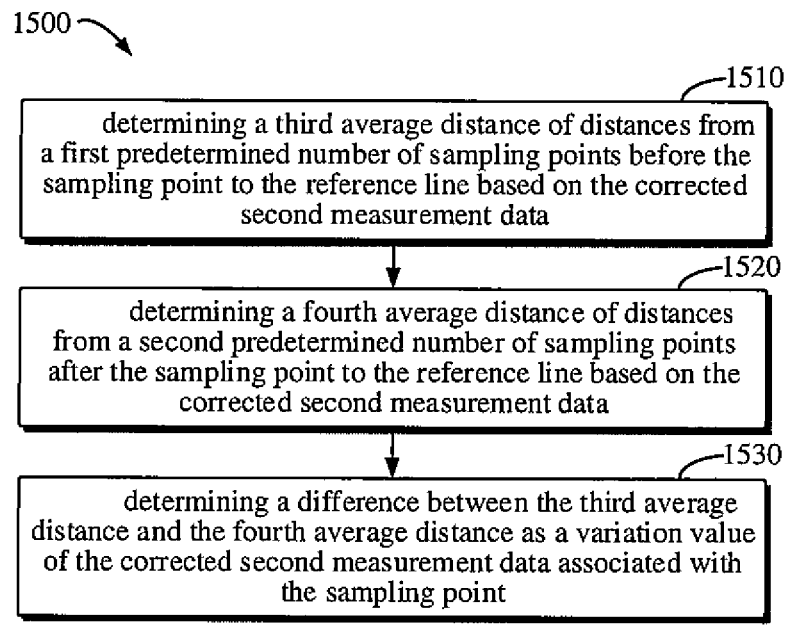
FIG. 15 is a flowchart of an example process of determining a variation value of corrected second measurement data based on the corrected second measurement data according to an embodiment of the present disclosure.

FIG. 15 is a flowchart of an example process 1500 of determining a variation value of the corrected second measurement data D(T2) based on the corrected second measurement data D(T2) according to an embodiment of the present disclosure. In some embodiments, the example process 1500 may be implemented by the computing device 130 in the example environment 100. For example, the example process 1100 may be implemented by a processor or a processing unit in the computing device 130, or implemented by various functional modules in the computing device 130. In other embodiments, the example process 1500 may also be implemented by a computing device independent of the example environment 100, or may be implemented by other units or modules in the example environment 100.

Figure 16:
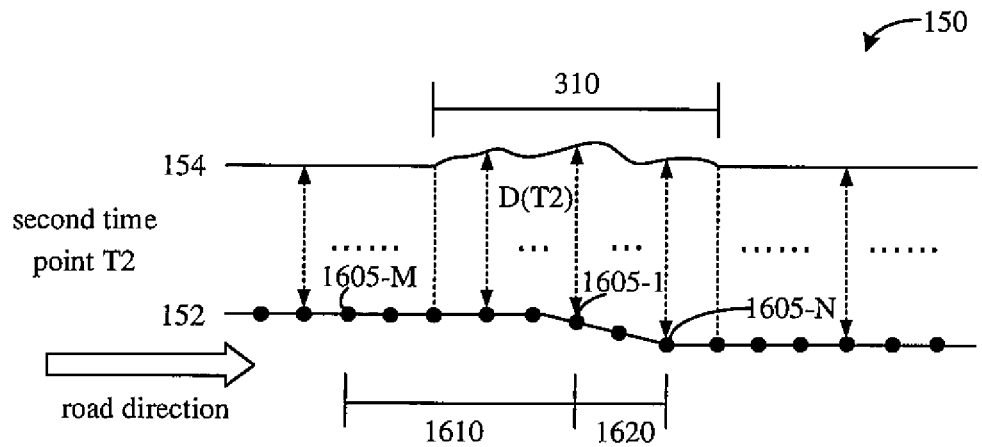
FIG. 16 is a schematic diagram of determining a variation value of corrected second measurement data based on the corrected second measurement data according to an embodiment of the present disclosure.

FIG. 16 is a schematic diagram of determining a variation value of the corrected second measurement data D(T2) based on the corrected second measurement data D(T2) according to an embodiment of the present disclosure. It should be understood that specific shapes of the lane line 152 and the reference line 154, the number of sampling points as well as other elements illustrated in FIG. 16 are only schematic, and are not intended to limit the scope of the present disclosure in any way. In other embodiments, the lane line 152 and the reference line 154 may be of any shape, and may have any suitable number of sampling points. In addition, it should be noted that, for brevity of description, the sampling points in FIG. 16 are not sequentially numbered from left to right, but numbered outwards with the sampling point in question as the center.

Referring to FIGS. 15 and 16, for each sampling point (for example, a sampling point 1605-1) in the group of sampling points within the target region 310, at block 1510, the computing device 130 may determine a third average distance of distances from a first predetermined number (e.g., M) of sampling points 1605-1 to 1605-M before the sampling point 1605-1 to the reference line 154 based on the corrected second measurement data D(T2) of the distance D between the lane line 152 and the reference line 154. That is, an average distance between a lane line segment 1610 and the reference line 154 is determined. In some embodiments, the sampling points before the sampling point 1605-1 here refer to sampling points behind the sampling point 1605-1 according to the road direction. In addition, the first predetermined number M may be set by those skilled in the art based on specific accuracy requirements and technical environment. For example, M may be set to 60.

At block 1520, the computing device 130 may determine a fourth average distance of distances from a second predetermined number (e.g., N) of sampling points 1605-1 to 1605-N after the sampling point 1605-1 to the reference line 154 based on the corrected second measurement data D(T2). That is, an average distance between a lane line segment 1620 and the reference line 154 is determined. In some embodiments, the sampling points after the sampling point 1605-1 here refer to sampling points in front of the sampling point 1605-1 according to the road direction. In addition, the second predetermined number N may be set by those skilled in the art based on specific accuracy requirements and technical environment. For example, N may be set to 20.

At block 1530, the computing device 130 may determine a difference between the third average distance and the fourth average distance as a variation value of corrected second measurement data D(T2) associated with the sampling point 1605-1. In a similar manner, the computing device 130 may obtain a group of variation values corresponding to a group of sampling points in the target region 310 as the second change of the corrected second measurement data D(T2) in the target region 310.

In a case where the first change of the first measurement data D(T1) and the second change of the corrected second measurement data D(T2) are determined by sampling, the first determination of the first area 615 described above at block 520 of the example process 500 and the determination of the second area 915 described above at block 820 of the example process 800 may also be implemented based on sampling points. Such examples will be described below with reference to FIG. 17.

Figure 17:
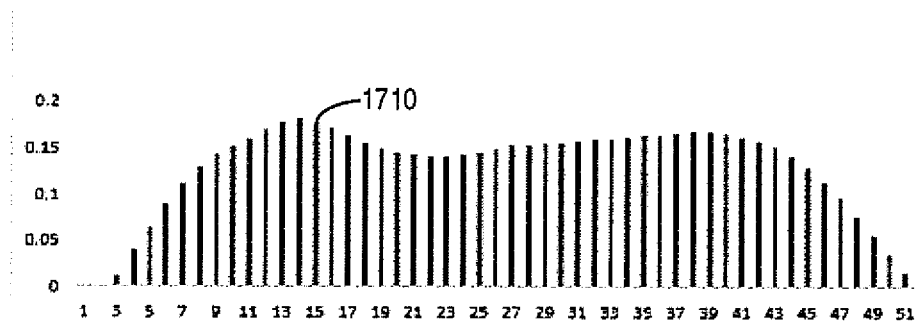
FIG. 17 is a schematic diagram of obtaining an area between a horizontal axis and a variation curve of a distance between a lane line and a reference line by sampling according to an embodiment of the present disclosure.

FIG. 17 is a schematic diagram of obtaining an area between a horizontal axis and a variation curve of the distance D between the lane line 152 and the reference line 154 by sampling according to an embodiment of the present disclosure. In FIG. 17, the horizontal axis represents distances between a plurality of sampling points on the lane line 152 in the target region 310 and a start point of the target region 310, with a unit of meter. The vertical axis represents a variation of the distance D between the lane line 152 and the reference line 154 measured at a sampling point. For example, in the example of FIG. 17, a distance between a sampling point 1710 and the start point of the target region 310 is 15 meters, and a variation value corresponding to the distance D is approximately 0.17 meters.

In some embodiments, variations of the distance D corresponding to the sampling points illustrated in FIG. 17 may be corrected variations obtained by subtracting a fixed length from variations actually obtained by the computing device 130 through various manners described above. For example, the fixed length may correspond to the width of the lane line 152, such as 0.2 meters. In this manner, the computing device 130 may exclude sampling points where the variations of the distance D are less than the width of the lane line 152. This is because that, in practice, if the position change of the lane line 152 is less than the width of the lane line 152, the position change of the lane line 152 is deemed as not occurred. In other embodiments, those skilled in the art may also determine the value of the fixed length based on actual accuracy requirements and technical environment.

In addition, it should be understood that FIG. 17 illustrates a general way of calculating the area between the variation curve of the distance D and the horizontal axis based on the sampling points, which may be used to calculate the first area 615 in FIG. 6 and the second area 915 in FIG. 9. Therefore, the first curve 610 and the second curve 910 as well as the first area 615 and the second area 915 will not be distinguished in the following description, and will be collectively referred to as the curve or the area, respectively.

When calculating the area between the curve and the horizontal axis illustrated in FIG. 17, for each sampling point, the computing device 130 may first determine an area corresponding to the sampling point. For example, an area corresponding to the sampling point 1710 may be the sampling interval (for example, 1 meter) multiplied by a variation (for example, 0.17 meters) of the distance D corresponding to the sampling point. Then, the computing device 130 may add areas corresponding to all the sampling points in the target region 310 to obtain a total area between the curve and the horizontal axis. In this manner, the processing of the computing device 130 for obtaining the first area 615 and the second area 915 may be simplified.

Example Process for Determining the First Measurement Data and the Second Measurement Data As mentioned above when describing block 210 of the example process 200, the first road data 115 collected by the high-precision device 110 on the road 150 may not directly include the first measurement data D(T1) between the lane line 152 and the reference line 154. For example, the first road data 115 may be a high-definition map formed after processing the data collected by the high-precision device 110. The first road data 115 may include data and information about the lane line 152 and the reference line 154, but may not directly include data of the distance between the lane line 152 and the reference line 154. In this case, the computing device 130 may derive or calculate the first measurement data D(T1) from the first road data 115. Such examples will be described further below with reference to FIGS. 18 and 19.

Figure 18:
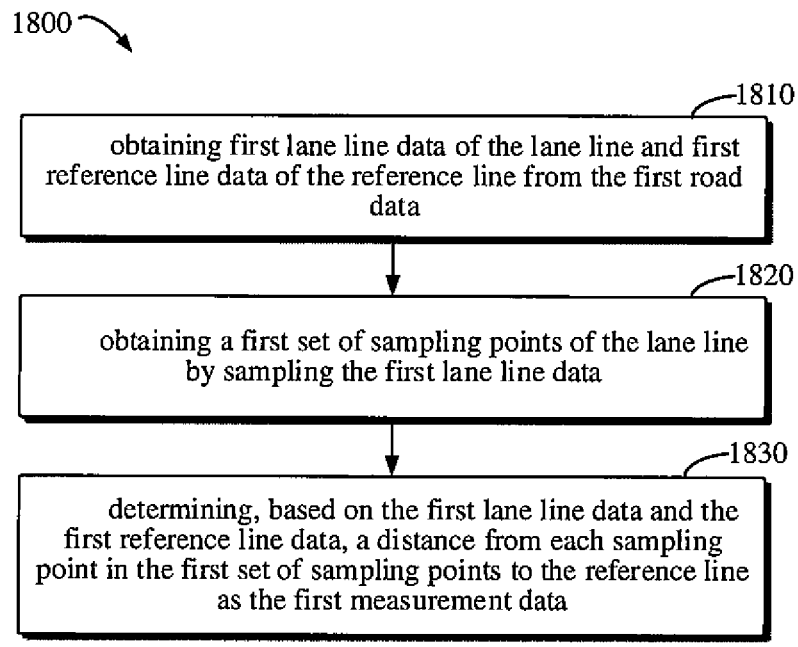
FIG. 18 is a flowchart of an example process of obtaining first measurement data from first road data according to an embodiment of the present disclosure.

FIG. 18 is a flowchart of an example process 1800 of obtaining the first measurement data D(T1) from the first road data 115 according to an embodiment of the present disclosure. In some embodiments, the example process 1800 may be implemented by the computing device 130 in the example environment 100. For example, the example process 1800 may be implemented by a processor or a processing unit in the computing device 130, or implemented by various functional modules in the computing device 130. In other embodiments, the example process 1800 may also be implemented by a computing device independent of the example environment 100, or may be implemented by other units or modules in the example environment 100.

Figure 19:
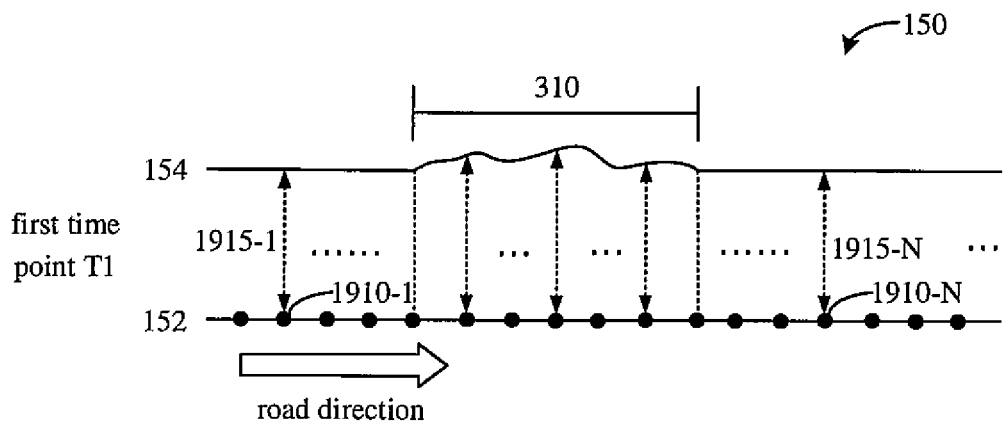
FIG. 19 is a schematic diagram of determining first measurement data by sampling lane line data from first road data according to an embodiment of the present disclosure.

FIG. 19 is a schematic diagram of determining the first measurement data D(T1) by sampling lane line data from the first road data 115 according to an embodiment of the present disclosure. It should be understood that specific shapes of the lane line 152 and the reference line 154, the number of sampling points as well as other elements illustrated in FIG. 19 are only schematic, and are not intended to limit the scope of the present disclosure in any way. In other embodiments, the lane line 152 and the reference line 154 may be of any shape, and may have any suitable number of sampling points. In addition, the numbering of the sampling points in FIG. 19 is only schematic, where the sampling point numbered 1 is not necessarily the first sampling point, and the sampling point numbered N is not necessarily the last sampling point.

Referring to FIGS. 18 and 19, at block 1810, the computing device 130 may obtain first lane line data of the lane line 152 and first reference line data of the reference line 154 from the first road data 115. As used herein, the first lane line data refers to any data used to describe the lane line 152 in the first road data 115, and the first reference line data refers to any data used to describe the reference line 154 in the first road data 115. For example, in a case where the first road data 115 is a high-definition map, the computing device 130 may extract a set of coordinate points representing the lane line 152 and a set of coordinate points representing the reference line 154 from data of the high-definition map of the road 150. That is, the first lane line data and the first reference line data are obtained. In some embodiments, these coordinate points may be represented using latitude and longitude coordinates. It should be understood that depending on the specific form of the first road data 115, the computing device 130 may obtain the first lane line data of the lane line 152 and the first reference line data of the reference line 154 in other suitable ways.

At block 1820, the computing device 130 may obtain a first set of sampling points 1910-1 to 1910-N (collectively referred to as a first set 1910 of sampling points) of the lane line 152 by sampling the first lane line data. In some embodiments, the sampling may be performed at a predetermined sampling interval, and the sampling interval may be determined by those skilled in the art based on factors such as specific accuracy requirements and technical environment. For example, in practice, the sampling interval may be set to 1 meter, which is beneficial to achieve a balance between the calculation amount and the calculation accuracy of the sampling performed by the computing device 130. However, it should be understood that this specific value of the sampling interval is only illustrative and is not intended to limit the scope of the present disclosure in any way. In other embodiments, the sampling interval may be of any suitable value. More generally, the computing device 130 may also sample the first lane line data with uneven sampling intervals.

At block 1830, the computing device 130 may determine, based on the first lane line data and the first reference line data, distances 1915-1 to 1915-N (collectively referred to as a set 1915 of distances) from sampling points 1910-1 to 1910-N in the first set 1910 of sampling points respectively to the reference line 154 as the first measurement data D(T1). In other words, the first measurement data D(T1) may include a measurement distance from each sampling point in the first lane line data to the reference line 154, that is, a set 1915 of measurement distances of the same number as the number of the sampling points. It should be noted that, although in the example of FIG. 19, the computing device 130 performs the sampling on the first lane line data to determine the first measurement data D(T1), in other embodiments, the computing device 130 may also perform the sampling on the first reference line data, and then calculate distances from the sampling points of the first reference line data to the lane line 152 to determine the first measurement data D(T1).

Through the example process 1800, the computing device 130 may use sampling to obtain a set of distances from a limited number of sampling points to the reference line 154 as the first measurement data D(T1). Therefore, the processing of the computing device 130 for determining the first measurement data D(T1) may be simplified and has high operability. In addition, by adjusting the sampling interval, the computing device 130 may also adjust the accuracy of the first measurement data D(T1).

Similarly, as mentioned above when describing block 230 of the example process 200, the second road data 125 collected by the low-precision device 120 on the road 150 may not directly include the second measurement data D(T2) between the lane line 152 and the reference line 154. For example, the second road data 125 may be a video recorded by the low-precision device 120 for presenting the lane line 152 and the reference line 154, and thus the second road data 125 does not directly include data of the distance between the lane line 152 and the reference line 154. In this case, the computing device 130 may derive or calculate the second measurement data D(T2) from the second road data 125. Such examples will be described further below with reference to FIGS. 20 and 21.

Figure 20:
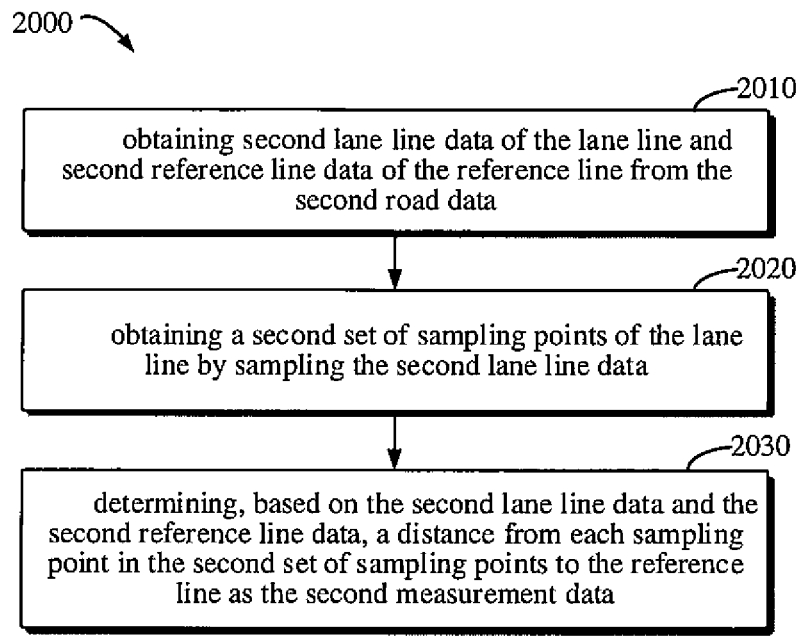
FIG. 20 is a flowchart of an example process of obtaining second measurement data from second road data according to an embodiment of the present disclosure.

FIG. 20 is a flowchart of an example process 2000 of obtaining the second measurement data D(T2) from the second road data 125 according to an embodiment of the present disclosure. In some embodiments, the example process 2000 may be implemented by the computing device 130 in the example environment 100. For example, the example process 2000 may be implemented by a processor or a processing unit in the computing device 130, or implemented by various functional modules in the computing device 130. In other embodiments, the example process 2000 may also be implemented by a computing device independent of the example environment 100, or may be implemented by other units or modules in the example environment 100.

Figure 21:
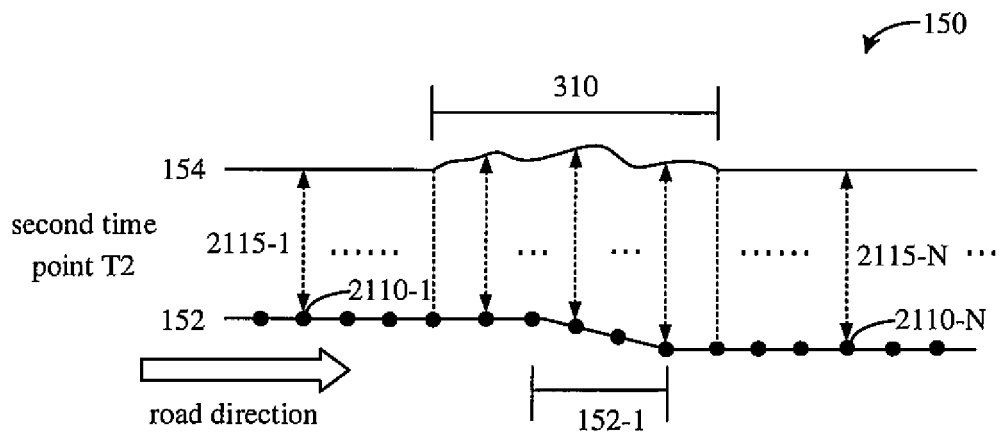
FIG. 21 is a schematic diagram of determining second measurement data by sampling lane line data from second road data according to an embodiment of the present disclosure.

FIG. 21 is a schematic diagram of determining the second measurement data D(T2) by sampling lane line data from the second road data 125 according to an embodiment of the present disclosure. It should be understood that specific shapes of the lane line 152 and the reference line 154, the number of sampling points as well as other elements illustrated in FIG. 21 are only schematic, and are not intended to limit the scope of the present disclosure in any way. In other embodiments, the lane line 152 and the reference line 154 may be of any shape, and may have any suitable number of sampling points. In addition, the numbering of sampling points in FIG. 21 is only schematic, where the sampling point numbered 1 is not necessarily the first sampling point, and the sampling point numbered N is not necessarily the last sampling point.

Referring to FIGS. 20 and 21, at block 2010, the computing device 130 may obtain second lane line data of the lane line 152 and second reference line data of the reference line 154 from the second road data 125. As used herein, the second lane line data refers to any data used to describe the lane line 152 in the second road data 125, and the second reference line data refers to any data used to describe the reference line 154 in the second road data 125.

For example, if the second road data 125 is a video captured by a driving recorder, the computing device 130 may extract a set of coordinate points representing the lane line 152 and a set of coordinate points representing the reference line 154 from the video of the road 150, which are the second lane line data and the second reference line data, respectively. In this process, the computing device 130 may refer to and use the first road data 115 of the road 150 or positioning data of the low-precision device 120, and various shooting parameters, such as intrinsic and extrinsic parameters of a camera, of the low-precision device 120 for capturing the second road data 125.

In other embodiments, the computing device 130 may also determine the second lane line data and the second reference line data by extracting sample points of the lane line 152 and the reference line 154 from frames of the video of the road 150. Such examples will be described further below. Furthermore, it should be understood that, depending on the specific form of the second road data 125, the computing device 130 may adopt other suitable manners to obtain the second lane line data of the lane line 152 and the second reference line data of the reference line 154.

At block 2020, the computing device 130 may obtain a second set of sampling points 2110-1 to 2110-N (collectively referred to as a second set 2110 of sampling points) of the lane line by sampling the second lane line data. In some embodiments, the sampling may be performed at a predetermined sampling interval, and the sampling interval may be determined by those skilled in the art based on factors such as specific accuracy requirements and technical environment. For example, in practice, the sampling interval may be set to 1 meter, which is beneficial to achieve a balance between the calculation amount and the calculation accuracy of the sampling performed by the computing device 130. However, it should be understood that, this specific value of the sampling interval is only illustrative and is not intended to limit the scope of the present disclosure in any way. In other embodiments, the sampling interval may be of any suitable value.

More generally, the computing device 130 may also sample the second lane line data with uneven sampling intervals. In addition, in some embodiments, the sampling interval for the second lane line data may be the same as the sampling interval for the first lane line data, which is beneficial to simplify the entire processing process of the first and second lane line data. However, in other embodiments, the sampling interval used for the second lane line data may also be different from the sampling interval used for the first lane line data, which is beneficial to select suitable sampling intervals respectively for the first and second lane line data based on the first and second lane line data.

At block 2030, the computing device 130 may determine, based on the second lane line data and the second reference line data, distances 2115-1 to 2115-N (collectively referred to as a set 2115 of distances) from sampling points 2110-1 to 2110-N in the second set 2110 of sampling points to the reference line 154 as the second measurement data D(T2). In other words, the second measurement data D(T2) may include a measurement distance from each sampling point in the second lane line data to the reference line 154, that is, the set 2115 of measurement distances of the same number as the number of the sampling points. It should be noted that, although in the example of FIG. 21, the computing device 130 performs the sampling on the second lane line data to determine the second measurement data D(T2), in other embodiments, the computing device 130 may also perform the sampling on the second reference line data, and then calculate distances from the sampling points of the second reference line data to the lane line 152 to determine the second measurement data D(T2).

Through the example process 2000, the computing device 130 may use sampling to obtain a set of distances from a limited number of sampling points to the reference line 154 as the second measurement data D(T2). Therefore, the processing of the computing device 130 for determining the second measurement data D(T2) may be simplified and has high operability. In addition, by adjusting the sampling interval, the computing device 130 may also adjust the accuracy of the second measurement data D(T2).

Example Process of Obtaining the Lane Line Data and the Reference Line Data from the Second Road Data As mentioned above when describing block 2010 of the example process 2000, the computing device 130 may also determine the first lane line data and the first reference line data by extracting the sample points of the lane line 152 and the sample points of the reference line 154 from the frames of the video of the road 150 captured by the low-precision device 120. Such examples will be described below with reference to FIGS. 22 to 24.

Figure 22:
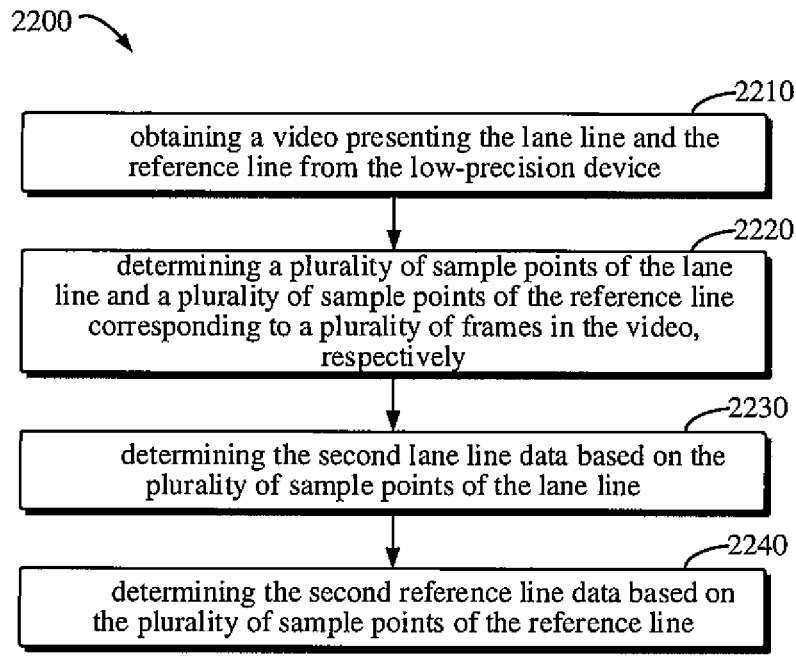
FIG. 22 is a flowchart of an example process of obtaining second lane line data and second reference line data from second road data according to an embodiment of the present disclosure.

FIG. 22 is a flowchart of an example process 2200 of obtaining second lane line data and second reference line data from the second road data 125 according to an embodiment of the present disclosure. In some embodiments, the example process 2200 may be implemented by the computing device 130 in the example environment 100. For example, the example process 2200 may be implemented by a processor or a processing unit in the computing device 130, or implemented by various functional modules in the computing device 130. In other embodiments, the example process 2200 may also be implemented by a computing device independent of the example environment 100, or may be implemented by other units or modules in the example environment 100.

At block 2210, the computing device 130 may obtain a video presenting the lane line 152 and the reference line 154 from the low-precision device 120. For example, in a case where the low-precision device 120 is a driving recorder, the computing device 130 may obtain a video captured by the driving recorder when a vehicle installed with the driving recorder passes through the road 150. It should be understood that the computing device 130 may obtain the video presenting the lane line 152 and the reference line 154 from the low-precision device 120 in any suitable manner. For example, the computing device 130 may select a video presenting the lane line 152 and the reference line 154 from videos taken by the low-precision device 120 within unit time (e.g., 1 day). For another example, the video presenting the lane line 152 and the reference line 154 may be selected or set to be transmitted to the computing device 130 by the user of the driving recorder.

At block 2220, the computing device 130 may determine a plurality of sample points of the lane line and a plurality of sample points of the reference line corresponding to a plurality of frames in the video presenting the lane line 152 and the reference line 154, respectively. For example, the computing device 130 may extract a plurality of frames from the above video, and each frame is an image in which the lane line 152 and the reference line 154 are presented. In each of the extracted frames, the computing device 130 may select a sample point of the lane line and a sample point of the reference line from an image corresponding to the lane line 152 and the reference line 154 in the frame. In this manner, the computing device 130 may obtain the plurality of sample points of the lane line and the plurality of sample points of the reference line respectively corresponding to the plurality of frames. In addition, it should be understood that selecting one sample point from each frame is merely exemplary, and is not intended to limit the scope of the present disclosure in any way. In other embodiments, the computing device 130 may also select several sample points in each frame.

In general, the computing device 130 may select any appropriate sample point of the lane line and sample point of the reference line from the image of the lane line 152 and the reference line 154 in each frame for fitting the second lane line data and the second reference line data in subsequent processing. However, in some embodiments, in each frame, the computing device 130 may select a sample point of the lane line and a sample point of the reference line at a fixed distance relative to the low-precision device 120, which is helpful for simplifying the processing of the computing device 130 for selecting the sample points of the lane line and the sample points of the reference line, and for improving the accuracy of the finally extracted second lane line data and second reference line data. Such examples will be described further below.

At block 2230, the computing device 130 may determine the second lane line data based on the plurality of sample points of the lane line from the plurality of frames. For example, the computing device 130 may fit a plurality of sample points of the lane line from different frames into one lane line as the second lane line data. In some cases, during the process of fitting the lane line, the computing device 130 may obtain coordinate positions of each sample point of the lane line, such as latitude and longitude coordinates. In engineering practice, before fitting the lane line, the computing device 130 may also remove abnormal points where a measurement distance from s sample point of the lane line to the reference line 154 significantly deviates from a true value.

In addition, the coordinate positions of the sample points of the lane line may be determined by any appropriate means. For example, the computing device 130 may first determine latitude and longitude coordinates of a certain position in an image frame based on the first road data 115 collected by the high-precision device 110. The computing device 130 may determine coordinate positions of the sample points of the lane line based on the certain position, a relative positional relationship of the sample points of the lane line in the image, the intrinsic and extrinsic parameters of the camera in the low-precision device 120 that captured the image, and so on. For another example, the computing device 130 may obtain a coordinate position when the image is captured from a positioning system of the vehicle installed with the low-precision device 120 or from a positioning module in the low-precision device 120, thereby determining the coordinate positions of the sample points of the lane line.

At block 2240, the computing device 130 may determine the second reference line data based on the plurality of sample points of the reference line from the plurality of frames. For example, the computing device 130 may fit a plurality of sample points of the reference line from different frames into one reference line as the second reference line data. In some cases, during the process of fitting the reference line, the computing device 130 may obtain coordinate positions of each sample point of the reference line, such as latitude and longitude coordinates. In engineering practice, before fitting the reference line, the computing device 130 may remove abnormal points where a measurement distance from a sample point of the reference line to the lane line 152 significantly deviates from a true value. In some embodiments, the computing device 130 may determine position coordinates of the sample points of the reference line in the same manner as for determining position coordinates of the sample points of the lane line. Alternatively, the computing device 130 may also obtain the position coordinates of the sample points of the reference line in a manner different from determining the position coordinates of the sample points of the lane line.

By using the example process 2200, the processing process of the computing device 130 to determine the second lane line data and the second reference line data may be simplified. In addition, by adjusting the number of frames extracted from the video presenting the lane line 152 and the reference line 154 and the number of sample points of the lane line and sample points of the reference line selected from each frame, the computing device 130 may adjust the accuracy of the second lane line data and the second reference line data obtained.

As mentioned above when describing block 2220 of the example process 2200, in each frame, the computing device 130 may select a sample point of the lane line and a sample point of the reference line at the fixed distance relative to the low-precision device 120. Such examples will be described below with reference to FIGS. 23 and 24.

Figure 23:
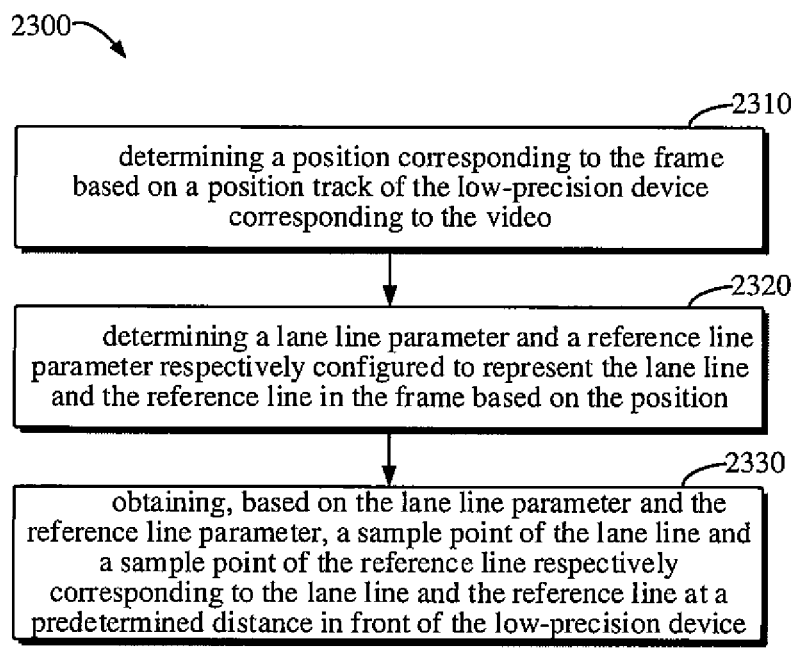
FIG. 23 is a flowchart of an example process of determining a sample point of a lane line and a sample point of a reference line from a frame of a video presenting the lane line and the reference line according to an embodiment of the present disclosure.

FIG. 23 is a flowchart of an example process 2300 of determining a sample point of the lane line and a sample point of the reference line from a frame of a video presenting the lane line 152 and the reference line 154 according to an embodiment of the present disclosure. In some embodiments, the example process 2300 may be implemented by the computing device 130 in the example environment 100. For example, the example process 2300 may be implemented by a processor or a processing unit in the computing device 130, or implemented by various functional modules in the computing device 130. In other embodiments, the example process 2300 may also be implemented by a computing device independent of the example environment 100, or may be implemented by other units or modules in the example environment 100.

Figure 24:
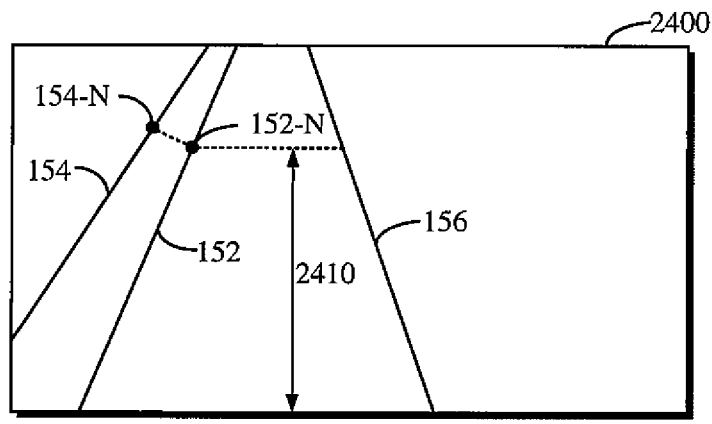
FIG. 24 is a schematic diagram of determining a sample point of a lane line and a sample point of a reference line in a frame of a video according to an embodiment of the present disclosure.

FIG. 24 is a schematic diagram of determining a sample point of a lane line and a sample point of a reference line in a frame 2400 of a video according to an embodiment of the present disclosure. As illustrated in FIG. 24, in the frame 2400 of the video of the road 150 taken by the low-precision device 120, the lane line 152, the reference line 154 regarded as an edge line, and another lane line 156 forming one lane with the lane line 152 are presented. It should be understood that specific shapes and extension directions of the lane line 152, the reference line 154, and the lane line 156 illustrated in FIG. 24 are merely schematic, and are not intended to limit the scope of the present disclosure in any way. In other embodiments, the lane line 152, the reference line 154, and the lane line 156 may have any suitable shape and extension direction.

Referring to FIGS. 23 and 24, for each frame (for example, frame 2400) of a plurality of frames in a video taken by the low-precision device 120, at block 2310, the computing device 130 may determine a position corresponding to the frame 2400 based on a position track of the low-precision device 120 corresponding to the video. For example, in a case where the low-precision device 120 is a vehicle-mounted driving recorder, the computing device 130 may obtain positioning data (e.g., a global satellite positioning system (GPS) trajectory) corresponding to the above-mentioned video from a vehicle on which such a driving recorder is installed. For another example, in some cases, the low-precision device 120 as a driving recorder may also have a satellite positioning module (for example, a low-precision GPS module). In this case, the computing device 130 may directly obtain the above-mentioned video and associated satellite positioning data (e.g., the GPS trajectory) from the low-precision device 120.

After obtaining the satellite positioning data associated with the above video, the computing device 130 may, for example, determine the position of the low-precision device 120 corresponding to the frame 2400 by performing interpolation processing on the satellite positioning data (e.g., the GPS trajectory) to. However, it should be understood that the computing device 130 may also use any other suitable manner to determine position information corresponding to the frame 2400. For example, the computing device 130 may first determine a time stamp when the low-precision device 120 shoots the frame 2400, and then determine a position of the low-precision device 120 corresponding to the time stamp from the satellite positioning data.

At block 2320, the computing device 130 may determine a lane line parameter and a reference line parameter respectively configured to represent the lane line 152 and the reference line 154 in the frame 2400 based on the position of the frame 2400. For example, based on the position corresponding to the frame 2400 and a relative position of the presented lane line 152 and reference line 154 in the frame 2400, the computing device 130 may obtain the lane line parameter and the reference line parameter for describing the lane line 152 and the reference line 154. In some embodiments, the lane line parameter may be a parameter of a lane line equation (e.g., a cubic equation) for describing the lane line 152, and the reference line parameter may be a parameter of a reference line equation (e.g., a cubic equation) for describing the reference line 154. In some embodiments, the computing device 130 may determine the lane line parameter and the reference line parameter of the lane line 152 and the reference line 154 through a sensing algorithm module of the lane line and the reference line. In addition, in engineering practice, the computing device 130 may perform distortion correction on the frame 2400 based on the intrinsic parameters of the camera in the low-precision device 120 to improve the accuracy of the lane line parameter and the reference line parameter.

At block 2330, the computing device 130 may obtain, based on the lane line parameter and the reference line parameter, a sample point 152-N of the lane line and a sample point 154-N of the reference line respectively corresponding to the lane line 152 and the reference line 154 at a predetermined distance 2410 in front of the low-precision device 120. In other words, based on the lane line parameter and the reference line parameter, the computing device 130 may determine a position of each point on the lane line 152 and the reference line 154 in the frame 2400. Therefore, the computing device 130 may determine the sample point 152-N of the lane line and the sample point 154-N of the reference line at the predetermined distance 2410 in front of the low-precision device 120 through calculation.

In some embodiments, the predetermined distance 2410 may be set to 10 meters. However, it should be understood that those skilled in the art may reasonably set the specific value of the predetermined distance 2410 based on specific accuracy requirements and technical environment. And then, the computing device 130 may, based on the same processing manner in the frame 2400, determine a plurality of sample points of the lane line and a plurality of sample points of the reference line from the plurality of frames in the video of the low-precision device 120 so as to fit the lane line as the second lane line data and to fit the reference line as the second reference line data.

By using the example process 2300, the computing device 130 may select a sample point of the lane line and a sample point of the reference line from each frame in an efficient and consistent manner, thereby improving the accuracy of the final fitted lane line and reference line.

Example Process for Correcting the Second Measurement Data

As mentioned above in describing block 220 of the example process 200, the computing device 130 may correct the second measurement data D(T2) based on the road segment (corresponding to the lane line segment of the predetermined length of the lane line 152) of the predetermined length of the road 150. Hereinafter, such examples will be described with reference to FIGS. 25 to 29.

Figure 25:
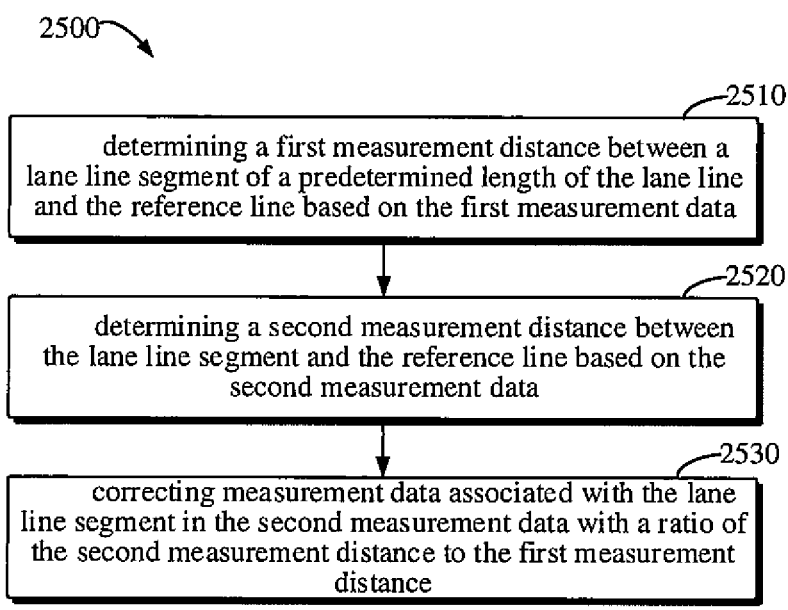
FIG. 25 is a flowchart of an example process of correcting second measurement data by using first measurement data according to an embodiment of the present disclosure.

FIG. 25 is a flowchart of an example process 2500 of correcting the second measurement data D(T2) by using the first measurement data D(T1) according to an embodiment of the present disclosure. In some embodiments, the example process 2500 may be implemented by the computing device 130 in the example environment 100. For example, the example process 2500 may be implemented by a processor or a processing unit in the computing device 130, or implemented by various functional modules in the computing device 130. In other embodiments, the example process 2500 may also be implemented by a computing device independent of the example environment 100, or may be implemented by other units or modules in the example environment 100.

At block 2510, the computing device 130 may determine a first measurement distance, hereinafter referred to as d1, between the lane line segment of the predetermined length of the lane line 152 and the reference line 154 based on the first measurement data D(T1). The predetermined length here may be determined by those skilled in the art based on factors such as required measurement accuracy and amount of calculation. For example, in some embodiments, the lane line segment of the predetermined length may be 60 meters. It should be understood that the specific value of the predetermined length listed here is only exemplary and is not intended to limit the scope of the present disclosure in any way. In other embodiments, the computing device 130 may set the lane line segment for a purpose of correction to any suitable predetermined length. In some embodiments, since the lane line segment is used for correction, the lane line segment may be selected as a lane line segment where the distance D between the lane line 152 and the reference line 154 is substantially constant, and the lane line segment is also referred to herein as a "a segment with a stable distance".

In addition, the computing device 130 may determine the first measurement distance d1 in any suitable manner, which may depend on a positional relationship between the lane line segment and the reference line 154. For example, in a case where the lane line segment is parallel to the reference line 154, the computing device 130 may find a distance between any point on the lane line segment and the reference line from the first measurement data. If the distance between the lane line segment and the reference line varies, the computing device 130 may determine, based on the first measurement data D(T1), an average value of distances D between the lane line 152 and the reference line 154 in an region associated with the lane line segment. For another example, the computing device 130 may determine the first measurement distance d1 by sampling the lane line segment. Such examples will be described further below.

At block 2520, the computing device 130 may determine a second measurement distance, hereinafter referred to as d2, between the lane line segment and the reference line 154 based on the second measurement data D(T2). Similar to block 2510, the computing device 130 may determine the second measurement distance d2 in any suitable manner, which may depend on a positional relationship between the lane line segment and the reference line 154. For example, in a case where the lane line segment is parallel to the reference line 154, the computing device 130 may find a distance between any point on the lane line segment and the reference line from the second measurement data. If the distance between the lane line segment and the reference line varies, the computing device 130 may determine, based on the second measurement data D(T2), an average value of distances D between the lane line 152 and the reference line 154 in an region associated with the lane line segment. For another example, the computing device 130 may determine the second measurement distance d2 by sampling the lane line segment. Such examples will be described further below.

At block 2530, the computing device 130 may correct measurement data associated with the lane line segment in the second measurement data D(T2) with a ratio d2/d1 of the second measurement distance d2 to the first measurement distance d1. For example, the computing device 130 may use the ratio d2/d1 to correct a measurement value of a distance corresponding to any point on the lane line segment in the second measurement data D(T2). By using the ratio of the measurement distances from the lane line segment to the reference line 154, during the correction process of the second measurement data D(T2), the computing device 130 may eliminate the influence of error factors such as jumps of individual data points in the measurement data. In addition, in some embodiments, for different sampling points, the computing device 130 may determine the above-mentioned lane line segment near the sampling point. That is to say, for different sampling points, the above-mentioned lane line segment may be different, so that the locality of the sampling point may be retained, that is, a factor used to correct the distance D of the sampling point is determined based on a distance from a lane line segment near the sampling point to the reference line 154.

As mentioned above when describing block 2510 of the example process 2500, the computing device 130 may determine the first measurement distance d1 by sampling the lane line segment. Such examples will be described below with reference to FIGS. 26 and 27.

Figure 26:
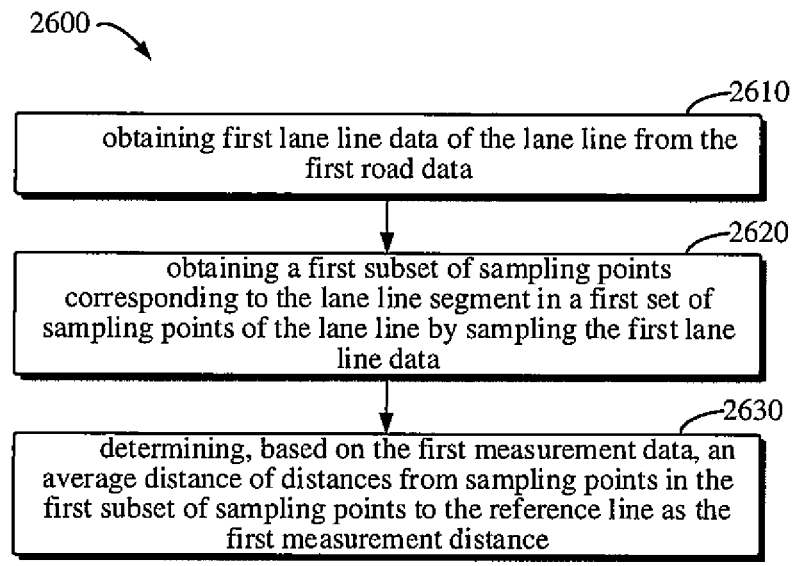
FIG. 26 is a flowchart of an example process of determining a first measurement distance from first road data according to an embodiment of the present disclosure.

FIG. 26 is a flowchart of an example process 2600 of determining the first measurement distance d1 from the first road data 115 according to an embodiment of the present disclosure. In some embodiments, the example process 2600 may be implemented by the computing device 130 in the example environment 100. For example, the example process 2600 may be implemented by a processor or a processing unit in the computing device 130, or implemented by various functional modules in the computing device 130. In other embodiments, the example process 2600 may also be implemented by a computing device independent of the example environment 100, or may be implemented by other units or modules in the example environment 100.

Figure 27:
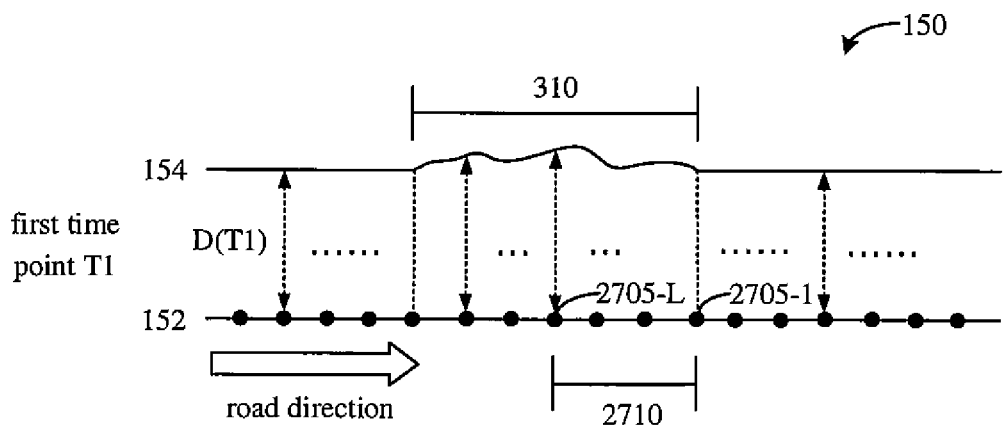
FIG. 27 is a schematic diagram of determining a first measurement distance from first road data according to an embodiment of the present disclosure.

FIG. 27 is a schematic diagram of determining the first measurement distance d1 from the first road data 115 according to an embodiment of the present disclosure. It should be understood that specific shapes of the lane line 152 and the reference line 154, the number of sampling points as well as other elements illustrated in FIG. 27 are only schematic, and are not intended to limit the scope of the present disclosure in any way. In other embodiments, the lane line 152 and the reference line 154 may be of any shape, and may have any suitable number of sampling points. In addition, the numbering of sampling points in FIG. 27 is only schematic, where the sampling point numbered 1 is not necessarily the first sampling point, the sampling point numbered L is not necessarily the last sampling point, and a direction of the numbering is not necessarily the same as the road direction for the convenience of description.

Referring to FIGS. 26 and 27, at block 2610, the computing device 130 may obtain first lane line data of the lane line 152 from the first road data 115. As described above, the first lane line data refers to any data used to describe the lane line 152 in the first road data 115. For example, in a case where the first road data 115 is a high-definition map, the computing device 130 may extract a set of coordinate points representing the lane line 152 from data of the high-definition map of the road 150 as the first lane line data. In some embodiments, these coordinate points may be represented using latitude and longitude coordinates. It should be understood that, depending on the specific form of the first road data 115, the computing device 130 may obtain the first lane line data of the lane line 152 in other suitable ways.

At block 2620, the computing device 130 may sample the first lane line data to obtain a first subset of sampling points 2705-1 to 2705-L (collectively referred to as a subset 2705 of sampling points) corresponding to a lane line segment 2710 in a first set of sampling points of the lane line 152. In some embodiments, the sampling may be performed at a predetermined sampling interval, and the sampling interval may be determined by those skilled in the art based on factors such as specific accuracy requirements and technical environment. For example, in practice, the sampling interval may be set to 1 meter, which is beneficial to achieve a balance between the calculation amount and the calculation accuracy of the sampling performed by the computing device 130. However, it should be understood that this specific value of the sampling interval is only illustrative and is not intended to limit the scope of the present disclosure in any way. In other embodiments, the sampling interval may be of any suitable value. More generally, the computing device 130 may also sample the first lane line data at uneven sampling intervals.

At block 2630, the computing device 130 may determine, based on the first measurement data D(T1), an average distance of distances from the sampling points 2705-1 to 2705-L in the first subset 2705 of sampling points to the reference line 154 as the first measurement distance d1. In this manner, the computing device 130 may obtain distances from a limited number of sampling points to the reference line 154 by sampling to determine the above average distance. Therefore, the processing by the computing device 130 for determining the above average distance may be simplified. In addition, by adjusting the sampling interval, the computing device 130 may also adjust the accuracy of the above average distance.

As mentioned above when describing block 2520 of the example process 2500, the computing device 130 may also determine the second measurement distance d2 by sampling. Such examples will be described below with reference to FIGS. 28 and 29.

Figure 28:
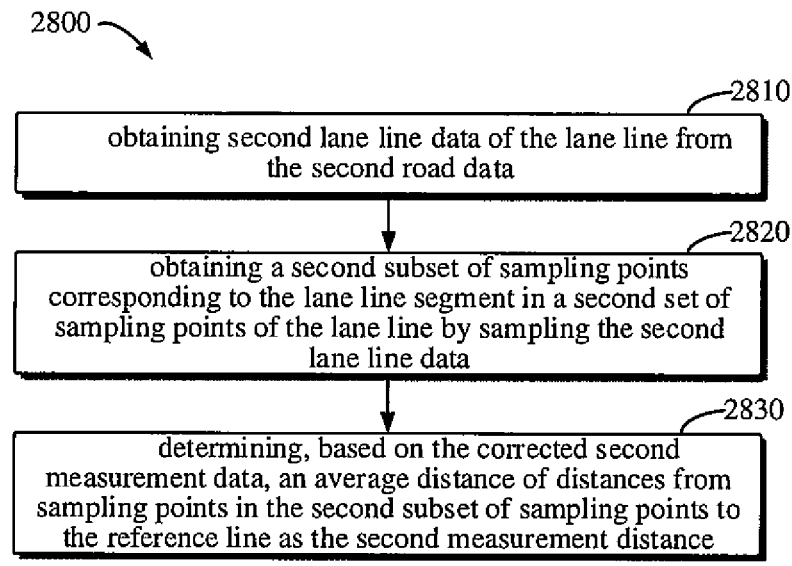
FIG. 28 is a flowchart of an example process of determining a second measurement distance from second road data according to an embodiment of the present disclosure.

FIG. 28 is a flowchart of an example process 2800 of determining the second measurement distance d2 from the second road data 125 according to an embodiment of the present disclosure. In some embodiments, the example process 2800 may be implemented by the computing device 130 in the example environment 100. For example, the example process 2800 may be implemented by a processor or a processing unit in the computing device 130, or implemented by various functional modules in the computing device 130. In other embodiments, the example process 2800 may also be implemented by a computing device independent of the example environment 100, or may be implemented by other units or modules in the example environment 100.

Figure 29:
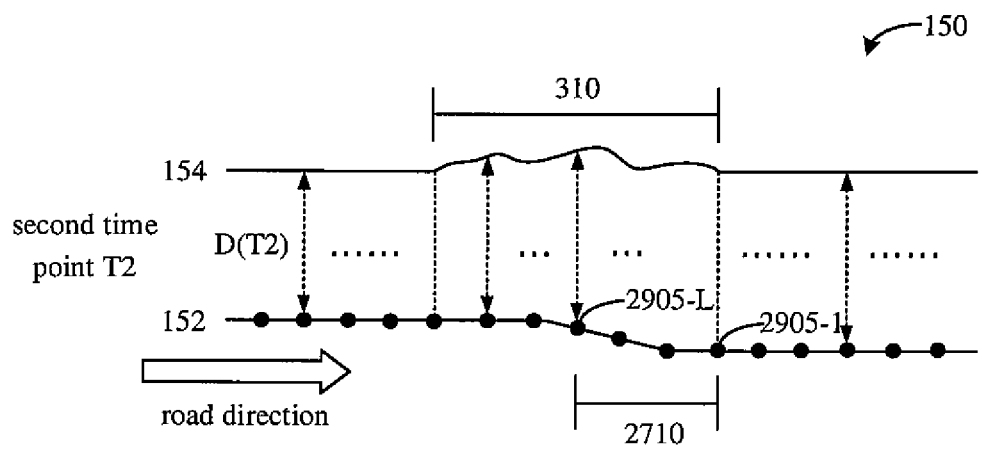
FIG. 29 is a schematic diagram of determining a second measurement distance from second road data according to an embodiment of the present disclosure.

FIG. 29 is a schematic diagram of determining the second measurement distance d2 from the second road data 125 according to an embodiment of the present disclosure. It should be understood that specific shapes of the lane line 152 and the reference line 154, the number of sampling points as well as other elements illustrated in FIG. 29 are only schematic, and are not intended to limit the scope of the present disclosure in any way. In other embodiments, the lane line 152 and the reference line 154 may be of any shape, and may have any suitable number of sampling points. In addition, the numbering of sampling points in FIG. 29 is only schematic, where the sampling point numbered 1 is not necessarily the first sampling point, the sampling point numbered L is not necessarily the last sampling point, and the direction of the numbering is not necessarily the same as the road direction for the convenience of description.

Referring to FIGS. 28 and 29, at block 2810, the computing device 130 may obtain second lane line data of the lane line 152 from the second road data 125. As described above, the second lane line data refers to any data used to describe the lane line 152 in the second road data 125. For example, in a case where the second road data 125 is a video shot by the low-precision device 120, the computing device 130 may extract a set of coordinate points representing the lane line 152 from the video of the road 150 as the second lane line data. In some embodiments, these coordinate points may be represented using latitude and longitude coordinates. It should be understood that, depending on the specific form of the second road data 125, the computing device 130 may obtain the second lane line data of the lane line 152 in other suitable ways.

At block 2820, the computing device 130 may sample the second lane line data to obtain a second subset of sampling points 2905-1 to 2905-L (collectively referred to as a subset 2905 of sampling points) corresponding to the lane line segment 2710 in the second set of sampling points of the lane line 152. In some embodiments, the sampling may be performed at a predetermined sampling interval, and the sampling interval may be determined by those skilled in the art based on factors such as specific accuracy requirements and technical environment. For example, in practice, the sampling interval may be set to 1 meter, which is beneficial to achieve a balance between the calculation amount and the calculation accuracy of the sampling performed by the computing device 130. However, it should be understood that this specific value of the sampling interval is only illustrative and is not intended to limit the scope of the present disclosure in any way. In other embodiments, the sampling interval may be of any suitable value. More generally, the computing device 130 may also sample the second lane line data at uneven sampling intervals.

At block 2830, the computing device 130 may determine, based on the second measurement data D(T2), an average distance of distances from the sampling points 2905-1 to 2905-L in the second subset 2905 of sampling points to the reference line 154 as the second measurement distance d2. In this manner, the computing device 130 may obtain distances from a limited number of sampling points to the reference line 154 by sampling to determine the above average distance. Therefore, the processing of the computing device 130 for determining the above average distance may be simplified. In addition, by adjusting the sampling interval, the computing device 130 may also adjust the accuracy of the above average distance.

Reuse of the Average Value for Correction and the Average Value for Determining Variations of Distances In the example process 1200 of determining a variation value of the first measurement data D(T1) associated with a sampling point as described above with reference to FIG. 12, for each sampling point of the first lane line data, the computing device 130 determines the first average distance of distances from the first predetermined number of sampling points before the sampling point to the reference line, and the second average distance of distances from the second predetermined number of sampling points after the sampling point to the reference line. In FIG. 13, the first predetermined number of sampling points correspond to the lane line segment 1310, and the second predetermined number of sampling points correspond to the lane line segment 1320.

Similarly, in the example process 1500 of determining a variation value of the corrected second measurement data D(T2) associated with a sampling point as described above with reference to FIG. 15, for each sampling point of the second lane line data, the computing device 130 determines the third average distance of distances from the first predetermined number of sampling points before the sampling point to the reference line, and the fourth average distance of distances from the second predetermined number of sampling points after the sampling point to the reference line. In FIG. 16, the first predetermined number of sampling points correspond to the lane line segment 1610, and the second predetermined number of sampling points correspond to the lane line segment 1620.

On the other hand, as in the example process 2600 of determining the first measurement distance d1 described above with reference to FIG. 26, the computing device 130 determines the average distance of distances from the first subset of sampling points in the first set of sampling points to the reference line 154. The first subset of sampling points corresponds to the lane line segment 2710 in FIG. 27. Similarly, in the example process 2800 of determining the second measurement distance d2 described with reference to FIG. 28, the computing device 130 determines the average distance of distances from the second subset of sampling points in the second set of sampling points to the reference line 154. The second subset of sampling points corresponds to the lane line segment 2710 in FIG. 29.

Therefore, in some embodiments, the computing device 130 may use the average value obtained when determining the variation values for the correction process of the second measurement data D(T2). For example, for each sampling point of the first lane line data, the computing device 130 may use the first average distance corresponding to each sampling point in the example process 1200 as the first measurement distance d1 in the example process 2600. For each sampling point of the second lane line data, the computing device 130 may use the third average distance corresponding to each sampling point in the example process 1500 as the second measurement distance d2 in the example process 2800. That is, the lane line segment 1310 in FIG. 13 may be the lane line segment 2710 in FIG. 27, and the lane line segment 1610 in FIG. 16 may be the lane line segment 2710 in FIG. 29. Such examples will be described below with reference to FIG. 30.

Alternatively, in other embodiments, for each sampling point of the first lane line data, the computing device 130 may use the second average distance corresponding to each sampling point in the example process 1200 as the first measurement distance d1 in the example process 2600. For each sampling point of the second lane line data, the computing device 130 may use the fourth average distance corresponding to each sampling point in the example process 1500 as the second measurement distance d2 in the example process 2800. That is, the lane line segment 1320 in FIG. 13 may be the lane line segment 2710 in FIG. 27, and the lane line segment 1620 in FIG. 16 may be the lane line segment 2710 in FIG. 29.

Figure 30:
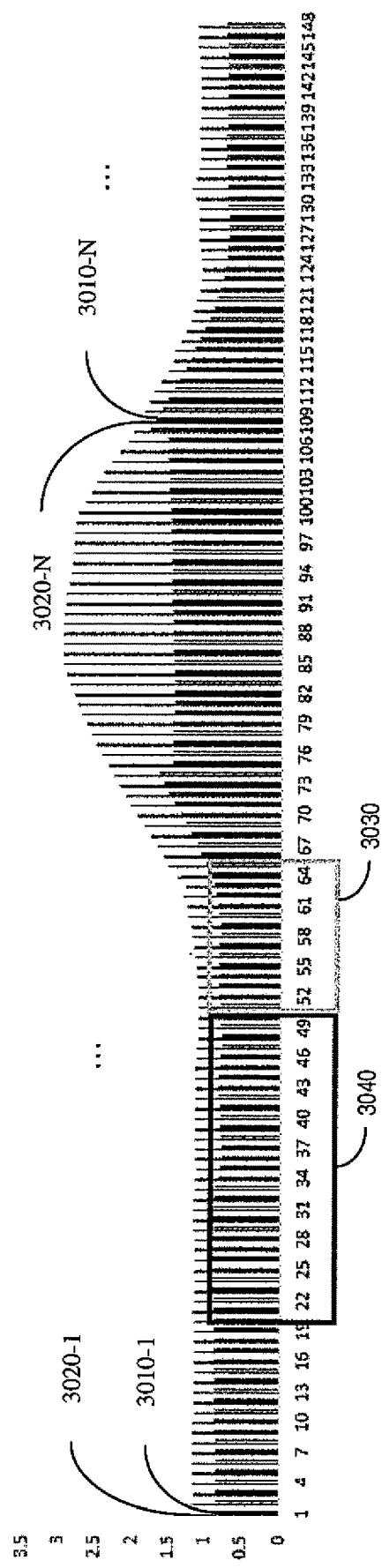
FIG. 30 is a schematic diagram of processing first measurement data and second measurement data using a backward stability window and a forward smoothing window according to an embodiment of the present disclosure.

FIG. 30 is a schematic diagram of processing first measurement data 3010-1 to 3010-N (collectively referred to as first measurement data 3010) and second measurement data 3020-1 to 3020-N (collectively referred to as second measurement data 3020) using a backward stability window 3040 and a forward smoothing window 3030 according to an embodiment of the present disclosure. In FIG. 30, the horizontal axis represents numberings of sampling points on the lane line 152, and the sampling interval is 1 meter. The vertical axis represents a measured value of the distance D between the lane line 152 and the reference line 154. In addition, FI. 30 also shows the first measurement data 3010 obtained based on the first road data 115 of the high-precision device 110 and the second measurement data 3020 obtained based on the second road data 125 of the low-precision device 120. It should be noted that, for different sampling points, the backward stability window 3040 and the forward smoothing window 3030 slide while remaining constant in size.

As can be seen from FIG. 30, at each sampling point, the first measurement data 3010 and the second measurement data 3020 are different. In order to determine the average value for correcting the second measurement data 3020 described above as the average value for determining the variation values, the computing device 130 may set the length of the lane line segment 2710 for the correction operation to be the same as that of the lane line segments 1310 and 1610 for determining the variation values. In other words, the backward stability window 3040 shown in FIG. 30 may be used to determine the variation values, and may also be used to determine a ratio of correcting the second measurement data 3020.

More specifically, for each sampling point in the first measurement data, the variation value corresponding to each sampling point may be based on a difference between an average value of measurement distances in the forward smoothing window 3030 and an average value of measurement distances in the backward stability window 3040. Similarly, for each sampling point in the second measurement data, the variation value corresponding to each sampling point may be based on a difference between an average value of measurement distances in the forward smoothing window 3030 and an average value of measurement distances in the backward stability window 3040. Further, the ratio for correcting the second measurement data 3020 may be based on an average value of measurement distances in the backward stability window 3040 of the sampling points of the first measurement data and an average value of the measurement distances in the backward stability window 3040 of corresponding sampling points of the second measurement data.

In some embodiments, the number of sampling points in the backward stability window 3040 may be set to 60 in combination with actual experimental results and requirements on the efficiency of calculation. In a case where the sampling interval is 1 meter, the backward stability window 3040 corresponds to a 60-meter lane line segment. In addition, the number of sampling points in the forward smoothing window 3030 may be set to 20. In the case where the sampling interval is 1 meter, the forward smoothing window 3030 corresponds to a 20-meter lane line segment. It should be understood that the specific numerical values listed here are only exemplary and are not intended to limit the scope of the present disclosure in any way. In other embodiments, the forward smoothing window 3030 and the backward stability window 3040 may be set by the computing device 130 to include any suitable number of sampling points, or correspond to any suitable length of lane line segment.

As an example, in the process of determining the variation value from the second road data 125 obtained by the low-precision device 120, the computing device 130 may directly perform correction, also referred to as normalization, on the difference between the average distances of distances from the plurality of sampling points before and after a certain sampling point to the reference line 154 so as to correct the second road data 125 in an alternative manner. For example, this may be used to correct the distance between each sampling point of the lane line 152 and the reference point 154. In addition, since the above distance may also be assumed to be a "lane", the above correction process for the difference may also be referred to as "lane width normalization", and a calculation method of the "lane width normalization" is described as follows.

First, for the second measurement data 3020 (also called the lane width, denoted as left_lane_width) from the low-precision device 120, a sampling point is given, and an average value (denoted as avgWidthGroupB) of left_lane_width in the backward stability window 3040 (denoted as GroupB) is obtained. Then, normalization (for example, linear normalization) is performed on the above average value and an average value (denoted as hpAvgWidthGroupB) of left_lane_width in the backward stability window 3040 of a corresponding sampling point of the first measurement data 3010 from the high-precision device 110. A normalization ratio of the above two average values is denoted as ratio_bk, that is, ratio_bk=avgWidthGroupB/hpAvgWidthGroupB.

For the sampling point in the second measurement data 3020, a difference between an average value of lane widths in the forward smoothing window 3030 (denoted as GroupF) and an average value of lane widths in the backward stability window 3040 is calculated and is expressed as lwcd= (avgWidthGroupF−avgWidthGroupB), which is a variation of left_lane_width. Next, the above ratio ratio_bk is used to correct (or normalize) the difference obtained, and the difference obtained is expressed as lwcd_corrected=lwcd*ratio_bk, which is a variation of the normalized lane width. The computing device 130 may determine a variation value corresponding to the sample point of the second measurement data 3020 based on the variation of the normalized lane width (that is, lwcd_corrected).

Verification of a Position Change of the Lane Line Based on an Azimuth Angle

The inventor found through research that when a value of an azimuth angle is obtained by a satellite positioning module (for example, a satellite positioning system of a vehicle equipped with a driving recorder, or a built-in satellite positioning module in a driving recorder, etc.) associated with the low-precision device 120 (for example, a crowd-sourced device), there may be a large error at a specific position. For example, a measurement error of the azimuth angle of a common consumer-level satellite positioning device is about 0.3. As used herein, the azimuth angle refers to a horizontal angle formed clockwise from true north to a target direction.

However, for a distance (for example, greater than 200 meters), the value of the azimuth angle measured by the low-precision device 120 returns to a true value. In other words, if a difference between two azimuth angles measured by the low-precision device 120 at different positions or a difference between distances corresponding to the two azimuth angles is calculated, the influence of the above-mentioned error of the azimuth angle may be reduced or eliminated. Therefore, when collecting the second road data 125, two azimuth angles of the low-precision device 120 at the start position and the end position of the target region 310 may be used to verify the position change of the lane line 152 detected through the example process 200 so as to further improve the accuracy in detecting the position change of the lane line. In the following, this method may also be referred to as an "equivalent conversion method of an azimuth angle".

In detail, the computing device 130 may obtain a first measurement azimuth angle of the low-precision device 120 at a start position corresponding to the target region 310 and a second measurement azimuth angle of the low-precision device 120 at an end position corresponding to a target region 320. For example, in a case where the low-precision device 120 is a driving recorder, the above-mentioned first measurement azimuth angle and second measurement azimuth angle may be obtained from a satellite positioning system of a vehicle on which the low-precision device 120 is installed. In addition, in a case where the low-precision device 120 has a satellite positioning module, the above-mentioned first measurement azimuth angle and the second measurement azimuth angle may be obtained from the low-precision device 120. It should be understood that, depending on the specific form of the low-precision device 120, the computing device 130 may obtain the first measurement azimuth angle and the second measurement azimuth angle in any other suitable manner.

The computing device 130 may verify the position change of the lane line 152 within the target region 310 based on the first measurement azimuth angle and the second measurement azimuth angle. For example, the computing device 130 may determine whether an extension direction of the lane line 152 changes based on the difference between the first measurement azimuth angle and the second measurement azimuth angle. If the extension direction of the lane line 152 changes, the computing device 130 may determine that the detected position change of the lane line 152 is true. In some embodiments, the computing device 130 may also set a threshold for a determined change in the extension direction of the lane line 152 so as to filter out small changes in the extension direction of the lane line 152 caused by measurement errors.

Alternatively, in other embodiments, the computing device 130 may also determine a first reference azimuth angle corresponding to the start position in the target region 310 and a second reference azimuth angle corresponding to the end position corresponding to the target region 320 based on the first measurement data D(T1) associated with the high-precision device 110. The computing device 130 may verify the position change of the lane line 152 through further processing of the reference azimuth angles and the measurement azimuth angles. Such examples will be described below with reference to FIGS. 31 to 33.

Figure 31:
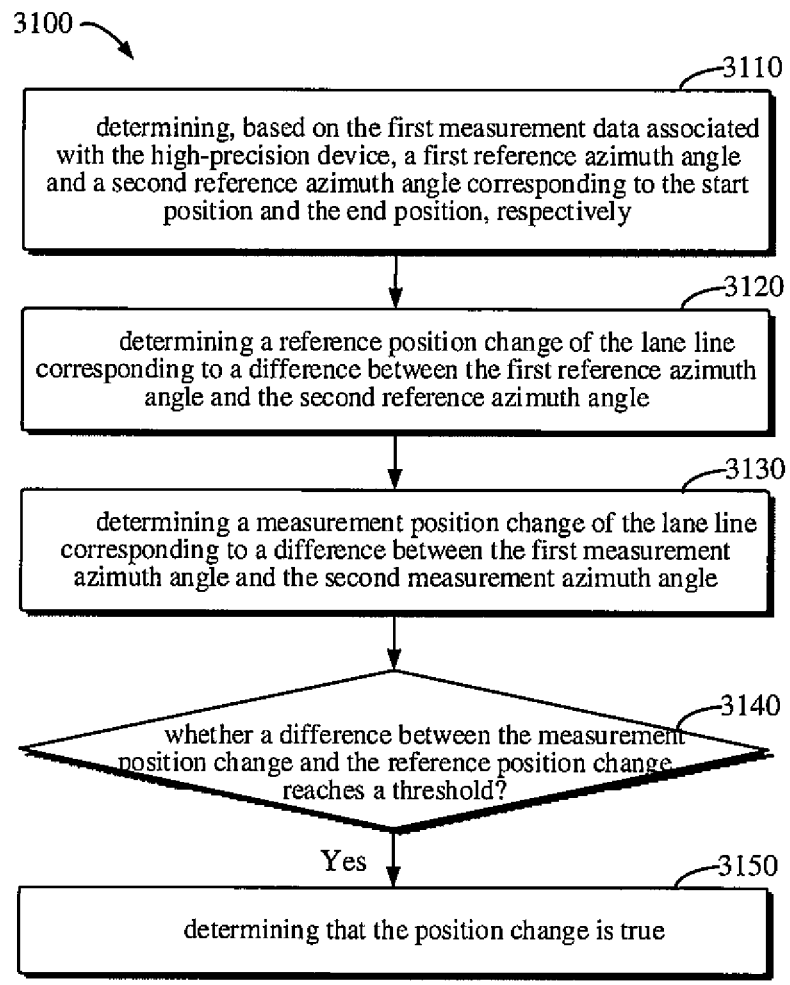
FIG. 31 is a flowchart of an example process of verifying a position change of a lane line by an azimuth angle according to an embodiment of the present disclosure.

FIG. 31 is a flowchart of an example process 3100 of verifying a position change of the lane line 152 by an azimuth angle according to an embodiment of the present disclosure. In some embodiments, the example process 3100 may be implemented by the computing device 130 in the example environment 100. For example, the example process 3100 may be implemented by a processor or a processing unit in the computing device 130, or implemented by various functional modules in the computing device 130. In other embodiments, the example process 3100 may also be implemented by a computing device independent of the example environment 100, or may be implemented by other units or modules in the example environment 100.

Figure 32:
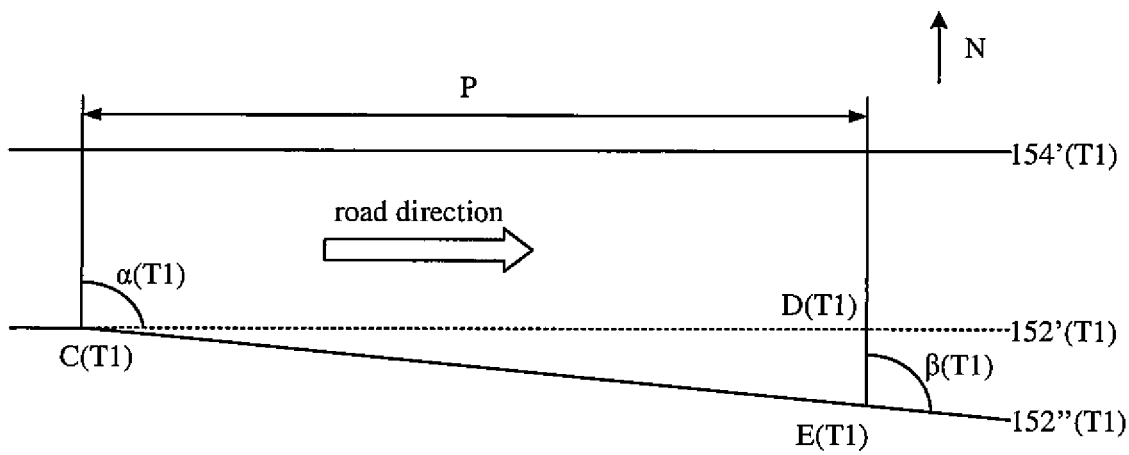
FIG. 32 is a schematic diagram of reference azimuth angles of a target region at a start position and an end position at a first time point according to an embodiment of the present disclosure.

FIG. 32 is a schematic diagram of reference azimuth angles α(T1) and β(T1) of the target region 310 at the start position and the end position at the first time point T1 according to an embodiment of the present disclosure. It should be noted that FIG. 32 illustrates a schematic diagram of an equivalent conversion, in which the reference line 154'(T1) is an imaginary straight reference line obtained by performing equivalent conversion on change of a reference azimuth angle, not a real reference line. Similarly, the lane line 152'(T1) is an imaginary old lane line that is parallel to the reference line 154'(T1) and has a first reference point C(T1) and a second reference point D(T1). A length P between the two reference points is equal to the length of the target region 310.

In addition, the lane line 152"(T1) is an imaginary new lane line, which has an offset relative to the old lane line 152'(T1). The lane line 152"(T1) coincides with the old lane line 152'(T1) at the first reference point C(T1), and extends to a third reference point E(T1) at a position corresponding to the second reference point D(T1) of the old lane line 152'(T1). In addition, the first reference azimuth angle α(T1) at the first reference point C(T1) and the second reference azimuth angle β(T1) at the third reference point E(T1) may be obtained from the first road data 115 or the first measurement data D(T1). FIG. 32 also schematically shows a direction perpendicular to the road direction as north, thereby simplifying the illustration of the azimuth angle. However, it should be understood that, embodiments of the present disclosure are not limited to a specific orientation, and are applicable to any orientation by performing a simple rotation conversion on the coordinate system.

Figure 33:
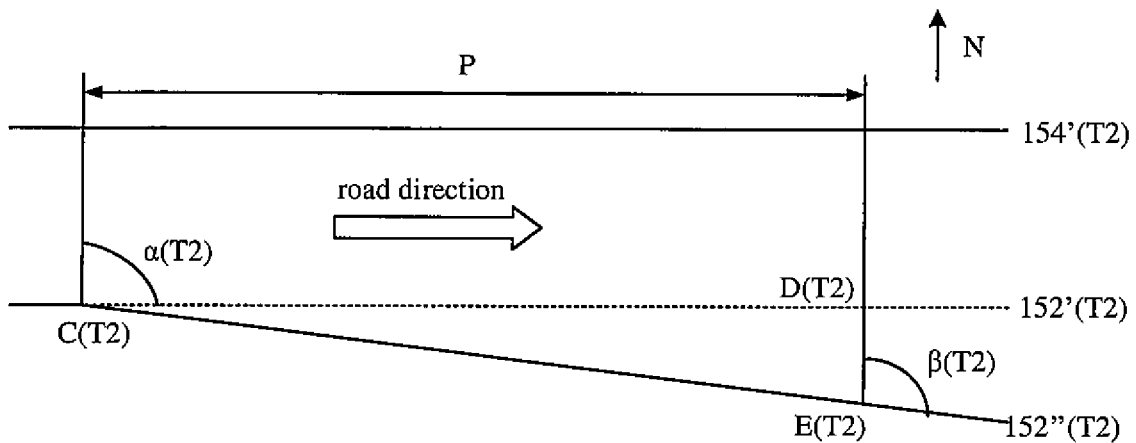
FIG. 33 is a schematic diagram of measurement azimuth angles of a target region at a start position and an end position at a second time point according to an embodiment of the present disclosure.

FIG. 33 is a schematic diagram of measurement azimuth angles α(T2) and β(T2) of the target region 310 at the start position and the end position at the second time point T2 according to an embodiment of the present disclosure. Similarly, FIG. 33 also illustrates a schematic diagram of an equivalent conversion, in which the reference line 154'(T2) is an imaginary straight reference line obtained by performing equivalent conversion on change of a measurement azimuth angle, not a real reference line. Similarly, the lane line 152'(T2) is an imaginary old lane line that is parallel to the reference line 154'(T2) and has a first reference point C(T2) and a second reference point D(T2). A length P between the two reference points is equal to the length of the target region 310.

In addition, the lane line 152"(T2) is an imaginary new lane line, which has an offset relative to the old lane line 152'(T2). The lane line 152"(T2) coincides with the old lane line 152'(T2) at the first reference point C(T2), and extends to a third reference point E(T2) at a position corresponding to the second reference point D(T2) of the old lane line 152'(T2). In addition, the first measurement azimuth angle α(T2) at the first reference point C(T2) and the second measurement azimuth angle β(T2) at the third reference point E(T2) may be obtained from the second road data 125 by, for example, the satellite positioning module in the low-precision device 120. FIG. 33 also schematically shows a direction perpendicular to the road direction as north, thereby simplifying the illustration of the azimuth angle. However, it should be understood that embodiments of the present disclosure are not limited to a specific orientation, and are applicable to any orientation by performing a simple rotation conversion on the coordinate system.

Referring to FIGS. 31 and 32, at block 3110, the computing device 130 may determine, based on the first measurement data D(T1) associated with the high-precision device 110, the first reference azimuth angle α(T1) and the second reference azimuth angle β(T1) corresponding to the start position and the end position of the target region 310, respectively. For example, in a case where the first measurement data D(T1) is expressed by a function, the computing device 130 may calculate tangential directions of the first measurement data D(T1) at the start position and the end position of the target region 310, and then convert the tangential directions into the first reference azimuth angle α(T1) and the second reference azimuth angle β(T1).

Alternatively, in a case where the first measurement data D(T1) is represented by sampling, for a sampling point at the start position of the target region 310, the computing device 130 may determine the first reference azimuth angle α(T1) based on changes of distances from samplings points before and after the sampling point to the reference line 154. Similarly, for a sampling point at the end position of the target region 310, the computing device 130 may determine the second reference azimuth angle β(T1) based on changes of distances from samplings points before and after the sampling point to the reference line 154. In other embodiments, the first reference azimuth angle α(T1) and the second reference azimuth angle β(T1) may also be obtained by the high-precision device 110 when collecting the first road data 115.

Referring to FIGS. 31 and 32, at block 3120, the computing device 130 may determine a reference position change D(T1)E(T1) of the lane line corresponding to a difference between the first reference azimuth angle α(T1) and the second reference azimuth angle β(T1). For example, as illustrated in FIG. 32, corresponding to the change of the reference azimuth angle from the first reference azimuth angle α(T1) at position C(T1) to the second reference azimuth angle β(T1) at position E(T1), the imaginary new lane line 152"(T1) and the old lane line 152'(T1) undergo the position change D(T1)E(T1). In other words, due to the change of the reference azimuth angles at the start and end positions of the target region 310, a change in a lateral distance D(T1)E(T1) at the length P is generated. The lateral distance D(T1)E(T1) may be expressed by a formula, which is: D(T1)E(T1)=P×tan(β(T1)−α(T1)), where tan ( ) is a tangent function.

Referring to FIGS. 31 and 33, at block 3130, the computing device 130 may determine a measurement position change D(T2)E(T2) of the lane line corresponding to a difference between the first measurement azimuth angle α(T2) and the second measurement azimuth angle β(T2). For example, as illustrated in FIG. 33, corresponding to the change of the measurement azimuth angle from the first measurement azimuth angle α(T2) at position C(T2) to the second measurement azimuth angle β(T2) at position E(T2), the imaginary new lane line 152"(T2) and the old lane line 152'(T2) undergo the position change D(T2)E(T2). In other words, due to the change of the measurement azimuth angles at the start and end positions of the target region 310, a change in a lateral distance D(T2)E(T2) at the length P is generated. The lateral distance D(T2)E(T2) may be expressed by a formula, which is: D(T2)E(T2)=P×tan(β(T2)−α(T2)), where tan ( ) is a tangent function.

Referring to FIG. 31, at block 3140, the computing device 130 may determine whether a difference between the measurement position change D(T2)E(T2) and the reference position change D(T1)E(T1) reaches a threshold. The above difference may be expressed by a formula Δ=D(T2)E(T2)−D(T1)E(T1). It should be understood that the threshold here may be determined by those skilled in the art based on factors such as specific accuracy requirements and technical environment. For example, the value of the threshold may be determined based on the length P of the target region 310, for the reason that the longer the length P of the target region 310, the greater the change of the lateral distance generated under the same change of the azimuth angle.

In some embodiments, in order to use the same threshold for target regions of different lengths, the computing device 130 may normalize the above-mentioned difference Δ to the change of the lateral distance caused by a change of an azimuth angle relative to a fixed length. For example, in a case where the fixed length is 50 meters, the normalization may be expressed as: Δn=Δ×50/P=P×tan(β(T2)−α(T2))×50/P−P×tan((T1)−α(T1))×50/P=50 tan(β(T2)−α(T2))−50 tan(β(T1)−α(T1)). In practice, a fixed threshold for comparison with the normalized Δn may be set to 0.53. It should be understood that any specific numerical values listed here are only exemplary and are not intended to limit the scope of the present disclosure in any way. In other embodiments, any of the above-mentioned numerical values may be other suitable values.

Referring to FIG. 31, at block 3150, in response to the above-mentioned difference Δ reaching the predetermined threshold, the computing device 130 may determine that the position change of the lane line 152 is true. For example, in a case of using the above normalized difference Δn, when |Δn| is greater than or equal to 0.53 meters, the computing device 130 may determine that the position change of the lane line 152 detected in the example process 200 is true. The higher the value of |Δn|, the higher the confidence that the position change of the lane line 152 is true. On the other hand, if the above-mentioned difference does not reach the threshold, the computing device 130 may consider that the position change of the lane line 152 detected in the example process 200 is due to an error. For example, in a case of using the above normalized difference Δn, when |Δn| is less than 0.53 meters, the computing device 130 may determine that the detected position change of the lane line is invalid.

Through the example process 3100, the computing device 130 may process the change of the reference azimuth angle associated with the first measurement data D(T1) and the change of the measurement azimuth angle associated with the second measurement data D(T2) based on the same manner of processing the azimuth angles, thereby reducing the error in the difference between the finally obtained measurement position change and the reference position change, and improving the effectiveness of verifying the position change of the lane line 152.

In particular, in some embodiments, for a region on the road 150 corresponding to the opening of a median strip, the area equivalent conversion method described above in the example processes 500 and 800 and the equivalent conversion method of the azimuth angle described in the example process 3100 may be combined to obtain a "equivalent indicator joint determination method". The equivalent indicator joint determination method may effectively filter out misidentifications of the position change of the lane line caused by the opening of a median strip, while retaining valid position change of the lane line, such that the automation rate is improved.

Table 2 shows actual measurement results for the five target regions in Table obtained by using the equivalent conversion method of the azimuth angle described above. The devices for measurement include a high-precision device and two different low-precision devices 1 and 2 (also known as crowd-sourced devices 1 and 2). What is calculated is an equivalent lateral change obtained after the equivalent position change obtained through the conversion of the azimuth angle is normalized to a fixed length of 50 meters.

TABLE 2

Verification of the Position Change of the Lane Line by Applying the Equivalent Conversion Method of the Azimuth Angle

| Target region | Source | Position change calculated with the azimuth angle | Difference of the position change calculated with the azimuth angle | Whether the difference is greater than the threshold? |
|---|---|---|---|---|
| Target region 1 | High-precision device | 0.138756 | | |
| | Crowd-sourced device 1 | −1.87341 | −2.01216 | T |
| | Crowd-sourced device 2 | 1.024246 | 0.88549 | T |
| Target region 2 | High-precision device | 0.00034843 | | |
| | Crowd-sourced device 1 | 1.001412 | 1.001064 | T |
| | Crowd-sourced device 2 | −0.73306 | −0.73341 | T |
| Target region 3 | High-precision device | 0.00019066 | | |
| | Crowd-sourced device 1 | −0.58479 | −0.58498 | T |
| | Crowd-sourced device 2 | 0.829455 | 0.829264 | T |
| Target region 4 | High-precision device | 0.00035499 | | |
| | Crowd-sourced device 1 | 0.162512 | 0.162157 | F |
| | Crowd-sourced device 2 | 0.741321 | 0.740966 | T |
| Target region 5 | High-precision device | 0.00025266 | | |
| | Crowd-sourced device 1 | −0.43964 | −0.4399 | F |
| | Crowd-sourced device 2 | −2.13788 | −2.13814 | T |

In the last column of Table 2, the letter T represents a measurement result that the absolute value $|\Delta|=|D(T2)E(T2)-D(T1)E(T1)|$ of the difference between the measurement position change and the reference position change reaches the threshold, and the letter F represents a measurement result that the absolute value of the above difference does not reach the threshold. As can be seen from Table 2, the "equivalent conversion method of the azimuth angle" proposed herein may effectively filter out a large amount of misidentifications of the position change of the lane line caused by regions where the distance between the lane line and the reference line is unstable.

Therefore, an example algorithm for detecting the position change of the lane line with the equivalent indicator joint determination method combining the area equivalent conversion method and the equivalent conversion method of the azimuth angle is as follows. First, the area equivalent conversion method is used. If the difference $|F(T2)-F(T1)|$ (see FIGS. 3B and 4B) between the first and second equivalent position changes do not reach a first threshold, it means that the equivalent position change of the lane line at a predetermined distance (for example, 50 meters) caused by the target region 310 is lower than the lowest threshold that a detection system may detect. In this case, the example algorithm may exit and a detection result "false" is returned.

On the other hand, it is not determined whether the position change of the lane line 152 actually occurs when $|F(T2)-F(T1)|$ is greater than the above-mentioned first threshold, and the equivalent conversion method of the azimuth angle may be continued to be used for performing determination. If $|\Delta|=|D(T2)E(T2)-D(T1)E(T1)|$ (see FIGS. 32 and 33) does not reach a second threshold, it means that the equivalent position change of the lane line at the predetermined distance (for example, 50 meters) caused by a change of the azimuth angles at the start and end positions of the target region 310 is lower than the lowest threshold that the detection system may detect. In this case, the example algorithm may exit and a detection result "false" is returned.

If $|\Delta|$ reaches the second threshold, it means that a true position change of the lane line 152 is of a great probability. In this case, the example algorithm may exit and the detection result "true" is returned. In some embodiments, the first threshold and the second threshold may be set to be the same by appropriately normalizing detected differences (e.g., area equivalent position difference and azimuth-angle equivalent position difference).

Table 3 shows a set of example results of actually measuring the five target regions numbered 1 to 5 in Table 1 and Table 2 by the high-precision device and two low-precision devices (also known as crowd-sourced device 1 and crowd-sourced device 2) with the above-mentioned equivalent indicator joint determination method.

TABLE 3

Determining the Position Change of the Lane Line by Applying the Equivalent Indicator Joint Determination Method

| Target region | Source | Condition 1 Area equivalent conversion | Condition 2 Azimuth-angle equivalent conversion | Both condition 1 and condition 2 are satisfied |
|---|---|---|---|---|
| Target region 1 | High-precision device | | | |
| | Crowd-sourced device 1 | F | T | F |
| | Crowd-sourced device 2 | F | T | F |
| Target region 2 | High-precision device | | | |
| | Crowd-sourced device 1 | F | T | F |
| | Crowd-sourced device 2 | F | T | F |
| Target region3 | High-precision device | | | |
| | Crowd-sourced device 1 | T | T | T |
| | crowd-sourced device 2 | F | T | F |
| Target region 4 | High-precision device | | | |
| | Crowd-sourced device 1 | F | F | F |
| | Crowd-sourced device 2 | T | T | T |

TABLE 3-continued

Determining the Position Change of the Lane Line by Applying
the Equivalent Indicator Joint Determination Method

| Target region | Source | Condition 1 Area equivalent conversion | Condition 2 Azimuth-angle equivalent conversion | Both condition 1 and condition 2 are satisfied |
|---|---|---|---|---|
| Target region 5 | High-precision device Crowd-sourced device 1 Crowd-sourced device 2 | F F | F T | F F |

In the last column of Table 3, the letter T represents a measurement result that both the area equivalent conversion method and the azimuth angle conversion method satisfy a preset condition, and the letter F represents a measurement result that at least one of the above two methods does not satisfy the preset condition. As can be seen from Table 3, the equivalent indicator joint determination method proposed herein may effectively filter out a large amount of misidentifications of the position change of the lane line caused by the region where the distance between the lane line and the reference line is unstable. In practice, detection results that are "true" in Table 3 above may be further reviewed manually so as to fully confirm whether the lane line changes. In actual operations, differences ($|F(T2)-F(T1)|$ and $|D(T2)E(T2)-D(T1)E(T1)|$) respectively obtained by using the above two methods may be sequenced, for example, from high to low, for the reason that the greater the difference is, the greater the magnitude of the detected equivalent position change of the lane line.

Example Apparatus

Figure 34:
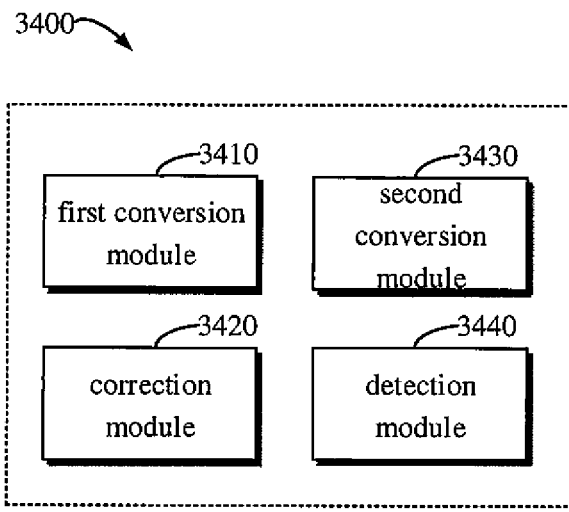
FIG. 34 is a block diagram of an apparatus for detecting a position change of a lane line according to an embodiment of the present disclosure.

FIG. 34 is a block diagram of an apparatus 3400 for detecting a position change of a lane line according to an embodiment of the present disclosure. In some embodiments, the apparatus 3400 may be included in the computing device 130 as illustrated in FIG. 1, or may be implemented as the computing device 130.

As illustrated in FIG. 34, the apparatus 3400 includes a first conversion module 3410, a correction module 3420, a second conversion module 3430, and a detection module 3440.

The first conversion module 3410 is configured to convert a first change in a target region of first measurement data of a distance between a lane line and a reference line on a road to a first equivalent position change of the lane line. The first measurement data is obtained from first road data collected by a high-precision device on the road at a first time point, and the target region is between the lane line and the reference line. The correction module 3420 is configured to correct second measurement data of the distance with the first measurement data. The second measurement data is obtained from second road data collected by a low-precision device on the road at a second time point, the second time point is after the first time point. The second conversion module 3430 is configured to convert a second change of the corrected second measurement data in the target region to a second equivalent position change of the lane line. The detection module 3440 is configured to detect a position change of the lane line in the target region between the first time point and the second time point based on a comparison of the first equivalent position change and the second equivalent position change.

In some embodiments, the first conversion module 3410 includes a first curve determination submodule, a first area determination submodule, a first equivalent region determination submodule, and a first equivalent position change determination submodule.

The first curve determination submodule is configured to determine a first curve representing the first change in a coordinate system. A horizontal axis of the coordinate system represents a direction of the road, and a vertical axis of the coordinate system represents a value of the first change. The first area determination submodule is configured to determine a first area of a region between the first curve and the horizontal axis. The first equivalent region determination submodule is configured to determine a first equivalent region having the first area. The first equivalent position change determination submodule is configured to determine the first equivalent position change based on the first equivalent region.

In some embodiments, the first equivalent region includes a right-angled triangle region. A length of one right-angled side of the right-angled triangle region is predetermined, and a length of the other right-angled side is the first equivalent position change.

In some embodiments, the apparatus 3400 further includes a first lane line data obtaining module, a first lane line data sampling module, a first sampling point group determination module, and a first variation group determination module.

The first lane line data obtaining module is configured to obtain first lane line data of the lane line from the first road data. The first lane line data sampling module is configured to obtain a first set of sampling points of the lane line by sampling the first lane line data. The first sampling point group determination module is configured to determine a group of sampling points corresponding to the target region from the first set group of sampling points. The first variation group determination module is configured to determine a group of variation values of first measurement data corresponding to the set of sampling points as the first change.

In some embodiments, for each sampling point in the group of sampling points, the first variation group determination module includes a first average distance determination submodule, a second average distance determination submodule, and a first variation determination submodule.

The first average distance determination submodule is configured to determine a first average distance of distances from a first predetermined number of sampling points before the sampling point to the reference line based on the first measurement data. The second average distance determination submodule is configured to determine a second average distance of distances from a second predetermined number of sampling points after the sampling point to the reference line based on the first measurement data. The first variation determination submodule is configured to determine a difference between the first average distance and the second average distance as a variation value of first measurement data associated with the sampling point.

In some embodiments, the apparatus 3400 further includes a first lane line data and first reference line data obtaining module, a first lane line data sampling module, and a first measurement data determination module.

The first lane line data and first reference line data obtaining module is configured to obtain first lane line data of the lane line and first reference line data of the reference line from the first road data. The first lane line data sampling module is configured to obtain a first set of sampling points of the lane line by sampling the first lane line data. The first measurement data determination module is configured to determine, based on the first lane line data and the first reference line data, a distance from each sampling point in the first set of sampling points to the reference line as the first measurement data.

In some embodiments, the correction module 3420 includes a first measurement distance determination submodule, a second measurement distance determination submodule, and a ratio-based correction submodule.

The first measurement distance determination submodule is configured to determine a first measurement distance between a lane line segment of a predetermined length of the lane line and the reference line based on the first measurement data. The second measurement distance determination submodule is configured to determine a second measurement distance between the lane line segment and the reference line based on the second measurement data. The ratio-based correction submodule is configured to correct measurement data associated with the lane line segment in the second measurement data with a ratio of the second measurement distance to the first measurement distance.

In some embodiments, the first measurement distance determination submodule includes a first lane line data obtaining unit, a first lane line data sampling unit, and a first average distance determination unit.

The first lane line data obtaining unit is configured to obtain first lane line data of the lane line from the first road data. The first lane line data sampling unit is configured to obtain a first subset of sampling points corresponding to the lane line segment in a first set of sampling points of the lane line by sampling the first lane line data. The first average distance determination unit is configured to determine, based on the first measurement data, an average distance of distances from sampling points in the first subset of sampling points to the reference line as the first measurement distance.

In some embodiments, the second measurement distance determination submodule includes a second lane line data obtaining unit, a second lane line data sampling unit, and a second average distance determination unit.

The second lane line data obtaining unit is configured to obtain second lane line data of the lane line from the second road data. The second lane line data sampling unit is configured to obtain a second subset of sampling points corresponding to the lane line segment in a second set of sampling points of the lane line by sampling the second lane line data. The second average distance determination unit is configured to determine, based on the corrected second measurement data, an average distance of distances from sampling points in the second subset of sampling points to the reference line as the second measurement distance.

In some embodiments, the second conversion module 3430 includes a second curve determination submodule, a second area determination submodule, a second equivalent region determination submodule, and a second equivalent position change determination submodule.

The second curve determination submodule is configured to determine a second curve representing the second change in a coordinate system. A horizontal axis of the coordinate system represents a direction of the road, and a vertical axis of the coordinate system represents a value of the second change. The second area determination submodule is configured to determine a second area of a region between the second curve and the horizontal axis. The second equivalent region determination submodule is configured to determine a second equivalent region having the second area. The second equivalent position change determination submodule is configured to determine the second equivalent position change based on the second equivalent region.

In some embodiments, the second equivalent region includes a right-angled triangle region. A length of one right-angled side of the right-angled triangle region is predetermined, and a length of the other right-angled side is the second equivalent position change.

In some embodiments, the apparatus 3400 further includes a second lane line data obtaining module, a second lane line data sampling module, a second sampling point group determination module, and a second variation group determination module.

The second lane line data obtaining module is configured to obtain second lane line data of the lane line from the second road data. The second lane line data sampling module is configured to obtain a second set of sampling points of the lane line by sampling the second lane line data. The second sampling point group determination module is configured to determine a group of sampling points corresponding to the target region from the second set of sampling points. The second variation group determination module is configured to determine a set of variation values of the corrected second measurement data corresponding to the group of sampling points as the second change.

In some embodiments, for each sampling point in the group of sampling points, the second variation group determination module includes a third average distance determination submodule, a fourth average distance determination submodule, and a second variation determination submodule.

The third average distance determination submodule is configured to determine a third average distance of distances from a first predetermined number of sampling points before the sampling point to the reference line based on the corrected second measurement data. The fourth average distance determination submodule is configured to determine a fourth average distance of distances from a second predetermined number of sampling points after the sampling point to the reference line based on the corrected second measurement data. The second variation determination submodule is configured to determine a difference between the third average distance and the fourth average distance as a variation value of the corrected second measurement data associated with the sampling point.

In some embodiments, the apparatus 3400 further includes a second lane line data and second reference line data obtaining module, a second lane line data sampling module, and a second measurement data determination module.

The second lane line data and second reference line data obtaining module is configured to obtain second lane line data of the lane line and second reference line data of the reference line from the second road data. The second lane line data sampling module is configured to obtain a second set of sampling points of the lane line by sampling the second lane line data. The second measurement data determination module is configured to determine, based on the second lane line data and the second reference line data, a distance from each sampling point in the second set of sampling points to the reference line as the second measurement data.

In some embodiments, the second lane line data and second reference line data obtaining module includes a video obtaining submodule, a sample point determination submodule, a second lane line data determination submodule, and a second reference line data determination submodule.

The video obtaining submodule is configured to obtain a video presenting the lane line and the reference line from the low-precision device. The sample point determination submodule is configured to determine a plurality of sample points of the lane line and a plurality of sample points of the reference line corresponding to a plurality of frames in the video, respectively. The second lane line data determination submodule is configured to determine the second lane line data based on the plurality of sample points of the lane line. The second reference line data determination submodule is configured to determine the second reference line data based on the plurality of sample points of the reference line.

In some embodiments, for each frame in the plurality of frames, the sample point determination submodule includes a frame position determination unit, a parameter determination unit, and a sample point obtaining unit.

The frame position determination unit is configured to determine a position corresponding to the frame based on a position track of the low-precision device corresponding to the video. The parameter determination unit is configured to determine a lane line parameter and a reference line parameter respectively configured to represent the lane line and the reference line in the frame based on the position. The sample point obtaining unit is configured to obtain, based on the lane line parameter and the reference line parameter, a sample point of the lane line and a sample point of the reference line respectively corresponding to the lane line and the reference line at a predetermined distance in front of the low-precision device.

In some embodiments, the detection module 3440 includes a first difference determination submodule and a position change determination submodule.

The first difference determination submodule is configured to determine a difference between the first equivalent position change and the second equivalent position change. The position change determination submodule is configured to, in response to determining that the difference reaches a threshold, determine that the position change of the lane line occurs.

In some embodiments, the apparatus 3400 further includes a measurement azimuth angle obtaining module and a verification module.

The measurement azimuth angle obtaining module is configured to obtain a first measurement azimuth angle of the low-precision device at a start position corresponding to the target region and a second measurement azimuth angle of the low-precision device at an end position corresponding to the target region. The verification module is configured to verify the position change of the lane line based on the first measurement azimuth angle and the second measurement azimuth angle.

In some embodiments, the verification module includes a reference azimuth angle obtaining submodule, a reference position change determination submodule, a measurement position change determination submodule, and a second difference determination submodule.

The reference azimuth angle obtaining submodule is configured to determine, based on the first measurement data associated with the high-precision device, a first reference azimuth angle and a second reference azimuth angle corresponding to the start position and the end position, respectively. The reference position change determination submodule is configured to determine a reference position change of the lane line corresponding to a difference between the first reference azimuth angle and the second reference azimuth angle. The measurement position change determination submodule is configured to determine a measurement position change of the lane line corresponding to a difference between the first measurement azimuth angle and the second measurement azimuth angle. The second difference determination submodule is configured to, in response to determining that a difference between the measurement position change and the reference position change reaches a threshold, determine that the position change is true.

In some embodiments, the target region corresponds to an opening of a median strip of the road.

In some embodiments, the reference line includes a road edge line or another lane line different from the lane line. The road edge line represents a boundary of a portion of the road available for a vehicle.

In some embodiments, the high-precision device includes a device for collecting data of a high definition map, and the low-precision device includes a driving recorder.

Example Device

Figure 35:
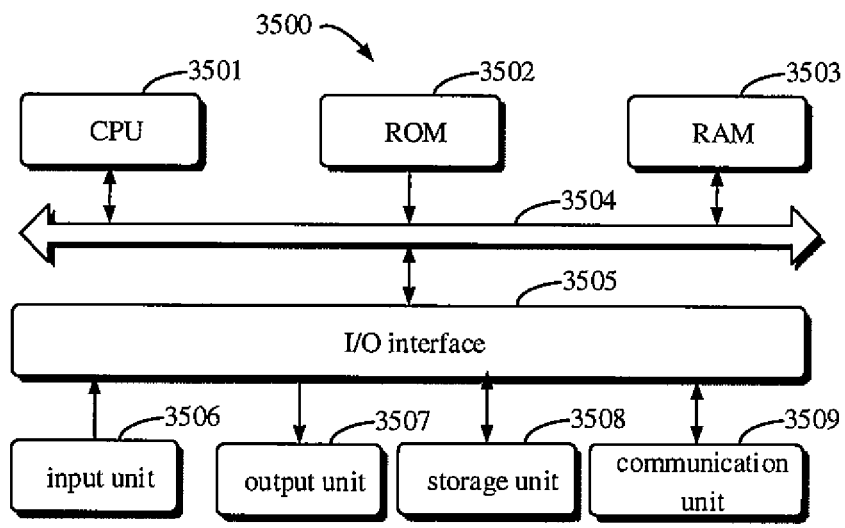
FIG. 35 is a block diagram of a device that may be used to implement embodiments of the present disclosure.

FIG. 35 is a block diagram of a device 3500 that may be used to implement embodiments of the present disclosure. As illustrated in FIG. 35, the device 3500 includes a central processing unit (CPU) 3501, which may perform various suitable actions and processes in accordance with computer program instructions stored in a read only memory (ROM) 3502 or loaded from a storage unit 3508 into a random access memory (RAM) 3503. In the RAM 3503, various programs and data necessary for operations of the device 3500 may also be stored. The CPU 3501, the ROM 3502, and the RAM 3503 are connected to each other through a bus 3504. An input/output (I/O) interface 3505 is also connected to the bus 3504.

A number of components in the device 3500 are connected to the I/O interface 3505, including: an input unit 3506 such as a keyboard, a mouse, and the like; an output unit 3507 such as various types of displays, speakers, etc.; a storage unit 3508 such as a magnetic disk, an optical disk, or the like; and a communication unit 3509 such as a network card, a modem, a wireless communication transceiver, and so on. The communication unit 3509 allows the device 3500 to exchange information/data with other devices via a computer network such as the Internet and/or various telecommunications networks.

The processing unit 3501 performs various processing and processes described above, such as the exemplary processes 200, 500, 800, 1100, 1200, 1400, 1500, 1800, 2000, 2200, 2300, 2500, 2600, 2800 and 3100. For example, in some embodiments, the exemplary processes 200, 500, 800, 1100, 1200, 1400, 1500, 1800, 2000, 2200, 2300, 2500, 2600, 2800 and 3100 may be implemented as a computer software program tangibly embodied on a machine-readable medium, such as the storage unit 3508. In some embodiments, some or all of the computer programs may be loaded and/or installed onto the device 3500 via the ROM 3502 and/or the communication unit 3509. When a computer program is loaded onto the RAM 3503 and executed by the CPU 3501, one or more steps in the exemplary processes 200, 500, 800, 1100, 1200, 1400, 1500, 1800, 2000, 2200, 2300, 2500, 2600, 2800 and 3100 described above may be performed.

Attentions

As used herein, the term "include" and its equivalents should be construed as open-ended inclusions, i.e., "include, but is not limited to". The term "according to" is to be understood as "at least partially according to". The term "an embodiment" or "the embodiment" should be understood as "at least one embodiment". Terms "first", "second" and the like may refer to different or identical objects. Other explicit and implicit definitions may also be included below.

As used herein, the term "determine" includes a variety of actions. For example, "determine" may include operating, calculating, processing, deriving, surveying, searching (e.g., searching in a table, a database, or another data structure), ascertaining, and so on. In addition, "determine" may include receiving (e.g., receiving information), accessing (e.g., accessing data in a memory), and the like. Also, "determine" may include analyzing, choosing, selecting, establishing, and the like.

It should be noted that embodiments of the present disclosure may be implemented by hardware, software, or a combination of software and hardware. The hardware may be implemented with dedicated logic. The software may be stored in a memory and executed by an appropriate instruction execution system, such as a microprocessor or specially-designed hardware. Those skilled in the art may understand that the above-mentioned devices and methods may be implemented using computer-executable instructions and/or through being included in processor control codes, which are, for example, provided on a programmable memory or a data carrier such as an optical or electronic signal carrier.

In addition, although the operations of the method of the present disclosure are described in a specific order in the drawings, this does not require or imply that the operations should be performed in the specific order, or all the operations illustrated should be performed to achieve the desired result. Instead, the execution order of steps illustrated in the flowchart may be changed. Additionally or alternatively, some steps may be omitted, different steps may be combined into one step for execution, and/or one step may be divided into several steps for execution. It should also be noted that features and functions of two or more devices according to the present disclosure may be embodied in one device. Similarly, features and functions of one device described above may be divided and then embodied by several devices.

Although the present disclosure has been described with reference to several specific embodiments, it should be understood that the present disclosure is not limited to the disclosed specific embodiments. The present disclosure is intended to cover various modifications and equivalent arrangements included within the spirit and scope of the attached claims.

What is claimed is:

1. A method for detecting a position change of a lane line, comprising:
   converting a first change in a target region of first measurement data of a distance between a lane line and a reference line on a road to a first equivalent position change of the lane line, the first measurement data being obtained from first road data collected by a high-precision device on the road at a first time point, and the target region being between the lane line and the reference line;
   correcting second measurement data of the distance with the first measurement data, the second measurement data being obtained from second road data collected by a low-precision device on the road at a second time point, the second time point being after the first time point;
   converting a second change of the corrected second measurement data in the target region to a second equivalent position change of the lane line; and
   detecting a position change of the lane line in the target region between the first time point and the second time point based on a comparison of the first equivalent position change and the second equivalent position change.

2. The method of claim 1, wherein converting the first change to the first equivalent position change comprises:
   determining a first curve representing the first change in a coordinate system, a horizontal axis of the coordinate system representing a direction of the road, and a vertical axis of the coordinate system representing a value of the first change;
   determining a first area of a region between the first curve and the horizontal axis;
   determining a first equivalent region having the first area; and
   determining the first equivalent position change based on the first equivalent region.

3. The method of claim 2, wherein the first equivalent region comprises a right-angled triangle region, a length of one right-angled side of the right-angled triangle region is predetermined, and a length of the other right-angled side is the first equivalent position change.

4. The method of claim 1, further comprising:
   obtaining first lane line data of the lane line from the first road data;
   obtaining a first set of sampling points of the lane line by sampling the first lane line data;
   determining a group of sampling points corresponding to the target region from the first set of sampling points; and
   determining a group of variation values of first measurement data corresponding to the group of sampling points as the first change.

5. The method of claim 4, wherein determining the group of variation values comprises:
   for each sampling point in the group of sampling points,
      determining a first average distance of distances from a first predetermined number of sampling points before the sampling point to the reference line based on the first measurement data;
      determining a second average distance of distances from a second predetermined number of sampling points after the sampling point to the reference line based on the first measurement data; and
      determining a difference between the first average distance and the second average distance as a variation value of first measurement data associated with the sampling point.

6. The method of claim 1, further comprising:
obtaining first lane line data of the lane line and first reference line data of the reference line from the first road data;
obtaining a first set of sampling points of the lane line by sampling the first lane line data; and
determining, based on the first lane line data and the first reference line data, a distance from each sampling point in the first set of sampling points to the reference line as the first measurement data.

7. The method of claim 1, wherein correcting the second measurement data comprises:
determining a first measurement distance between a lane line segment of a predetermined length of the lane line and the reference line based on the first measurement data;
determining a second measurement distance between the lane line segment and the reference line based on the second measurement data; and
correcting measurement data associated with the lane line segment in the second measurement data with a ratio of the second measurement distance to the first measurement distance.

8. The method of claim 7, wherein determining the first measurement distance comprises:
obtaining first lane line data of the lane line from the first road data;
obtaining a first subset of sampling points corresponding to the lane line segment in a first set of sampling points of the lane line by sampling the first lane line data; and
determining, based on the first measurement data, an average distance of distances from sampling points in the first subset of sampling points to the reference line as the first measurement distance.

9. The method of claim 7, wherein determining the second measurement distance comprises:
obtaining second lane line data of the lane line from the second road data;
obtaining a second subset of sampling points corresponding to the lane line segment in a second set of sampling points of the lane line by sampling the second lane line data; and
determining, based on the corrected second measurement data, an average distance of distances from sampling points in the second subset of sampling points to the reference line as the second measurement distance.

10. The method of claim 1, wherein converting the second change to the second equivalent position change comprises:
determining a second curve representing the second change in a coordinate system, a horizontal axis of the coordinate system representing a direction of the road, and a vertical axis of the coordinate system representing a value of the second change;
determining a second area of a region between the second curve and the horizontal axis;
determining a second equivalent region having the second area; and
determining the second equivalent position change based on the second equivalent region.

11. The method of claim 10, wherein the second equivalent region comprises a right-angled triangle region, a length of one right-angled side of the right-angled triangle region is predetermined, and a length of the other right-angled side is the second equivalent position change.

12. The method of claim 1, further comprising:
obtaining second lane line data of the lane line from the second road data;
obtaining a second set of sampling points of the lane line by sampling the second lane line data;
determining a group of sampling points corresponding to the target region from the second set of sampling points; and
determining a group of variation values of corrected second measurement data corresponding to the group of sampling points as the second change.

13. The method of claim 12, wherein determining the group of variation values comprises:
for each sampling point in the group of sampling points,
determining a third average distance of distances from a first predetermined number of sampling points before the sampling point to the reference line based on the corrected second measurement data;
determining a fourth average distance of distances from a second predetermined number of sampling points after the sampling point to the reference line based on the corrected second measurement data; and
determining a difference between the third average distance and the fourth average distance as a variation value of corrected second measurement data associated with the sampling point.

14. The method of claim 1, further comprising:
obtaining second lane line data of the lane line and second reference line data of the reference line from the second road data;
obtaining a second set of sampling points of the lane line by sampling the second lane line data; and
determining, based on the second lane line data and the second reference line data, a distance from each sampling point in the second set of sampling points to the reference line as the second measurement data.

15. The method of claim 14, wherein obtaining the second lane line data and the second reference line data comprises:
obtaining a video presenting the lane line and the reference line from the low-precision device;
determining a plurality of sample points of the lane line and a plurality of sample points of the reference line corresponding to a plurality of frames in the video, respectively;
determining the second lane line data based on the plurality of sample points of the lane line; and
determining the second reference line data based on the plurality of sample points of the reference line.

16. The method of claim 15, wherein determining the plurality of sample points of the lane line and the plurality of sample points of the reference line comprises:
for each frame in the plurality of frames;
determining a position corresponding to the frame based on a position track of the low-precision device corresponding to the video;
determining a lane line parameter and a reference line parameter respectively configured to represent the lane line and the reference line in the frame based on the position; and
obtaining, based on the lane line parameter and the reference line parameter, a sample point of the lane line and a sample point of the reference line respectively corresponding to the lane line and the reference line at a predetermined distance in front of the low-precision device.

17. The method of claim 1, further comprising:
obtaining a first measurement azimuth angle of the low-precision device at a start position corresponding to the target region and a second measurement azimuth angle of the low-precision device at an end position corresponding to the target region; and verifying the position change of the lane line based on the first measurement azimuth angle and the second measurement azimuth angle.

18. The method of claim 17, wherein verifying the position change comprises:
- determining, based on the first measurement data associated with the high-precision device, a first reference azimuth angle and a second reference azimuth angle corresponding to the start position and the end position, respectively;
- determining a reference position change of the lane line corresponding to a difference between the first reference azimuth angle and the second reference azimuth angle;
- determining a measurement position change of the lane line corresponding to a difference between the first measurement azimuth angle and the second measurement azimuth angle; and
- in response to determining that a difference between the measurement position change and the reference position change reaches a threshold, determining that the position change is true.

19. An electronic device, comprising:
one or more processors; and
a storage device, configured to store one or more programs, wherein when the one or more programs are executed by the one or more processors, the one or more processors are configured to implement a method for detecting a position change of a lane line, the method comprising:
- converting a first change in a target region of first measurement data of a distance between a lane line and a reference line on a road to a first equivalent position change of the lane line, the first measurement data being obtained from first road data collected by a high-precision device on the road at a first time point, and the target region being between the lane line and the reference line;
- correcting second measurement data of the distance with the first measurement data, the second measurement data being obtained from second road data collected by a low-precision device on the road at a second time point, the second time point being after the first time point;
- converting a second change of the corrected second measurement data in the target region to a second equivalent position change of the lane line; and
- detecting a position change of the lane line in the target region between the first time point and the second time point based on a comparison of the first equivalent position change and the second equivalent position change.

20. A non-transitory computer-readable storage medium having a computer program stored thereon, wherein when the program is executed by a processor, a method for detecting a position change of a lane line, the method comprising:
- converting a first change in a target region of first measurement data of a distance between a lane line and a reference line on a road to a first equivalent position change of the lane line, the first measurement data being obtained from first road data collected by a high-precision device on the road at a first time point, and the target region being between the lane line and the reference line;
- correcting second measurement data of the distance with the first measurement data, the second measurement data being obtained from second road data collected by a low-precision device on the road at a second time point, the second time point being after the first time point;
- converting a second change of the corrected second measurement data in the target region to a second equivalent position change of the lane line; and
- detecting a position change of the lane line in the target region between the first time point and the second time point based on a comparison of the first equivalent position change and the second equivalent position change.

* * * * *